(12) United States Patent
Beebe et al.

(10) Patent No.: US 12,442,051 B2
(45) Date of Patent: Oct. 14, 2025

(54) STABLE INTERFACE SYSTEMS AND COMPOSITIONS

(71) Applicants: Salus Discovery, LLC, Madison, WI (US); Flambeau Diagnostics, LLC, Madison, WI (US)

(72) Inventors: Dave Beebe, Monona, WI (US); Patrick McMinn, Madison, WI (US); Brianna Mullins, Deforest, WI (US); Jay Warrick, Madison, WI (US)

(73) Assignees: Salus Discovery, LLC, Madison, WI (US); Flambeau Diagnostics, LLC, Madison, WI (US)

( * ) Notice: Subject to any disclaimer, the term of this patent is extended or adjusted under 35 U.S.C. 154(b) by 554 days.

(21) Appl. No.: 17/737,808

(22) Filed: May 5, 2022

(65) Prior Publication Data

US 2022/0355273 A1  Nov. 10, 2022

Related U.S. Application Data

(60) Provisional application No. 63/184,334, filed on May 5, 2021.

(51) Int. Cl.
*B01J 20/28* (2006.01)
*B01J 20/10* (2006.01)
(Continued)

(52) U.S. Cl.
CPC ............ *C12Q 1/701* (2013.01); *B01J 20/103* (2013.01); *B01J 20/28042* (2013.01);
(Continued)

(58) Field of Classification Search
CPC ................ B01J 20/103; B01J 20/28042; B01J 20/28069; B01L 2200/0647;
(Continued)

(56) References Cited

U.S. PATENT DOCUMENTS

| 5,614,477 A | 3/1997 | Kompan et al. |
| 9,056,039 B1 | 6/2015 | Califorrniaa |

(Continued)

FOREIGN PATENT DOCUMENTS

| EP | 0385953 B1 | 4/1993 |
| EP | 1693109 A1 | 8/2006 |

(Continued)

OTHER PUBLICATIONS

International Search Report and Written Opinion for PCT/US22/27900. Mailed Sep. 27, 2022. 18 pages.

(Continued)

*Primary Examiner* — Dirk R Bass
(74) *Attorney, Agent, or Firm* — Casimir Jones, S.C.; Rikki A. Hullinger

(57) ABSTRACT

Stabilized interface systems and compositions for positioning target(s), comprising fluids, associated structural material(s) having a pore that permits passage and positioning of targets and related compositions, and a fluid phase, layer, or interface stabilized with the associated structural material. Miscible interface systems and compositions for positioning target(s) for detection comprising two or more fluid regions with different properties within a phase or layer where the fluid regions are stabilized with respect to each other using a solid or semi-solid structure or material with at least one pore that allows passage of said target(s) wherein stabilization allows mass transport of a fluid constituent via diffusion to prevail over bulk fluid motion.

11 Claims, 23 Drawing Sheets

(51) Int. Cl.
*B01L 3/00* (2006.01)
*C12Q 1/6851* (2018.01)
*C12Q 1/70* (2006.01)
*C12Q 1/6806* (2018.01)

(52) U.S. Cl.
CPC ...... *B01L 3/502761* (2013.01); *C12Q 1/6851* (2013.01); *B01J 20/28069* (2013.01); *B01L 2200/0647* (2013.01); *B01L 2200/16* (2013.01); *B01L 2300/0829* (2013.01); *C12Q 1/6806* (2013.01)

(58) Field of Classification Search
CPC ......... B01L 2200/0652; B01L 2200/16; B01L 2300/0681; B01L 2300/069; B01L 2300/0829; B01L 2400/0409; B01L 2400/043; B01L 2400/0457; B01L 3/50215; B01L 3/5025; B01L 3/502761; C12Q 1/6806; C12Q 1/6851; C12Q 1/701; C12Q 2527/101; C12Q 2527/125; C12Q 2531/113; C12Q 2563/143; C12Q 2563/149; G01N 33/54326
See application file for complete search history.

(56) References Cited

U.S. PATENT DOCUMENTS

| | | |
|---|---|---|
| 2007/0253868 A1 | 11/2007 | Beebe et al. |
| 2011/0244565 A1 | 10/2011 | Beebe et al. |
| 2014/0187666 A1 | 7/2014 | Aizenberg et al. |
| 2014/0235468 A1 | 8/2014 | Cheng et al. |
| 2014/0342954 A1 | 11/2014 | Ingber et al. |
| 2016/0054207 A1 | 2/2016 | Haselton et al. |
| 2016/0074915 A1 | 3/2016 | White et al. |
| 2017/0199107 A1 | 7/2017 | Guckenberger et al. |
| 2018/0037494 A1 | 2/2018 | Haghighi et al. |
| 2018/0052154 A1 | 2/2018 | Stoner et al. |
| 2018/0155706 A1 | 6/2018 | Beebe et al. |
| 2019/0383807 A1 | 12/2019 | Connelly et al. |
| 2020/0209235 A1 | 7/2020 | Guckenberger |
| 2021/0349084 A1 | 11/2021 | Warrick et al. |
| 2022/0355273 A1 | 11/2022 | Beebe et al. |

FOREIGN PATENT DOCUMENTS

| | | |
|---|---|---|
| EP | 1339495 B1 | 1/2018 |
| GB | 2361441 A | 10/2001 |
| WO | WO 2018/115978 | 6/2018 |
| WO | WO 2020/132005 | 6/2020 |
| WO | WO 2022/150382 | 7/2022 |

OTHER PUBLICATIONS

International Search Report and Written Opinion for PCT/US22/27893. Mailed Oct. 13, 2022. 46 pages.

International Search Report and Written Opinion for PCT/US23/036928. Mailed Feb. 8, 2024. 16 pages.

Supplementary European Search Report for European Patent Application No. 22799611.3, dated Feb. 20, 2025, 8 Pages.

STABLE INTERFACE SYSTEMS AND COMPOSITIONS

STATEMENT REGARDING RELATED APPLICATIONS

This application claims priority to U.S. Provisional Patent Application No. 63/184,334, filed May 5, 2021, the entire contents of which are incorporated herein by reference for all purposes.

STATEMENT OF GOVERNMENT SUPPORT

This invention was made with government support under R43 OD023021-01A1, awarded by the National Institutes of Health. The government has certain rights in the invention.

INCORPORATION BY REFERENCE

All U.S. patents, U.S. patent applications, publications, foreign patents, foreign and PCT published applications, articles and other documents, references and publications noted herein, and all those listed as References Cited in any patent or patents that issue herefrom, are hereby incorporated by reference in their entirety. The information incorporated is as much a part of this application as if all the text and other content is repeated in the application and will be treated as part of the text and content of this application as filed.

TECHNICAL FIELD

The invention generally concerns the separation, isolation, purification, identification, detection and quantification of materials.

Provided herein are systems, devices, compositions and methods for positioning and/or processing a target. Targets may be positioned in a number of ways, including positively (by moving or isolating a target, for example, for detection or measurement) and negatively (by positioning or removing one or more or all non-targets). Using the systems, devices and methods of the invention, targets or materials to which targets are attached can be moved, separated, isolated, detected, identified, analyzed, screened for, quantified, or purified using the systems, devices and methods of the invention. The systems, devices and methods of the invention include systems, devices and methods for the isolation and/or detection of a target or analyte (including cells, proteins, DNA, RNA or pathogens or parts of pathogens, e.g., proteins, nucleic acids, etc.) in a sample. In particular, provided herein is a system and a device comprising one or more oil and/or one or more aqueous phases and/or one or more gas phases stabilized in close proximity to each other. The systems, devices and methods of the invention have many uses. For example, they may be used for isolating, separating, moving, purifying, mixing, binding and/or subsequently detecting the presence or amount of a target or target analyte from a sample or other mixture. Positioning a target may be done by isolating, separating, or moving the target, or by isolating, separating, or moving a material bound to the target with a method, device or system of the invention, and may be done positively or negatively. In some aspects, provided herein is a system and a device comprising one or more stabilized oil and/or one or more stabilized aqueous phases and/or one or more gas phases that may be used to move or purify a target or analyte away from a sample or mixture that contains, may contain, or is or may be suspected of containing the target or analyte using a magnetic, electric, or acceleration-based force (e.g., via gravity or via a centrifuge) to draw the target or analyte through one or more phases or layers. In some embodiments, the system and the device comprises reagents for detection, identification, analysis, isolation or quantification of the target or analyte. The quantification may be positive-negative for the target, semi-quantitative or quantitative. The isolation or purification may be complete or partial. One or more or all of the reagents for detection, identification, analysis, isolation or quantification of the target or analyte may be contained in one or more parts or portions of the system or device, in one or more aqueous and/or oil phases or layers of the system or device, in a base phase or layer of the system or device, in a lower phase, layer or stratum of the system or device, or in a terminating or terminal phase, layer or stratum of the system or device (in vertical or latitudinal embodiments), or in a seam, abutment or joint (in horizontal or longitudinal or other phase/layer orientations in non-vertical or non-latitudinal embodiments).

BACKGROUND

The following includes information that may be useful in understanding the present inventions. It is not an admission that any of the information is prior art, or relevant, to the presently described or claimed inventions, or that any publication or document that is specifically or implicitly referenced is prior art or a reference that may be used in evaluating patentability of the described or claimed inventions.

The ability to move, isolate, purify, separate, identify, quantify or otherwise manipulate a target or analyte (e.g., nucleic acid, protein, whole cell, or contaminant) from a complex background is a critical prerequisite for many common analytical or other processes in diagnostics, biological research, biomarker discovery, forensics, and more. However, conventional processes, including, for example, analyte purification processes, can be or are time-consuming, expensive, and laborious, etc., often becoming the bottleneck within such processes, for example, analytical processes. Further, some methodologies damage the sample or cause undesired loss or inconsistent yield of sample. Accordingly, improved systems, methods and devices for manipulation of targets, including isolation, separation and purification of a target or target analyte, and subsequent rapid detection, identification, quantification of the analyte or other target from a sample are needed, and are provided herein.

BRIEF SUMMARY

The inventions described and claimed herein have many attributes and embodiments including, but not limited to, those set forth or described or referenced in this Brief Summary. It is not intended to be all-inclusive, and the inventions described and claimed herein are not limited to or by the features or embodiments identified in this introduction, which is included for purposes of illustration only and not restriction.

The invention comprises multi-layer systems and devices that provide for autonomous operation of processing steps by the operation of a force to position a target. The multi-layer systems may be within a container.

In one aspect, the invention provides for autonomous sample preparation (e.g. lysis, washing, and/or solid phase target binding) and testing (e.g., PCR, LAMP, etc.) performed in a single device requiring only addition of a sample, application of a force (e.g. a magnetic force) to obtain and/or read a result. In some embodiments, the invention optionally includes a means for communicating a result for viewing, analysis and/or storing (e.g. to a computer or phone).

In some aspects, provided herein are systems, methods and devices and compositions for isolating or positioning a target from a sample and processing the target. In some embodiments, the target of interest is the target itself. In some embodiments, the target of interest is the target bound to a solid phase, or the solid phase itself.

In some embodiments, the system, method or device comprises at least one aqueous phase or layer and at least one oil phase or layer stabilized in proximity to one another within a container. In some embodiments, the at least one aqueous phase or layer and the at least one oil phase or layer are stabilized within the container by a hydrophilic porous material associated with the at least one aqueous phase and/or a hydrophobic porous material associated with the at least one oil phase. In some embodiments, the at least one aqueous phase and the at least one oil phase are stabilized within the container by modulating geometry or one or more chemical or physical material characteristics.

In some embodiments where the system, method or device comprises at least one aqueous phase or layer and at least one oil phase or layer, only the at least one aqueous phase or layer and at least one oil phase or layer are stabilized. In some embodiments where the system, method or device comprises more than one aqueous phase or layer and one or more oil phases or layers, only one of the aqueous phases or layers is stabilized. In some embodiments where the system, method or device comprises more than one aqueous phase or layer and one or more oil phases or layers, more than one or all of the aqueous phases or layers are stabilized. For example, in an embodiment of the invention with four aqueous phases or layers, one, two, three or all four may be stabilized. In some embodiments where the system, method or device comprises more than one aqueous phase or layer and one or more oil phases or layers, only one of the oil phases or layers is stabilized. In some embodiments where the system, method or device comprises more than one oil phase or layer and one or more aqueous phases or layers, more than one or all of the oil phases or layers are stabilized. For example, in an embodiment of the invention with four oil phases or layers, one, two, three or all four may be stabilized.

In another embodiment of the invention where the device, system or method includes aqueous phases or layers and/or multiple oil phases or layers, for example, 1-6 aqueous phases or layers and 1-6 oil phases or layers, from 1-6 of the aqueous phases or layers and/or from 1-6 of the oil phases or layers may be stabilized.

In some embodiments, the device, system or method comprises at least one stabilized aqueous phase or layer. In some embodiments, the at least one aqueous phase or layer is stabilized by a hydrophilic porous material associated with the at least one aqueous phase or layer. In some of these embodiments, the device, system or method comprising at least one stabilized aqueous phase or layer does not include an oil phase or layer or a stabilized oil phase or layer. In some embodiments, the device, system or method comprising at least one stabilized aqueous phase or layer also comprises a gaseous phase or layer. In some embodiments, the gaseous phase or layer comprises, for example, air or an inert gas. In some embodiments, the gaseous layer comprises helium, neon, argon, krypton, xenon, radon or oganesson, for example. In some of these embodiments, the device, system or method comprising at least one stabilized aqueous phase or layer includes at least one oil phase or layer and/or at least one stabilized oil phase or layer. In some of these embodiments, the device, system or method comprising at least one stabilized aqueous phase or layer includes at least one oil phase or layer and/or at least one stabilized oil phase or layer and at least one gaseous layer or phase. In some embodiments, the device, system or method comprises at least two stabilized aqueous phases or layers. In some embodiments, the device, system or method comprising at least one stabilized aqueous phase is within a vessel or container.

In some embodiments, the device, system or method comprises at least one stabilized oil phase or layer. In some embodiments, the at least one oil phase or layer is stabilized by a hydrophobic porous material associated with the at least one oil phase or layer. In some of these embodiments, the device, system or method comprising at least one stabilized oil phase or layer does not include an aqueous phase or layer or a stabilized aqueous phase or layer. In some embodiments, the device, system or method comprising at least one stabilized oil phase or layer also comprises a gaseous phase or layer. In some embodiments, the gaseous phase or layer comprises, for example, air or an inert gas. In some embodiments, the gaseous layer comprises helium, neon, argon, hypton, xenon, radon or oganesson, for example. In some of these embodiments, the device, system or method comprising at least one stabilized oil phase or layer includes at least one aqueous phase or layer and/or at least one stabilized aqueous phase or layer. In some of these embodiments, the device, system or method comprising at least one stabilized oil phase or layer includes at least one aqueous phase or layer and/or at least one stabilized aqueous phase or layer and at least one gaseous layer or phase. In some embodiments, the device, system or method comprises at least two stabilized oil phases or layers. In some embodiments, the device, system or method comprising at least one stabilized oil phase is within a vessel or container.

In some embodiments, the least one aqueous phase or layer or the at least one oil phase or layer is stabilized within a vessel or container using a porous material. The material is selected to allow the movement of desired materials through the device or system. The porous material may be a mesh. In some embodiments, one or more of the least one aqueous phase or layer is/are stabilized with at least one hydrophilic porous material(s) or mesh(es). In some embodiments, one or more of the least one oil phase or layer is/are stabilized with at least one hydrophobic porous material(s) or mesh(es). In one embodiment the porous material and/or the hydrophobic and/or hydrophilic mesh has at least one predetermined pore size, set of pore sizes or range of pore sizes. In some embodiments, aqueous and oil phases or layers are stabilized in proximity to one another within a container.

In some embodiments, one or more of the phases or layers are stabilized, and a phase or layer contains fluid with multiple densities and/or density gradients.

In some embodiments, the one or more phases or layers may be stabilized within the system or device, e.g. within a container, by modulating material geometry or one or more chemical or physical material characteristics selected from density, surface chemistry, and porosity of a hydrophilic/hydrophobic porous material, if present in the system In some embodiments, the systems, devices and methods are designed and used for positioning a target. By way of example, using a system, device or method of the invention, one or more targets can be moved, separated, isolated, detected, identified, analyzed, screened for, quantified, or purified using the systems, devices and methods of the invention. The systems, devices and methods of the invention include systems, devices and methods for the isolation and/or detection of an analyte in a sample. In some embodiments, the system, method or device comprises one or more oil and/or one or more aqueous phases and/or one or more gas phases stabilized in close proximity to each other. These systems and devices have many uses. For example, they may be used for isolating, separating, moving, purifying, mixing, binding and/or subsequently detecting the presence or amount of a target or target analyte from a sample or other mixture.

Targets may be positioned positively or negatively, and in a number of ways. Targets may be positioned positively, for example, by isolating a target (e.g., for detection or measurement). Targets may be positioned negatively, for example, by positioning or removing one or more or all non-targets.

In some embodiments, positioning a target by, for example, isolating, separating, moving or binding the target or a material bound to the target using a method, device or system of the invention may be done positively.

In some embodiments, positioning a target by, for example, isolating, separating, moving or binding the target or a material bound to the target using a method, device or system of the invention may be done negatively.

In some aspects, provided herein is a system and a device and method comprising one or more stabilized oil and/or one or more stabilized aqueous phases and/or one or more gas phases that may be used to move or purify a target or analyte away from a sample or mixture that contains, may contain, or is or may be suspected of containing the target or analyte using a magnetic, electric, or acceleration-based force (e.g., via gravity or via a centrifuge) to draw the target or analyte through one or more layers. In some embodiments, the system and the device comprises reagents for detection, identification, analysis, isolation or quantification of the target or analyte. The quantification may be positive-negative for the target, semi-quantitative or quantitative. The isolation may be complete or partial. One or more or all of the reagents for detection, identification, analysis, isolation or quantification of the target or analyte may be contained within the system or device.

In some embodiments, the systems, devices, compositions and methods of the invention the autonomous operation of processing steps. In some embodiments, the inventions provide for the processing/exposure/modification of any solid phase (e.g. para-magnetic particles) that can be moved through the layers/interfaces. In one aspect, each step functions as a purification/separation step as, by way of example, the paramagnetic particle passes through a phase, layer or interface. In other aspects, when the paramagnetic particle, for example, is within a phase, layer or interface other functionality may take place (e.g. chemical modification of the solid phase, elution off the solid phase, etc.). In some embodiments, a solid phase is a solid support to which a target has been attached (e.g., fixed, bound, constrained, or sequestered, whether directly or indirectly). However, anything to which a target is attached may serve as a "solid phase." Semi-solids can serve as solid phases. Solid phases include paramagnetic particles. A mesh or other porous solid support structure used to stabilize a phase or layer of the invention can be a solid phase. In some embodiments, the target can be the solid phase, e.g. a cell. In other aspects, each step functions as a purification/separation step as, by way of example, non-target elements of a sample are passed through a phase, layer or interface and the target (attached to a solid, a semi-solid, or a solid phase, e.g. a paramagnetic particle) remains while non-target elements are moved away. This is an example of negative selection.

In some embodiments, the at least one aqueous phase and the at least one oil phase are stabilized within the container by a hydrophilic porous material associated with the at least one aqueous phase or layer, a hydrophobic porous material associated with the at least one oil phase or layer, and by modulating surface chemistry or surface energy of a phase or layer such that buoyancy forces of either the one oil phase or layer or the at least one aqueous phase or layer is overcome and less than the surface tension between the at least one oil phase and the hydrophobic porous material or the at least one aqueous phase and the hydrophilic porous material.

In some embodiments, multiple aqueous phases or layers and multiple oil phases and/or gas phases or layers are present in the system. In some embodiments, the system comprises a first aqueous phase or layer, a second aqueous phase or layer, a first oil phase or layer, and a second oil phase or layer, with or without one or more gas phases or layers. In some embodiments, the phases or layers are stacked in an alternating fashion within the container, such that the first and second aqueous phases or layers are not in direct contact with one another and the first and the second oil phases or layers are not in direct contact with one another.

In some embodiments, the container comprises a top opening to permit addition of a sample to the container. In some embodiments, an aqueous phase is closest to the top opening of the container. In some embodiments, an oil phase is closest to the top opening of the container. In some embodiments, a device or system of the invention permits addition of a sample to a device with no top or bottom, e.g., an insert containing a system of the invention. Phases and/or layers are positioned as desired in such embodiments and the sample may be added to a layer or phase designated as the "first" or "sample receiving" phase or layer.

In some embodiments, at least one aqueous phase comprises a lysis buffer. In some embodiments, at least one aqueous phase comprises a wash buffer.

In some embodiments, the system further comprises paramagnetic particles (PMPs). In some embodiments, the PMPs are housed within the container. The PMPs may be lyophilized or in a liquid form. In some embodiments, the PMPs are housed within the at least one aqueous phase. In some embodiments, the PMPs will bind to a target or target analyte, and may be referred to as "target-binding" PMPs (or other target capture solid phase). In some embodiments, target-binding PMPs or other target-binding solid phases will bind to a target or target analyte, and may be referred to as "target-binding" PMPs (or other target capture solid phase). In some embodiments, target-binding PMPs or other target-binding solid phases are conjugated with a target-binding agent, for example, an antibody, an antibody fragment, a single chain Fv, etc., directed to the target and used as a PMP targeting agent. Other useful target-binding agents include oligonucleotides. In some embodiments, the target-binding oligonucleotides comprise sequences that target mRNA (e.g., poly dT sequence to bind polyA tails on mRNA) or specific sequences of RNA or DNA.

In some embodiments, provided herein is a system for isolating a target analyte from a sample, comprising a first aqueous phase or layer, a second aqueous phase or layer, a first oil phase or layer, and a second oil phase or layer. In some embodiments, the phases or layers are stacked in an alternating fashion within a container, such that the first and second aqueous phases or layers are not in direct contact with one another and the first and the second oil phases or layers are not in direct contact with one another. In some embodiments, the phases or layers are stabilized within the container by a hydrophilic porous material associated with the first aqueous phase or layer, a hydrophilic porous material associated with the second aqueous phase or layer, a hydrophobic porous material associated with first oil phase or layer, and a hydrophobic porous material associated with the second oil phase or layer. In some embodiments, the phases or layers are further stabilized within the container by modulating surface chemistry such that fluid retention forces associating a fluid layer with a support structure dominate other forces (e.g., buoyancy or changes in momentum) that might otherwise disrupt the functional layering or order of the phases.

In some embodiments, the container comprises a top opening to permit addition of a sample to the container. In some embodiments, the first aqueous phase or layer is closest to the top opening of the container. In some embodiments, the first oil phase or layer is closest to the top opening of the container. In some embodiments, the first aqueous phase or layer comprises a lysis buffer. In some embodiments, the second aqueous phase or layer comprises a wash buffer. In some embodiments, a device or system of the invention permits the addition of a sample to a container or device having no top or bottom as such, e.g., an insert containing a system of the invention that does not contain a bottom integral with its sides. The first and second aqueous phases and the first and second oil phases or layers are positioned as desired in such embodiments and the sample may be added to a layer or phase designated as a "first" or "sample receiving" phase or layer.

The system may further comprise paramagnetic particles (PMPs). The PMPs may be housed within the container. In some embodiments, the PMPs are lyophilized. In some embodiments, the PMPs are in a liquid form. In some embodiments, the PMPs are housed within the first aqueous phase.

In any of the embodiments described herein, the system may further comprise a magnet. The container may comprise a multi-well plate. The system may further comprise a sample. The sample may be a biological sample or a sewage sample. In some embodiments, the biological sample comprises a nasopharyngeal sample, an oropharyngeal sample, an oral swab sample, an oral sponge sample, a nasal swab sample, a mid-turbinate sample, or a saliva sample.

The systems described herein may be used in methods of isolating any desired target or material. In some embodiments, the target is nucleic acid. In some embodiments, the target is viral nucleic acid. For example, the target may be a SARS-CoV-2 nucleic acid. In some embodiments, the target is a protein (e.g., a hormone or any other protein), a carbohydrate, a glycolipid, a cell, a circulating tumor cell, etc. Any material that may be bound to a "solid phase," as described herein, which in some embodiments may be, e.g., a PMP (either attached directly or indirectly) may be a target in one or more of the systems, devices, compositions and methods of the invention.

One or more or all of the reagents for detection, identification, analysis, isolation or quantification of a target may be contained in one or more parts or portions of the system or device. In some embodiments, one or more or all of the reagents for detection, identification, analysis, isolation or quantification of the target may be contained in one or more aqueous and/or oil phases or layers of the system or device.

In some embodiments, the systems and devices described herein further comprise reagents for detecting the target housed in the base phase or layer or on a bottom surface of the container. In some embodiments, one or more or all of the reagents for detection, identification, analysis, isolation or quantification of the target are contained in a lower phase, layer or stratum of the system or device, but above the base layer. In some embodiments, one or more or all of the reagents for detection, identification, analysis, isolation or quantification of the target are contained in a terminating or terminal phase, layer or stratum of the system or device (in vertical or latitudinal embodiments), or in a seam, abutment or joint (in horizontal or longitudinal or other phase/layer orientations in non-vertical or non-latitudinal embodiments).

The reagents for detecting the target may comprise reagents for a loop mediated isothermal amplification (LAMP) or a reverse transcriptase loop mediated isothermal amplification (RT-LAMP) assay. In some embodiments, the LAMP or RT-LAMP assay is a colorimetric assay or a fluorescent assay. In other embodiments, the reagents for detecting the target comprise reagents for PCR, RT-PCR, qPCR, qtPCR, multiplex PCR, assembly PCR or asymmetric PCR, for example. In other embodiments, the reagents for detecting the target comprise reagents for immunoassays, which may use antibodies and/or antibody fragments to detect or measure a target or target analyte. In some embodiments, the immunoassay is an enzyme immunoassay, an ELISA (enzyme-linked immunosorbent assay, including direct ELISAs, indirect ELISAs, sandwich ELISAs and competitive ELISAs), an IEMA (immunoenzymometric assay), a radioimmunoassay, a fluoroimmunoassay, a chemiluminescent immunoassay (CLIA) and counting immunoassay (CIA). A container housing a PCR reaction, for example, can be a simple cup shape at the bottom of the device, or in some embodiments, the geometry of the container housing the reaction can be such that thermocycling is more efficient. For example, in some embodiments, the container housing the reaction can have a high aspect ratio to facilitate quicker transfer of heat (i.e., reducing the distance over which temperature must be conducted to facilitate temperature cycling of the reaction). In some embodiments, the container housing the reaction comprises, consists essentially of, or consists of a microfluidic channel. In some embodiments, the container housing the reaction is made of different material as the rest of the device. In some embodiments, the container housing the reaction has integrated heating elements in it.

The devices, systems, methods and compositions of the invention can be used in testing for or assaying for any molecular target, including biomolecules, proteins, hormones, nucleic acids, drugs, etc. In some embodiments, devices, systems, methods and compositions of the invention are used to move, separate, isolate, purify, identify, detect and/or quantify a target, including but not limited to those described or referred to herein.

In some embodiments, the invention provides a disposable cartridge comprising a flow-through assay to determine the presence or amount of a target in a sample comprising a sample application space, a cartridge top, a cartridge bottom, reagents for detection or quantification of the target and an enclosure, the improvement comprising employing with or within the enclosure target-binding paramagnetic particles (or other target-binding carrier substance), at least one aqueous phase or layer and at least one gaseous or oil phase or layer stabilized in proximity to one another by inclusion of a porous (e.g. target-permeable) structural material associated with the aqueous phase/layer or the gaseous or oil phase/layer or both, and, optionally, a magnet. Other phases, and/or alternative phases, may be used or included (e.g. two oil phases with or without an aqueous phase or layer).

In some embodiments, the invention provides a flow assay (e.g., lateral flow, vertical flow) device or cartridge comprising a sample application portion, a conjugate portion, a test portion and pre-immobilized reagents in different parts of the device or cartridge, the improvement comprising employing target-binding paramagnetic particles (or other target-binding carrier substance), at least one aqueous phase or layer and at least one gaseous or oil phase or layer stabilized in proximity to one another by inclusion of a porous (e.g. target-permeable) structural material associated with the aqueous phase or the gaseous or oil phase or both, and a magnet. Other phases, and/or alternative phases, may be used or included (e.g. two oil phases with or without an aqueous phase or layer). In some embodiments, the improved flow device is designed and/or formatted for use as a disposable, point-of-care cartridge or device.

In some embodiments, the invention provides an immunometric assay to determine the presence, concentration or amount of a target substance in a sample comprising forming a ternary complex of a first labeled binding agent, said target substance, and a second binding agent said second binding agent being bound to a solid carrier wherein the presence or amount of the substance in the sample is determined by measuring either the amount of labeled binding agent bound to the solid carrier or the amount of unreacted labeled binding agent, the improvement comprising employing target-binding solid phase particles (or other target-binding carrier substance), at least one aqueous phase or layer and at least one gaseous or oil phase or layer stabilized in proximity to one another by inclusion of a porous structural material associated with the aqueous phase or layer or the gaseous or oil phase or layer or both. Other phases, and/or alternative phases, may be used or included (e.g. two oil phases with or without an aqueous phase or layer). In some embodiments, the solid phase is a paramagnetic particle and the improved assay includes or uses a magnet. In some embodiments one or more of the binding agents is an antibody, an antibody fragment, an oligonucleotide, an aptamer, a peptide, a peptidomimetic, natural or chemically modified antisense oligonucleotides, or other suitable agent to assist with capture of a target. In some embodiments, the immunometric assay is housed in a single container.

In some embodiments, the invention provides a nucleic acid amplification test to determine the presence or amount of a target substance in a sample comprising amplifying a nucleic acid sequence and detection of the sequence, the improvement comprising employing target-binding paramagnetic particles (or other target-binding carrier substance), at least one aqueous phase or layer and at least one gaseous or oil phase or layer stabilized in proximity to one another by inclusion of a porous structural material associated with the aqueous phase or layer or the gaseous or oil phase or layer or both, and, optionally, a magnet. In some embodiments, the nucleic acid amplification test is PCR or RT-PCR. In some embodiments, the nucleic acid amplification test is isothermal. In some embodiments, the isothermal nucleic acid amplification test is reverse transcription polymerase chain reaction (RT-PCR), nicking endonuclease amplification reaction (NEAR), transcription mediated amplification (TMA), loop-mediated isothermal amplification (LAMP), helicase-dependent amplification (HDA), clustered regularly interspaced short palindromic repeats (CRISPR), or strand displacement amplification (SDA). In some embodiments, this nucleic acid amplification test is housed in a single container.

In some embodiments of the invention useful for performing one or more steps of an assay for the detection or measurement of a target or target analyte, one or more of the phases or layers of the device or system may comprise one or more of several different buffers. In some embodiments, one or more phases or layers comprise a coating buffer, a blocking buffer, a stabilization buffer, a washing buffer, or act as or comprise a sample diluent. In some embodiments, antibodies or antibody fragments are used to generate a detection signal. In some embodiments, the assay carried out using a device, system or method of the invention comprises a magnetically-actuated immunoassay in which the movement or positioning of a target or target analyte is achieved using magnetic separation using a magnetic particle. In some embodiments, the particle used in these embodiments is made of a core of magnetite that is chemically modified by the attachment of antibodies or antibody fragments. In some embodiments, one or more or all components of an assay are used to isolate or purify a target or target analyte.

In some aspects, provided herein are methods for isolating a target from a sample. In some embodiments, provided herein is a method for isolating a target from a sample comprising adding a sample to a system described herein, and applying a magnetic force to the system. In some embodiments, the sample is contacted with paramagnetic particles prior to applying the magnetic force to the system. In some embodiments, the PMPs are contacted with the biological sample prior to adding the biological sample to the system. Contacting the sample with the paramagnetic particles generates one or more target-PMP complexes, and applying the magnetic force to the system draws the target-PMP complexes through phases within the system towards a bottom surface of the container.

In some embodiments, the method further comprises detecting the target in the biological sample. In some embodiments, the system further comprises reagents for detection of the target housed on the bottom surface of the container, and detecting the target comprises drawing the target-PMP complexes through the plurality of porous materials and onto the reagents for detection of the target. In some embodiments, the reagents comprise reagents for a loop mediated isothermal amplification (LAMP) or a reverse transcriptase loop mediated isothermal amplification (RT-LAMP) assay. In some embodiments, detecting the target comprises detecting a signal generated during the LAMP or RT-LAMP assay. In some embodiments, the LAMP or RT-LAMP assay is a colorimetric assay or a fluorescent assay.

In some embodiments, the sample is a biological sample or a sewage sample. For example, the biological sample may be a nasopharyngeal sample, an oropharyngeal sample, an oral swab sample, an oral sponge sample, a nasal swab sample, a mid-turbinate sample, or a saliva sample. In other embodiments, the sample is blood, cerebrospinal fluid, urine, tissue, biopsy tissue, etc. Any type of sample containing or suspected of containing a target of interest is contemplated for use in the systems and methods of the invention. In some embodiments, the biological sample is obtained from a subject suspected of having an infection. In some embodiments, the subject is suspected of having a viral infection. For example, the subject may be suspected of having a viral upper respiratory infection. In some embodiments, the subject is suspected of having an infection with a SARS-CoV2, a SARS, a coronavirus, a rhinovirus, an influenza virus, or a respiratory syncytial virus, for example. In some embodiments, the target comprises viral nucleic acid. For example, the target may comprise a SARS-CoV-2 nucleic acid.

In some embodiments, the invention provides a stabilized interface system. In some embodiments, stabilized interface system comprises (a) at least two fluids, (b) at least one associated structural material having at least one pore, and (c) at least one fluid phase, layer, or interface stabilized with said associated structural material, wherein said.

In some embodiments, the invention provides a composition of matter comprising a fluid phase, layer or interface stabilized by a target-permeable structural material associated with and having a preference for said fluid phase, layer or interface. In some embodiments, the structural material is selected to permit passage of one or more targets. In some embodiments, the structural material is selected to permit moving or positioning one or more targets. In some embodiments, the invention provides a stabilized interface system that is used to move or position a target.

In some embodiments, the invention provides method for stabilizing a fluid phase, layer or interface in a system or device for positioning a target, the method comprising associating a target-permeable stabilizing structure with said fluid phase, layer, or interface.

In some embodiments, the invention provides a miscible interface system, method, and related compositions. In some embodiments, a miscible interface system comprises a composition comprising two or more fluid regions with different properties within a phase or layer where the fluid regions are stabilized with respect to each other using a solid or semi-solid structure or material with at least one pore that allows mass transport of a fluid constituent via diffusion to prevail over bulk fluid motion.

In some embodiments, a miscible interface system composition comprises two or more fluid regions with different properties within a phase or layer where the fluid regions are stabilized with respect to each other using a solid or semi-solid structure or material with one or more pores wherein stabilization allows mass transport of a fluid constituent via diffusion to prevail over bulk fluid motion.

In some embodiments of a miscible interface system, method, and related compositions, the structural material is selected to permit passage of one or more targets. In some embodiments, the structural material is selected to permit moving or positioning one or more targets. In some embodiments, the invention provides a miscible interface system that is used to more or position a target.

In some embodiments, positioning using, for example, a stabilized interface system and/or a miscible interface system and/or related compositions, can be achieved using active positioning (e.g. using an external force, including a magnetic force, a rotating force, an accelerating force, an assisted gravitational force, etc.). In some embodiments, positioning can be passive and carried out without using an external force (e.g. by diffusion, simple gravity, osmosis, etc.).

In some embodiments, the sample is a sample used to determine paternity. In some embodiments, the sample is for use in prenatal or postnatal screening.

In some embodiments, the system or device of the invention is bluetooth-enabled, or enabled with another communication functionality (e.g. WiFi, NFC, etc.). In some embodiments, system or device results or results from a method as described herein are transmitted via bluetooth or other communication functionality to another device (e.g. a phone, a tablet, a CPU, a computer, etc.).

BRIEF DESCRIPTION OF THE DRAWINGS

FIG. 2B shows a bottom view and a top view of the system described in FIG. 1 following application of paramagnetic particles and magnetic pull down. All three of the systems shown contain oil (yellow), and a glass mesh on the bottom of the well. A comparison of three systems comprising (1) the synthetic polypropylene polymer mesh (referred to as "Porex Pad") associated with oil, (2) no porous material (e.g. only aqueous or oil layers; "+Control") and a glass mesh and synthetic polypropylene polymer mesh ("Glass Mesh+Porex Pad") is shown. As shown in the figure, the synthetic polypropylene polymer mesh (e.g. "porex" pad) and the combination of the porex pad and glass mesh both permit beads to pass through the porous material. The "+Control" condition shows what 100% bead transmittance would look like.

FIG. 11A shows paramagnetic particles in an aqueous phase (i). Application of magnetic force below the system pulls the paramagnetic particles (e.g. the target-PMP complexes) through an oil phase (ii, iii, and iv) towards the bottom surface of the system. FIG. 11B shows a container holding the system. The bottom surface of the container contains reagents for detection of the analyte (shown in red). The aqueous and oil phases are stabilized by forces including buoyancy and fluid retention (e.g., wetting, surface tension, capillary action). FIG. 11C shows an exemplary process for isolating and detecting an analyte using an embodiment of a system of the invention described and claimed herein.

FIG. 17a shows an oil-stabilized phase or layer (yellow), depicted as the "Mesh-Stabilized Interfaces", above an unstabilized water phase or layer (blue), contained within a test tube. When a second aqueous fluid ("Water (dyed red)")(Red) is added to the system, being a denser fluid than the oil, the oil and "red" water phases will invert but due to the presence of the stabilized oil layer, does not mix with the bottom water layer. In some embodiments, another stabilized oil layer can be added to the system in FIG. 17a, confining the large volume of oil in the test tube between two oil layers like that depicted in FIG. 17b.

DEFINITIONS

Figure 11A:
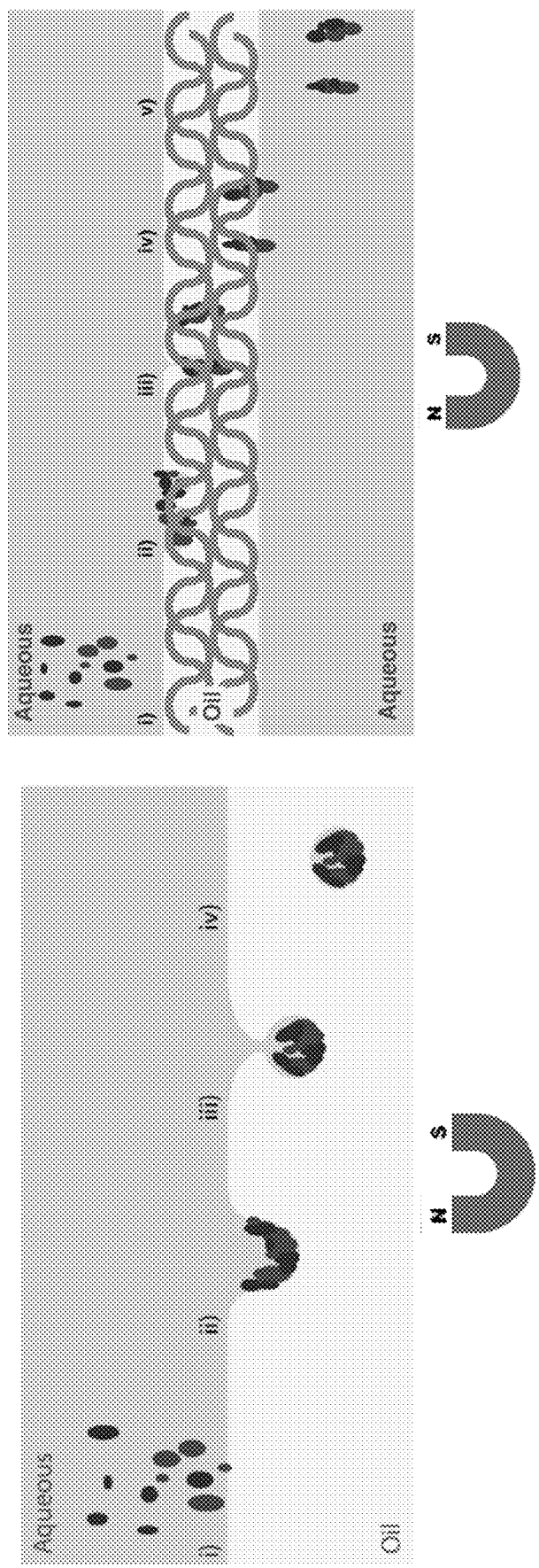
FIG. 11A-11C show an embodiment of a system of the invention for isolation and detection of analytes.
Figure 11B:
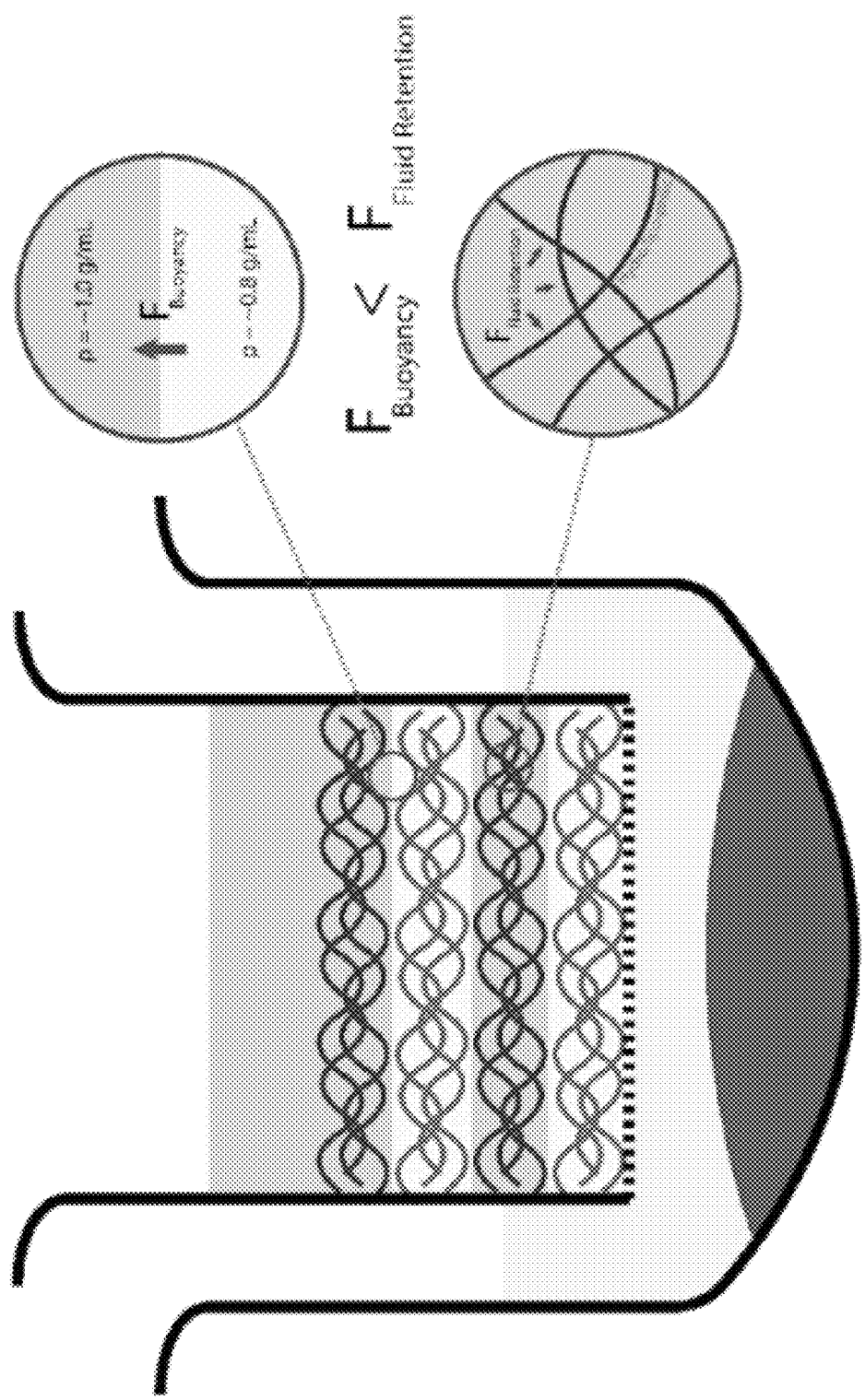
Figure 11C:
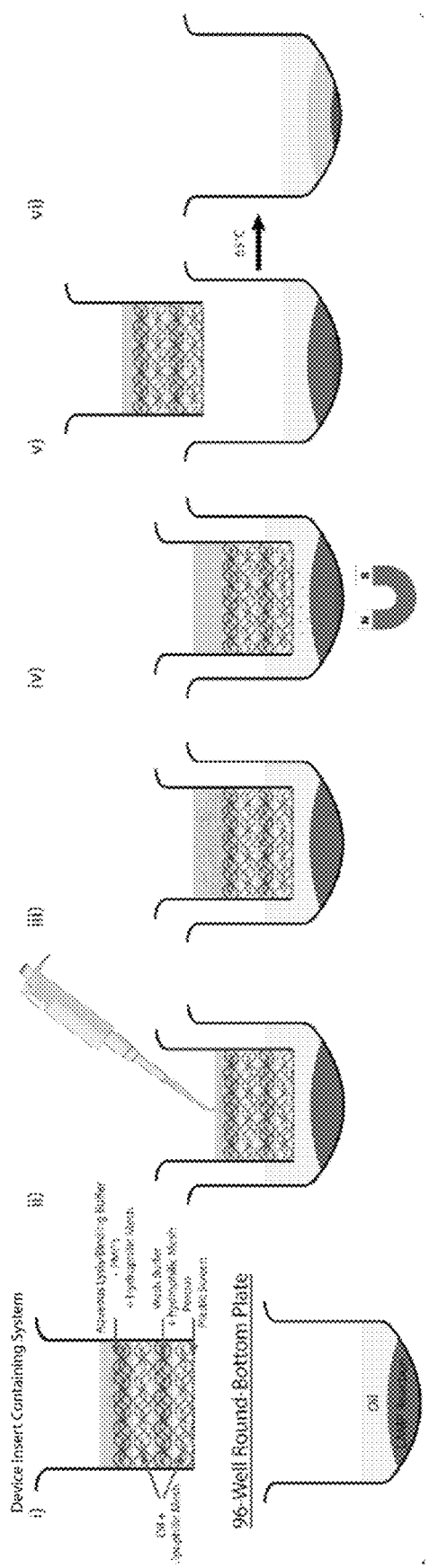

As used herein, the term "container" means any device, receptacle, or vessel capable of holding a system of the invention and includes any device, receptacle, or vessel in which a method of the invention may be performed. In some embodiments, the container is a cylinder. In some embodiments, the container is portable. Vessels and containers include, for example, any vessel, container, receptacle, holder, carrier, cartridge, bottle, plate(s), well(s) or storage device capable of holding a described system. In some embodiments, the vessel is an injection-molded container with labels or raised lettering inscribed at the time of manufacturing to eliminate the need for some or all external labeling. In some embodiments, the container is a disposable or single-use container. Vessels and containers may be cooled or heated, or capable of being cooled or heated, by external or built-in or added internal means. Vessels and containers may provide for the stability and maintenance of fluids, including the one or more phases and layers of the invention, during manufacture, storage and shipment. Vessels and containers may provide for movement of fluids during use of the systems and methods of the invention. Vessels and containers that can house systems of the invention or be used to perform methods of the invention include reaction plates and microtiter plates, including 24-well PCR plates, 96-well plates and 384-well plates and other plate formats. Vessels and containers may provide for electrical, optical, mechanical and liquid interfaces and utilities, including for the use of detection and quantification reagents. In some embodiments, a container comprises a top opening to permit addition of a sample to the container. In some embodiments, the first aqueous phase is closest to the top opening of the container. In some embodiments, the first oil phase is closest to the top opening of the container. In some embodiments, the first aqueous phase comprises a lysis buffer. In some embodiments, the second aqueous phase comprises a wash buffer. In some embodiments of a system or device of the invention, the container or construct containing the system has no integral bottom. In some embodiments, the container has only sides and is open on both ends. In one such embodiment, the container is an insert, an example of which is shown in FIGS. 11B and 11C. In such embodiments, the sample may be added to a layer or phase designated as a "first" or "sample receiving" phase or layer. In the example of an insert shown FIG. 11C, the terminal layer is a porous plastic screen. The terminal layer a device or system of the invention that allows the addition of a sample to a container or device that does not contain a bottom integral with its sides can be a mesh or any porous material to hold the system and allow it to be run as described. In some embodiments, an open end is used to allow removal of target or target-binding particles (e.g., PMPs) from the system (e.g., using a magnet). In some embodiments, the target or target-binding particles are removed into another vessel or container (e.g., a multi-well plate), or into or onto a detector (e.g., a reader, a blue-tooth enabled reader or instrument, etc.) that can accept said target or target-binding particles, or onto or into a surface or porous material (e.g., a spot card for drying and transport of sample for later analysis, etc.).

As used herein, the terms "phase" or "layer" are used interchangeably and refer to a region of a substance (stabilized or unstabilized as described herein) bounded by one or more other substances. Phases or layers include aqueous layers, oil layers, gaseous layers, emulsion layers, particle suspension layers, as well as stabilized versions of such layers or other layers used in a system, device or method. An example of a phase or layer would be a volume of air surrounded by water. Although water and air are miscible (per Henry's law), the liquid form of water and gaseous form of air are not generally considered to substantially mix. Stabilized phases or layers as described herein are compositions of matter of the invention. Stabilized phases or layers comprise devices and systems of the invention, are used in methods of the invention.

As used herein, the term "oil" refers to any of numerous substances, usually liquid or semi-solid substances, that do not dissolve in water. The substances are sometimes greasy substances, and sometimes are from plant, animal, or mineral sources but can also be non-greasy substances. Oils include carbon- and silcone-based polymeric compounds, mineral oils, silicone oils, paraffin waxes, and fluorinated oils, for example. Oils also include mixtures of oils (e.g. waxes with different melting temperatures; polymeric oils with different chain lengths; mineral oil and silicone oil; etc.). Oils also include oil-oil emulsions.

As used herein, the term "oil layer" or "oil phase" means a layer in a system of the invention that compromises oil and is substantially hydrophobic and does not substantially mix with an aqueous layer. Suitable oil layers in systems of the invention include, for example, mineral oil, coconut oil, vegetable oil. As noted, other oils include carbon- and silcone-based polymeric compounds, mineral oils, silicone oils, paraffin waxes, and fluorinated oils, for example.

As used herein, the term "interface" means a surface forming a common boundary or transition zone between adjacent regions, bodies, substances, phases or layers. In some embodiments, an interface refers to the point or transition zone at which independent phases or layers in the systems, devices and methods of the invention are in contact with one another. For example there is a transition zone between water and air due to the miscibility of water with air (i.e., per Henry's law and diffusion-based mixing), transitioning from liquid water, to air saturated with water, to air with some non-saturated level of water. One example of a transition zone within a phase or layer is water with different levels of salinity where differences in density allow for regions with different properties with a transition zone between the regions with intermediate levels of salinity.

As used herein, the term "aqueous" means water-based, comprising water, using or having water as an ingredient. In some embodiments, aqueous mediums or regions contain water and other components. Lysis buffers, wash buffers, and the like may comprise aqueous layers as described in embodiments of systems and methods of the invention. In some embodiments the water-based medium contains various concentrations (e.g. 1%, 10%, 20%, 30%, 40%, 50%, 60%, 70%, 80%, 90%, 99%, 99.9%) of other water-soluble substances such as salts or ionic liquids (e.g. ammonium sulfate, guanidine isothiocyanate, cyanine dyes, tetraethylammonium and tetrabutylammonium, etc.), polar solvents (e.g. ethanol, phenol, methanol, acetonitrile, etc.), acids/bases (e.g. sulfuric acid, acetic acid, sodium hydroxide, etc.), sugars (e.g. sucrose, glucose, mannose, etc.), or polymer (e.g. polyethylene glycol, hyaluronic acid, chitin, collagen I etc.).

In some embodiments, a phase(s), layer(s) or region(s) in devices, systems, methods and compositions of the invention may be an emulsion, e.g. a dispersion of droplets of one liquid in another in which it is not soluble or miscible.

In some embodiments, a non-oil liquid phase or layer may be used that is not water-based, e.g., 100% ethanol, phenol, acetonitrile or other compatible solvents. These may be referred to as a "non-oil/non-aqueous" phase or layer.

An aqueous layer, phase or region is a water-based layer, phase or region. An aqueous layer comprises water. As used herein, in some embodiments, the term "aqueous layer" or "aqueous phase" means an aqueous region bounded or surrounded by any "non-aqueous" substances, e.g. device plastic, atmosphere/gaseous substance, oil, wax, etc. In some constructs, an aqueous layer does not need to be homogeneous and can have transition zones between multiple aqueous regions with different properties in one aqueous layer, e.g., the layer may contain two aqueous medium regions with different densities.

As used herein, the term "porous" means having pores or other small spaces that can hold a gas or liquid or allow a target (or non-target) as defined herein (whether bound or unbound to, or part of, a solid phase or other carrier) to pass through, or not pass through, as desired. Reference to "porous material" or structure, or to a "porous mesh" or "porous layer" means a material comprising void spaces, i.e., spaces not occupied by the main framework of atoms that make up the structure of the material. A material through which a target (bound or unbound to a solid phase) to pass through is an example of a porous material. A material through which non-target materials but not a target (bound or unbound to a solid phase) do not pass through is also an example of a porous material. A porous material or structure, a porous mesh or a porous layer does not need to be constructed of, or consists of, a single material, i.e., it does not need to be homogeneous. A porous material or structure, a porous mesh or a porous layer for use in systems, devices, methods and compositions of the invention may comprise different materials, i.e., it may be heterogeneous or inhomogeneous (e.g., in one embodiment, comprising polystyrene and nylon or spatially variable mixtures).

As used herein, the terms "detect", "detecting", or "detection" may describe either the general act of discovering or discerning, or the specific observation of a detectably labeled composition. The term "detecting" when used in reference to a target in a sample refers to detecting either the presence or the absence of the target in the sample. In some embodiments, "detecting" a target in a sample refers to determining that the target is present in the sample. In some embodiments, "detecting" a target in a sample refers to determining that the target is not present in the sample or is not present in sufficient quantities to be detected in the sample.

As used herein, the term "biological sample" is used in the broadest sense and is inclusive of many sample types that may be obtained from a subject. Biological samples may be obtained from animals (including humans) and encompass fluids (e.g. urine, blood, blood products, sputum, saliva, etc.), solids, tissues (including biopsy tissue, tumor tissues, bone marrow, etc.), and gases. Biological samples include saliva, blood products, such as plasma, serum and the like. In some embodiments, the biological sample is a nasopharyngeal sample, an oropharyngeal sample, oral swab or sponge sample, a nasal swab sample, a mid-turbinate sample, or a saliva sample. In some embodiments, the biological sample is a saliva sample. The term "saliva sample" as used herein includes, for example, a sample of saliva collected from a subject. In some embodiments, the biological sample is a nasopharyngeal (NP) sample. A "nasopharyngeal sample" refers to a sample collected from the nasopharyngeal cavity of a subject and includes, for example, a specimen collected using a swab inserted into the nasal cavity or nasopharynx of a subject. The biological sample may be subjected to various pretreatment steps prior to performing a method as described herein. For example, the biological sample may be frozen, heated, mixed with various denaturants (e.g. guanidium thiocyanate), mixed with viscosity reducing reagents (e.g. DTT), mixed with inhibitors of target degradation (e.g. protease inhibitors, RNAse inhibitors, etc.), mixed with various buffers, or subjected to other suitable pre-treatment steps. Any of the substances added to the biological sample (e.g. denaturants, viscosity reducing reagents, inhibitors of target degradation, buffers, etc.) may be added to the biological sample or may be present in a storage buffer present in a container into which the sample is collected (e.g. present within a storage buffer in a sample collection tube or other collection device or container). In some embodiments, samples contain or are suspected of containing a microorganism (e.g. a live or attenuated pathogenic or disease-causing microorganism).

The term "sample" as used herein is used in the broadest sense and is inclusive of many sample types. In some embodiments, the "sample" is a "biological sample", as described above. In other embodiments, the sample may be an environmental sample, such as a sewage sample which are useful, for example, for environmental- and wastewater-based epidemiology. Thus, in some embodiments, a "sample" will refer to a portion of material taken or selected from a larger quantity of material. In some embodiments, sample refers to any material containing or suspected of containing a target. In some embodiments, the sample is an entire quantity of material, e.g., blood. In some embodiments, the sample is blood, cerebrospinal fluid, urine, tissue, biopsy tissue, etc. Any type of sample containing or suspected of containing a target of interest is contemplated for use in the systems and methods of the invention.

The term "preference," in the context of two fluids interacting with a substrate, e.g. a mesh, as used herein can be defined using the contact angle of the interfacing fluids with the substrate. Association of a fluid with a solid surface substrate, for example, at an interface is dictated by the surface properties of the substrate, and the chemical properties of the two fluids, be it liquid-liquid, liquid-gas, or gas-gas. A contact angle for a fluid-fluid-material combination is routinely used to quantify the equilibrium of this interaction and can be impacted by many factors such as temperature, pressure and surface charge. The contact angle is the angle between the surface of the substrate and the tangent of the fluid interface where the fluid interface intersects the substrate. The "preferred" fluid, or the fluid with preference is the fluid whose contact angle is <90°. In some examples, these preferences are in the nature of hydrophobic and hydrophilic preferences. Some can be categorized based on the contact angle: e.g. (i) superhydrophilic ($0°≤θ<10°$), (ii) hydrophilic ($10°≤θ<90°$), (iii) hydrophobic ($90°≤θ<150°$), and (iv) superhydrophobic ($150°<θ≤180°$). In general, a superhydrophobic surface shows a water contact angle higher than 150° and a sliding angle less than 5°. These preferences are relevant also to other embodiments of the invention that provide a stabilized interface system and method, and related compositions. Substrates, support materials, meshes and porous substrates and porous support materials and meshes may be selected based on preferred interfaces and associations with one or more fluids. This includes selection based on fluid preference which impacts whether a mesh and fluid can be associated to achieve functional performance. Depending on the conditions, nature of the fluid or the material, the preference of the material for the fluid(s) may also change, or be changed (e.g., materials with different preferences may be selected for different layers or conditions, such as, for example, PP-water-mineral oil vs. PP-water-silicone oil, PP-water-oil at 20° C. vs. PP-water-oil at 6° C.) In some embodiments, fluids (e.g., oil added to replace air) or conditions (e.g., temperature) may be changed or swapped out and replaced during the use of, or as part of, a method of the invention. For example, an aqueous phase or layer may be replaced with an oil phase or layer, or temperature may be changed for performance or ease of use.

Some substrates with a preference are porous materials. Some substrates with a preference are porous structural materials. Some substrates with a preference are meshes. Some porous materials, porous structural materials and meshes are hydrophilic. Some porous materials, porous structural materials and meshes are selected for their degree of hydrophilicity. Some porous materials, porous structural materials and meshes are hydrophobic. Some porous materials, porous structural materials and meshes are selected for their hydrophobicity.

The term "stabilized" as used herein in reference to components of a system or device described herein indicates that the components maintain functionality for their intended purpose(s), or remain immiscible with one another over the course of transport, storage, and/or use of the system. By "immiscible" is meant components that do not naturally or typically naturally or typically form a homogeneous mixture. In general, a stabilized component (e.g. phase or layer) remains functionally apart from another component (e.g. another phase or layer). By functionally apart from is meant a phase or layer that by itself performs, or continues to perform, a function in a system, method or device of the invention. For example, the aqueous and oil phases or layers of a system described herein are typically immiscible with one another (e.g. the phases or layers remain substantially separated from one another and do not form a homogenous mixture). "Stabilized" may also be used to indicate that this immiscibility of the aqueous and oil layers and/or gas phases or layers remains throughout the life of the system or device, or during performance of the method. For example, a supporting structure used to stabilize a layer may substantially dissolve during use (e.g., sucrose initially dried into a mesh structure after wetting with addition of aqueous medium), altering association of the fluid with the structure in a desired manner and potentially changing fluid preference. An interface can be a common boundary between a phase or layer, a transition zone between a phase or layer, and transition zone within a phase or layer, for example. Therefore, "stabilized" regions within a phase or layer need not be "immiscible." The regions within a phase or layer can also be considered stabilized where the components form a stable transition zone within a layer or phase.

As used herein, a "stabilized layer or phase" refers to a layer or phase (e.g., an aqueous, oil, or gaseous layer or phase) that is associated with a supporting structure that has preference for the fluid of that layer or phase relative to at least one other fluid. Preference of the structure for the associated layer or phase helps to stabilize the association of the layer or phase (e.g. fluid) with the supporting structure and prevent disruption of the phase or layer during interactions with other phase(s) or layer(s). As such, other potentially disrupting phase(s) or layer(s) or fluid(s) does not have to be part of the system of the layers or phases or positioned immediately adjacent to the layer or phase and may only sometimes come into communication with the layer or phase (e.g., stabilization might be used as a safety measure against unforeseen interactions with fluids not typically in the system, or in adding an extraneous material, e.g., a sample, to the system. In some embodiments, the supporting structure of a stabilized layer is porous in nature, allowing at least some substance, e.g., one more desired substances, through the structure. The supporting structure does not necessarily have to be fixed or bound in orientation or position but primarily serves to promote association of the preferred fluid to the structure. Further, the supporting structure need not be permanently associated with a particular phase or layer but may be repositioned for removal from the system or be associated with a different phase or layer. A phase or layer can be repositioned, for example, by manipulating the solid substrate such that it is forcefully removed from the phase or layer it was associated with. This may be done, for example, in order to isolate targets that were negatively selected for. Likewise, stability afforded by the support structure allows the stabilized phase or layer to be repositioned or reoriented or passed through other fluids if needed.

As used herein, "associated with" means involved, combined or connected with, in whole or in part. The phrase "associated with" includes functionally associated with, or connected with. In some embodiments, for example, a substrate, solid phase or structural material (e.g. a mesh) is associated with a phase or layer if—wherever a substrate, solid phase or structural material in located or positioned within a system or device of the invention in relation to a phase or layer—it provides a stabilizing function to the phase or layer. A substrate, solid phase or structural material need not be immersed within a phase or layer to be associated with or provide stabilizing function to the phase or layer.

As used herein, the term "immersed" means under the surface of a liquid, in whole or in part. Thus, for example, a mesh may be wholly submerged or within in a liquid phase or layer, or it may be at, near, or on the surface of a phase or layer, or may be only partly but not wholly within it. A phase or layer may comprise or consist essentially of a porous substrate, solid phase or structural material. A phase or layer may be a porous substrate, solid phase or structural material comprising or consisting essentially of an oil phase or layer, or the oil layer or phase may comprise or consist essentially of the porous substrate, solid phase or structural material. In some embodiments, for example, a mesh (one example of a porous substrate, solid phase or structural material) can be wholly or partly in oil, or the oil phase or layer may comprise or consist essentially of oil within a mesh. In some embodiments, for example, a mesh (or other porous substrate, solid phase or structural material) can be wholly or partly in an aqueous liquid phase or layer, or the aqueous phase or layer may comprise an aqueous liquid within a mesh.

The term "stack" or "stacked" as used herein refers to substances (e.g. aqueous phase or layer, oil phase or layer, gaseous phase or layer, porous materials, hydrophobic mesh, hydrophilic mesh, etc.) within the system disclosed herein that are aligned (or not aligned) with each other axially along an axis, for example, the Y-axis (e.g. in a vertical fashion) within a container or the X-axis (e.g. in a horizontal fashion) within a container. The layers may be in any desired 3D orientation. The layers do not have to be planar, and the arrangements can be as desired. For example, the system may comprise a plurality of porous materials that are "stacked" within the container. The term does not necessarily indicate that the porous materials are in direct contact with each other within the stack. Rather, the porous materials may be spaced apart or in direct contact in some areas and spaced apart in other areas. Porous materials may be associated with or separated by an aqueous phase or layer (e.g. wash buffer, lysis buffer) and/or associated with or separated by an oil phase or layer (e.g. mineral oil, coconut oil).

The term "subject" as used herein refers to an entity from which a biological sample is obtained. The subject may be a mammal. In some embodiments, the subject is a human. In some embodiments, the subject is not a mammal, but an inanimate object. In some embodiments, the subject is the environment.

The term "target" is used in the broadest sense and refers to any desired material, including any material within a sample. Targets include, in one embodiment, any material that may bind a paramagnetic particle or other solid phase—either directly, or indirectly, for example, via a conjugated antibody or antibody fragment—and be pulled from a sample by application of a magnetic force. In some embodiments, the target is a protein (e.g. antibody, hormone, etc.), carbohydrate (e.g. glycogen, chitin, etc.), whole cell, cellular component (e.g. mitochondria, exosome, nucleus, etc.), or a nucleic acid (e.g. DNA, RNA). In some embodiments, the target is a metabolite, a carbohydrate, a glycopeptide, or a lipid. Targets include analytes. Targets can also include material that is not of interest and is instead being removed to enrich for material of interest (e.g., in negative selection). In some embodiments, targets are substances that are moved, separated, isolated, detected, identified, analyzed, screened for, quantified, or purified, for example.

The terms "analyte" or "target analyte" refer to any substance being identified or measured.

A "magnet" for use in a system, device or method of the invention refers to a means for generating magnetic force. As used herein, magnets include permanent magnets, temporary magnets and electromagnets.

DETAILED DESCRIPTION

The invention comprises multi-layer and multi-phase systems within a container that provide for autonomous operation of processing steps by the operation of a force to position a target.

In one aspect, the invention provides a self-contained system and device for sample preparation and target testing (e.g., PCR, LAMP, etc.) performed in a single container requiring only addition of a sample, application of a force (e.g. a magnetic force) and, in some embodiments, reading a result.

In some aspects, provided herein are systems, methods and devices for isolating or positioning a target from a sample and processing the target. In some embodiments, the target of interest is the target itself. In some embodiments, the target of interest is the target is bound to a solid phase or is the solid phase itself. In some embodiments, the target is isolated and detected. In some embodiments, the target is purified. In some embodiments, the target is quantified. In some aspects, provided herein are systems, devices, compositions and methods for positioning and/or processing a target. Targets or materials to which targets are bound may be positioned according to the invention in a number of ways, including positively (by isolating a target, for example, or removing a target from a sample, for detection or measurement or disposal) and negatively (by positioning or removing one or more or all non-targets). Using the systems, devices and methods of the invention, targets can be moved, separated, isolated, detected, identified, analyzed, screened for, quantified, or purified using the systems, devices and methods of the invention. The systems, devices and methods of the invention include systems, devices and methods for the isolation and/or detection of a target or analyte (including pathogens or parts of pathogens, e.g., proteins, nucleic acids, etc.) in a sample. In particular, provided herein is a system and a device comprising one or more oil and/or one or more aqueous phases and/or one or more gas phases stabilized in close proximity to each other. The systems, devices and methods of the invention have many uses. For example, they may be used for isolating, separating, moving, purifying, mixing, binding and/or subsequently detecting the presence or amount of a target or target analyte from a sample or other mixture.

In some aspects, provided herein is a system and a device comprising one or more stabilized oil and/or one or more stabilized aqueous phases and/or one or more gas phases that may be used to move or purify a target or analyte away from a sample or mixture that contains, may contain, or is or may be suspected of containing the target or analyte using a force. Forces include any force, including magnetic, electric, convective, or acceleration-based force (e.g., via gravity or via a centrifuge), for example, to draw the target or analyte through one or more phases or layers.

In some embodiments, the system and the device comprises reagents for detection, identification, analysis, isolation or quantification of the target or analyte. The quantification may be positive-negative for the target, semi-quantitative or quantitative. The isolation or purification may be complete or partial. One or more or all of the reagents for detection, identification, analysis, isolation or quantification of the target or analyte may be contained in one or more parts or portions of the system or device, in one or more aqueous and/or oil phases or layers of the system or device, for example, in a base phase or layer of the system or device. In some embodiments, one or more or all of the reagents for detection, identification, analysis, isolation or quantification of the target are contained in a lower phase, layer or stratum of the system or device, but above the base layer. In some embodiments, one or more or all of the reagents are in a lower phase, layer or stratum of the system or device, or in a terminating or terminal phase, layer or stratum of the system or device (in vertical or latitudinal embodiments). In some embodiments, one or more or all of the reagents in a seam, abutment or joint (in horizontal or longitudinal or other phase/layer orientations in non-vertical or non-latitudinal embodiments). In some embodiments, one or more or all of the reagents for detection, identification, analysis, isolation or quantification of the target are contained in a terminating or terminal phase, layer or stratum of the system or device (in vertical or latitudinal embodiments), or in a seam, abutment or joint (in horizontal or longitudinal or other phase/layer orientations in non-vertical or non-latitudinal embodiments). These are examples of reagent placement, but do not include all possible placements, which will be as desired or as appropriate in light of the conformation of the system or device, or the desired performance.

The systems described herein may be used in methods of isolating any desired target or material. In some embodiments, the target is nucleic acid. In some embodiments, the target is viral nucleic acid. For example, the target may be s SARS-CoV-2 nucleic acid. In some embodiments, the target is a protein (e.g., a hormone or any other protein), a carbohydrate, a glycolipid, a cell, a circulating tumor cell, etc. Any material that may be bound to a PMP (either directly or indirectly) may be a target in one or more of the systems, devices, compositions and methods of the invention.

In some embodiments where the system, method or device comprises at least one aqueous phase or layer and at least one oil phase or layer, only the at least one aqueous phase or layer and at least one oil phase or layer are stabilized.

In some embodiments where the system, method or device comprises more than one aqueous phase or layer and one or more oil phases or layers, only one of the aqueous phases or layers is stabilized. In some embodiments where the system, method or device comprises more than one aqueous phase or layer and one or more oil phases or layers, more than one or all of the aqueous phases or layers are stabilized. For example, in an embodiment of the invention with four aqueous phases or layers, one, two, three or all four may be stabilized. In some embodiments where the system, method or device comprises more than one aqueous phase or layer and one or more oil phases or layers, only one of the oil phases or layers is stabilized. In some embodiments where the system, method or device comprises more than one oil phase or layer and one or more aqueous phases or layers, more than one or all of the oil phases or layers are stabilized. For example, in an embodiment of the invention with four oil phases or layers, one, two, three or all four may be stabilized.

In another embodiment of the invention where the device, system or method includes aqueous phases or layers and/or multiple oil phases or layers, for example, 1-6 aqueous phases or layers and 1-6 oil phases or layers, from 1-6 of the aqueous phases or layers and/or from 1-6 of the oil phases or layers may be stabilized.

In some embodiments, the device, system or method comprises at least one stabilized aqueous phase or layer. In some embodiments, the at least one aqueous phase or layer is stabilized by a hydrophilic porous material immersed, on, in, or otherwise associated with the at least one aqueous phase or layer. In some of these embodiments, the device, system or method comprising at least one stabilized aqueous phase or layer does not include an oil phase or layer or a stabilized oil phase or layer. In some embodiments, the device, system or method comprising at least one stabilized aqueous phase or layer also comprises a gaseous phase or layer. In some embodiments, the gaseous phase or layer comprises, for example, air or an inert gas. In some embodiments, the gaseous layer comprises helium, neon, argon, krypton, xenon, radon or oganesson, for example. A gas may be a mixture of gases (e.g., air; air with volatiles; helium and neon, etc.). A gas may be in plasma form. In some of these embodiments, the device, system or method comprising at least one stabilized aqueous phase or layer includes at least one oil phase or layer and/or at least one stabilized oil phase or layer. In some of these embodiments, the device, system or method comprising at least one stabilized aqueous phase or layer includes at least one oil phase or layer and/or at least one stabilized oil phase or layer and at least one gaseous layer or phase. In some embodiments, the device, system or method comprises at least two stabilized aqueous phases or layers. In some embodiments, the device, system or method comprising at least one stabilized aqueous phase is within a vessel or container. In some embodiments, the device, system or method comprises at least one stabilized aqueous phase or layer and at least one gaseous phase or layer but not an oil phase or layer.

In some embodiments, the device, system or method comprises at least one stabilized oil phase or layer. In some embodiments, the at least one oil phase or layer is stabilized by a hydrophobic porous material associated with the at least one oil phase or layer. In some of these embodiments, the device, system or method comprising at least one stabilized oil phase or layer does not include an aqueous phase or layer or a stabilized aqueous phase or layer. In some embodiments, the device, system or method comprising at least one stabilized oil phase or layer also comprises a gaseous phase or layer. In some embodiments, the gaseous phase or layer comprises, for example, air or an inert gas. In some embodiments, the gaseous layer comprises helium, neon, argon, krypton, xenon, radon or oganesson, for example. In some of these embodiments, the device, system or method comprising at least one stabilized oil phase or layer includes at least one aqueous phase or layer and/or at least one stabilized aqueous phase or layer. In some of these embodiments, the device, system or method comprising at least one stabilized oil phase or layer includes at least one aqueous phase or layer and/or at least one stabilized aqueous phase or layer and at least one gaseous layer or phase. In some embodiments, the device, system or method comprises at least two stabilized oil phases or layers. In some embodiments, the device, system or method comprising at least one stabilized oil phase is within a vessel or container. In some embodiments, the device, system or method comprises at least one stabilized oil phase or layer and at least one gaseous phase or layer but not an aqueous phase or layer.

In some embodiments, the least one aqueous phase or layer or the at least one oil phase or layer is stabilized within a vessel or container using a porous material. The material is selected to allow the movement of desired materials through the device or system. The porous material may be a mesh. In some embodiments, one or more of the least one aqueous phase or layer is/are stabilized with at least one hydrophilic porous material(s) or mesh(es). In some embodiments, one or more of the least one oil phase or layer is/are stabilized with at least one hydrophobic porous material(s) or mesh(es). In one embodiment the porous material and/or the hydrophobic and/or hydrophilic mesh has at least one predetermined pore size, set of pore sizes or range of pore sizes. In some embodiments, aqueous and oil phases or layers are stabilized in proximity to one another within a container.

In some embodiments, the one or more phases or layers may be stabilized within the container by modulating material geometry or one or more chemical or physical material characteristics selected from density, surface chemistry, and porosity of a hydrophilic/hydrophobic porous material, if present in the system.

In another aspect, the invention provides a miscible interface system and method, and related compositions, referred to herein as "MIFT." In some MIFT embodiments, the one or more phases or layers may be stabilized within a container by modulating material geometry or one or more chemical or physical material characteristics selected, for example, from density, surface chemistry, viscosity, electrical or surface charge properties, magnetic properties, and porosity of a hydrophilic/hydrophobic porous material, if present in the system. In some embodiments, materials include natural and synthetic porous matrices (e.g. sea sponge, nylon foam, polypropylene sponge, agarose gel, etc.), natural and synthetic porous materials (e.g. polysaccharide mesh, nylon mesh, etc.). Examples of modulating material geometry include material size and thickness, pore size(s), pore distribution(s), porosity or porosities and the degree or homogeneity of pore connectivity. Examples of modulating surface chemistry include oxygen plasma treatment (i.e. addition of hydroxyl groups to the surface of a material) and glycosylation. Examples of modulating viscosity include use of different concentrations of methylcellulose or polyethylene glycol. Examples of modulating surface charge include different levels of treatment with oxygen plasma or Piranha solution or modulation concentration or gradients of pH or salinity or charge shielding molecules like surfactants in the associated fluid. Examples of modulating the electrical properties of a material include the use of materials with different dielectric properties or the application of charge or current to the material. Examples modulating the magnetic properties of material would be inclusion of different levels of ferromagnetic, paramagnetic, or diamagnetic substance by changing concentration of the included substance or potentially porosity (i.e., ratio of pore volume to material volume) of the material at a given substance concentration within the material.

In some embodiments of MIFT, one or more regions of a phase or layer are stabilized. In some embodiments, a phase or layer contains fluid with multiple regions with different properties or gradients of properties (e.g., fluids with transition zones between different densities and/or density gradients). Within an aqueous layer containing a transition zone, with one fluid being denser than the other for example, if the size of the container is sufficiently large enough, gravitational, convectional, or turbulent forces will induce homogenization/bulk mixing between the two fluids and the rapid dissolution of the transition zone. As the size of the container decreases, hydrodynamic resistance increases which can reduce the velocities resulting from any source of pressure differential (e.g., advection, convection, etc.) such that transport of particles or molecules via diffusion can dominate or prevail over transport arising from bulk fluid motion (e.g., convection, advection, etc.). In some embodiments, the state of being diffusionally-dominated or diffusion-prevailing may be described using the Peclet number. At diffusionally-dominated or diffusion-prevailing dimensions, transition zone dissolution occurs more slowly, for example, over minutes to hours or days. In some aspects, provided herein are systems, devices, and compositions for stabilizing an aqueous layer containing at least one transition zone such that transport is diffusionally-dominated or diffusionally-prevailing. In some embodiments this is accomplished using a porous solid or semi-solid structure or material (e.g., a mesh, gel, or aggregate of solid or semi-solid particles). The same can be done for other types of phases or layers such as oil or gaseous layers or phases. This embodiment is referred to as a miscible interface system and may be used to stabilize the properties of different fluid regions and or transition zones within a phase or layer. A MIFT miscible interface system may be wholly stabilized as described and need not contain one or more structural supports associated with a phase or layer. In some embodiments, stability of fluid regions or transition zones may be provided by sufficient reduction of phase or layer dimensions or inclusion of an emulsion within a phase or layer. In some embodiments of a miscible interface system, a material (e.g. target-binding particles) can be included in one fluid region of the phase or layer and positioned into another fluid region (e.g., positioning PMPs with a magnet, or leveraging gravity and the density of the particles). One example of such an approach is providing an aqueous phase or layer with sufficient depth to hold both a volume of aqueous wash buffer and a volume of aqueous sample containing another substance (e.g. PMPs.) In this example, one can add wash buffer to the porous support structure, allowing gravity to position the bulk of the fluid to the bottom half of the support structure. In this example, the aqueous sample with PMPs, for example, could then be added to the porous supporting structure. The result is a phase or layer with primarily two aqueous regions with different properties. Subsequent application of a force (e.g. a magnetic field in the case of PMPs) can then be used to draw a material (e.g., target-binding PMPs) into the wash buffer region without significant contamination or carryover from the sample region. A specific advantage of this system is that the stabilized miscible aqueous fluids provide a means for isolating or cleaning up or concentrating a sample with little carryover and little to no energy barrier that might prevent moving or positioning a target (e.g., compared to positioning target-binding PMPs through an aqueous-oil interface). Such miscible interface systems and compositions can be integrated with one or more stabilized interface systems to create new functionality. In some embodiments, the invention provides a miscible interface composition in combination with a stabilized interface system. The invention includes multiple MIFT-SIFT combinations as compositions and for use in devices and systems of the invention.

Miscible interface systems and compositions of the invention of the invention can be assembled and manufactured as described herein. To create a stabilized miscible layer, involving two miscible fluids of differing densities for example, the first fluid is added to a container. A porous support material, with a preference for the two fluids, cut to the appropriate dimensions (e.g. diameter, thickness, etc.) such that the material may be press-fit into place once inside the container, is submerged in the first fluid. The second fluid is then added to the container along with another porous support material, with a preference for the two fluids, cut to the appropriate dimensions (e.g. diameter, thickness, etc.). In some embodiments, no support material is used.

In another aspect, the invention provides a stabilized interface system and method, and related compositions, sometimes referred to herein as SIFT. In some embodiments, compositions of the system and method comprise at least two fluids that can form a stable fluid-fluid interface and at least one associated structural material with at least one pore having a preference for a fluid. In some embodiments, at least one of the at least two fluids is an aqueous fluid. In some embodiments, the structural material with at least one pore having a preference for a fluid is associated with an aqueous fluid. In some embodiments, at least one of the at least two fluids is an oil. In some embodiments, the structural material with at least one pore having a preference for a fluid is associated with an oil. In some embodiments, one of the at least two fluids is a gas. The structural material comprises, consists essentially of, or consists of natural and/or synthetic substance(s). In some embodiments, one or more or all of the characteristics of the structural material may be uniform. In some embodiments, one or more or all of the characteristics of the structural material may be nonuniform, for example structural material may undergo phase changes from solid to liquid (e.g. a porous structural material composed of wax which melts upon heating), or they may dissolve or be altered upon addition of a reagent (e.g., a mesh laden with dried sucrose to reduce the pore size of the material and then allow re-expansion of pore size after addition of aqueous fluid as the sucrose dissolves or to reveal a more hydrophobic material beneath the hydrophilic sucrose as the sucrose dissolves, or alternatively porous structural material composed of protein which deteriorates upon addition of trypsin, etc.). In some embodiments of the stabilized interface systems and methods, the pore or pores in the structural material each comprise an opening that allows passage of at least one fluid and at least one entity of interest (e.g. a target) through the material. In some embodiments, the structural support is able to stabilize at least one interface between fluids. In some embodiments, materials include natural and synthetic components (e.g. Chitin, Collagen I, polypropylene, nylon, etc.).

In some embodiments of the stabilized interface system and method/composition, the structural material is a mesh. In some embodiments, materials include natural and synthetic porous matrices (e.g. sea sponge, nylon foam, polypropylene sponge, agarose gel, etc.), natural and synthetic porous materials (e.g. polysaccharide mesh, nylon mesh, etc.). Examples of modulating material geometry include material size and thickness, pore size(s), pore distribution(s), porosity or porosities and the degree or homogeneity of pore connectivity. Examples of modulating surface chemistry include oxygen plasma treatment (i.e. addition of hydroxyl groups to the surface of a material) and glycosylation. Examples of modulating viscosity include use of different concentrations of methylcellulose or polyethylene glycol. Examples of modulating surface charge include different levels of treatment with oxygen plasma or Piranha solution or modulation concentration or gradients of pH or salinity or charge shielding molecules like surfactants in the associated fluid. Examples of modulating the electrical properties of a material include the use of materials with different dielectric properties or the application of charge or current to the material. Examples modulating the magnetic properties of material would be inclusion of different levels of ferromagnetic, paramagnetic, or diamagnetic substance by changing concentration of the included substance or potentially porosity (i.e., ratio of pore volume to material volume) of the material at a given substance concentration within the material. In some embodiments of the stabilized interface systems, compositions and methods, the structural material, the dimensions of the structural material are the same, or about the same, as the dimensions of the fluids phases or layers with which it is associated. In some embodiments of the stabilized interface systems, compositions and methods, the structural material, the dimensions of the structural material are less than the dimensions of the fluid phases or layers with which it is associated. In some embodiments of the stabilized interface systems, compositions and methods, the structural material, the dimensions of the structural material are greater than the dimensions of the fluid phases or layers with which is it associated (e.g., extending out of the phase or layer or folded/bent within the phase or layer). In some embodiments, two or more different structural materials can be used within a single phase or layer to create a stabilized phase or layer (e.g., nylon and polystyrene can be used together to stabilize an aqueous phase or layer, or two meshes of the same molecular makeup but of different geometry or pore size, etc.).

In some embodiments of the stabilized interface system and method/composition, the structural material may be firm. In other embodiments, the structural material may be flexible or elastic. For example, a porous mesh used in stabilizing a phase or layer may be bendable or stiff or transition between stiff and flexible (e.g., via application of different temperatures).

In some embodiments of the stabilized interface systems, compositions and methods, the structural material has preference for oil relative to another fluid. In some embodiments, a porous structural material associated with oil is hydrophobic. The degree of hydrophobicity in a stabilized interface system and method of the invention is selected based on the contact angle formed between the porous structural material, the oil, and the second fluid. In some embodiments, further criteria for selecting the degree of hydrophobicity in a stabilized interface system and method of the invention includes optimizing surface tension across an interface such that target-PMPs, for example, are easier or more difficult to magnetically pull across the interface, and/or for overall device stability considerations for transport and storage. In some embodiments, the structural material(s) in a stabilized interface system or method is/are immersed in an oil layer.

In some embodiments of the stabilized interface system, compositions and methods, the structural material has preference for an aqueous fluid. In some embodiments, a porous structural material associated with an aqueous fluid is hydrophilic. The degree of hydrophilicity in a stabilized interface system and method of the invention is selected based on the contact angle formed between the porous structural material, the oil, and the second fluid. In some embodiments, further criteria for selecting the degree of hydrophobicity in a stabilized interface system and method of the invention includes optimizing surface tension across an interface such that, for example, target-PMPs are easier or more difficult to magnetically pull across the interface, and/or for overall device stability considerations for transport and storage. In some embodiments, the structural material(s) in a stabilized interface system or method is/are immersed in an aqueous layer.

In some embodiments of the stabilized interface systems and methods/compositions, the compositions comprising the at least two fluids that can form a stable fluid-fluid interface comprise fluid layers with at least one associated structural material comprising at least one pore having a preference for a fluid. In some embodiments, the layers are aqueous and oil. In some embodiments, more than one layer is associated with structural material comprising at least one pore having a preference for their associated fluids (e.g., a system with a stabilized aqueous layer and a stabilized oil layer).

In some embodiments, a stabilized interface system/composition is protected or backed or bounded by an upper material and/or a lower material comprising a material sufficient to protect the one or more stabilized interface systems for later storage, use, processing, or converting, for example. In some embodiments, the bounded one or more stabilized interface systems forms a stable or protected layer or structure. In some embodiments, the system is manufactured, stored or transported in the form of a protected layer (e.g. a rolled layer). In some embodiments, the upper and/or lower bounds comprise a porous substrate that allows an entity of interest to move through the substrate (e.g., a stabilized gaseous layer like a polypropylene mesh protective layer on one or both sides of a stabilized aqueous layer). An entity of interest may be a target, or any object with mass. Examples of an entity of interest can include anything with mass such as a photon, an electron, an atom, a molecule, a protein, a protein complex, or a particle generated by a thermodynamic process such as a chemical reaction, mechanical destruction, radioactive decay, or biological process at some point in time before entry into, or within, the system. In some embodiments, a protective layer is not needed for storage or packaging (e.g., a two-layer system comprising an aqueous layer and oil layer, rolled upon itself, can provide protection to inner layers from evaporation and contamination, etc.).

In some embodiments, one or more stabilized interface systems is/are within a container (e.g. a multi-well plate, an Eppendorf tube, an injection molded container, an insert, a cartridge, etc.) or positioned on a surface of a device. In some embodiments, a stabilized interface composition or system comprises a container. In some embodiments, a stabilized interface composition or system comprises a roll for storage prior to use.

In some embodiments, one or more stabilized interface systems is/are incorporated as part of a lateral- or vertical-flow assay (i.e., "flow assays"). For example, a lateral flow assay with a hydrophilic sample pad situated below a second hydrophobic pad creates a stabilized interface system once aqueous sample fluid is added to the sample pad. For example, the sample can contain target-binding PMPs and a magnet can be used to isolate PMPs from the aqueous sample fluid through the hydrophobic upper layer, performing sample cleanup. In some embodiments, more than two material layers can be used to add functionality For example, a system comprising an upper aqueous sample layer, middle hydrophobic gaseous layer, and lower hydrophilic gaseous layer in communication with components for standard lateral flow detection. Target-binding PMPs in the sample layer can be re-positioned with a magnet into the lower hydrophilic layer. Aqueous fluid can then be added to the hydrophilic gaseous layer, replacing some or all of the gaseous phase with a more preferred aqueous liquid. The aqueous liquid can contain acids/bases/buffers (or other physical or chemical release mechanism) that enable elution of target from the target-binding PMPs for subsequent detection by connected lateral flow components. Likewise, the target-PMPs themselves may be used as the detection particle in the connected lateral flow components, eliminating the need for target release. Similarly, in this example, the lateral flow components need not be initially connected to the stabilized interface system(s) but can be connected at a later time. These embodiments are also applicable to MIFT systems. For example, a miscible interface system can be constructed such as to largely isolate fluid flow from passing through a region of a lateral flow assay, allowing diffusion to dominate transport over bulk fluid flow. Such a system can be useful for prolonging introduction of a reagent into the bulk fluid stream within an LFA via diffusion. This can be accomplished, for example, by adding a material, laden with reagent, on top of a portion of a lateral flow assay where the added material has a much smaller pore size compared to the lateral flow component. Thus, fluidic resistance in the added material prevents significant bulk fluid transport of reagent into the lateral flow component relative to diffusion based transport. Likewise, fluid constituents in the lateral flow component diffuse into the added component and may be selected for by particle size to perform dialysis in a lateral flow assay. Use of MIFT and SIFT systems can be used similarly for other assay formats or sample processing steps as well. For example, a wick designed to supply sample to a downstream processing step can comprise a two layer MIFT system where the first layer is used to stabilize a buffer solution while the second layer allows bulk fluid flow of sample. In this example, buffer can diffuse into the flow of sample through the second layer, slowly over time to condition the sample or aid subsequent sample processing (e.g., adjust/maintain pH or introduce blocking agents).

The structural material comprising the stabilized interface system and method, and compositions thereof, does not inherently have any restrictions or bounds with respect to overall shape, dimensions, thickness, uniformity, or orientation (e.g., the material may be a porous microsphere, a fabric-type, quilted or multi-layer/laminate design that is hundreds of yards on edge constructed monolithically or bound or sewn together from smaller patches (e.g., 10's, 100's, or 1000's) of different materials, an amorphous sintered porous block of plastic roughly the size of a golf ball, a pipette tip with a single orifice/pore, or any combination thereof, etc.). Regardless of the overall geometry of the material, the pore geometry defines the relevant bounds of the interface(s) and effective diameter of the pore(s) for assessing the magnitude of stabilizing fluid-material interaction forces relative to destabilizing forces/pressure(s). If more than one pore exists in the material, there is no inherent restriction on the relative location of the pores or the uniformity or non-uniformity of the pores with respect to dimension, geometry, or surface properties. Also, there is no restriction that the perimeter of pore boundaries be contiguous or separated. For example, a dumbbell shaped structure can effectively define two pores despite having one shared perimeter. Likewise, a crenelated structure can define a single pore with many separate supporting perimeter segments (i.e., similar to a dashed line) that act together to create a single pore boundary. There is no inherent restriction on whether or not the entity of interest can or should be able to pass through any or all of the fluid-fluid interface(s). If there is more than one entity of interest, there is no inherent restriction on the similarity or dissimilarity of the entities of interest or their distribution of entity characteristics.

Unless otherwise specified, restrictions on system component characteristics are determined only by the particular application of the invention and are considered to be within the scope of the invention.

A ratio X (Eq 1) can be defined similar to other dimensionless quantities that aim to assess the relative magnitude of surface tension forces relative to another force impacting a fluid-fluid interface. However, because these forces act upon the area of the shared interface between the fluids, X is defined as a ratio of pressures instead of forces (i.e., Pressure=Force/Area), where $P_{surface\ tension}$ is the pressure arising from curvature of a fluid interface and $P_{other}$ is pressure arising from any other source.

$$X = \frac{P_{other}}{P_{surface\ tension}} \quad \text{(Eq 1)}$$

For example, in the case of a stationary volume of water ($H_2O$) of depth L, supported by a porous hydrophobic membrane with an equivalent pore radius r, surrounded by air, X becomes Eq 2, where $\gamma$ is the surface tension of water with air.

$$X = \frac{P_g}{P_\gamma} = \frac{(\rho_{H_2O} - \rho_{Air})gL}{\frac{\gamma}{2r}} \quad \text{(Eq 2)}$$

In some embodiments, the size of the pore(s) in the structural material is/are chosen to achieve a desired level of interface stability for a particular application. In some embodiments, pore-size is a design factor used to tune stability of the interface, where more or less stability may be desired. For example, if an application requires the interface to be stable at rest but unstable when additional destabilizing pressures are applied, the value of X will be set to <1 at rest, and at >1 when additional destabilizing pressure is applied, limiting the range of allowable characteristic surface tension pressure(s) of the system.

Sources of other pressures that could potentially destabilize an interface (e.g., an aqueous-air interface) include pressure heads arising from fluid depth (e.g., $P=\rho gh$), the additional accelerations experienced when placed in a centrifuge or when a collision induces a sudden acceleration, or when pouring a fluid into a container, etc. Indeed, some destabilizing pressures are spatially inhomogeneous such as sound waves or the fluid dynamics occurring during turbulent fluid mixing that can cause spatially and time-dependent fluctuations in pressure at an interface. Similarly, spatially inhomogeneous pressure can be applied to an interface by paramagnetic particles in a magnetic field at the fluid boundary. In such situations, local destabilization of an interface can occur, acting at a smaller length scale than that defined by the perimeter of the interface. Whatever the geometry or context or system, the stability of the interface can be assessed by considering the relative magnitude of destabilizing pressure (Pi) to the magnitude of stabilizing surface tension pressure (P). In general, the interface is considered stable if the characteristic pressure of surface tension is sufficiently greater than the destabilizing pressure (i.e., X<1) to provide the stabilizing function described herein. This quantity can be used to establish applicable ranges of parameters in different systems for which the invention applies.

Figure 17:
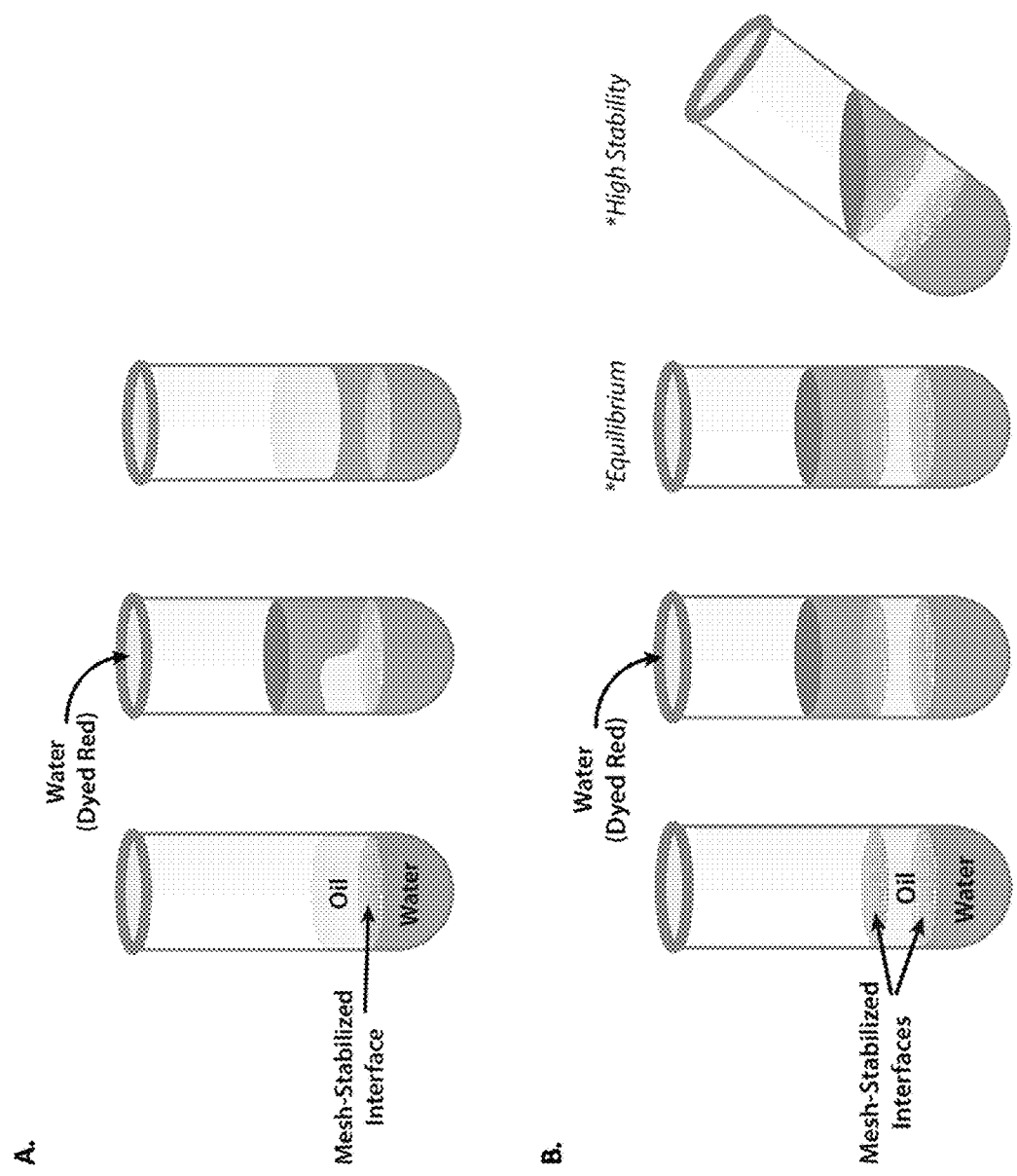
FIG. 17 shows phases and layers in tubes, and mesh-stabilized interfaces.
Figure 18:
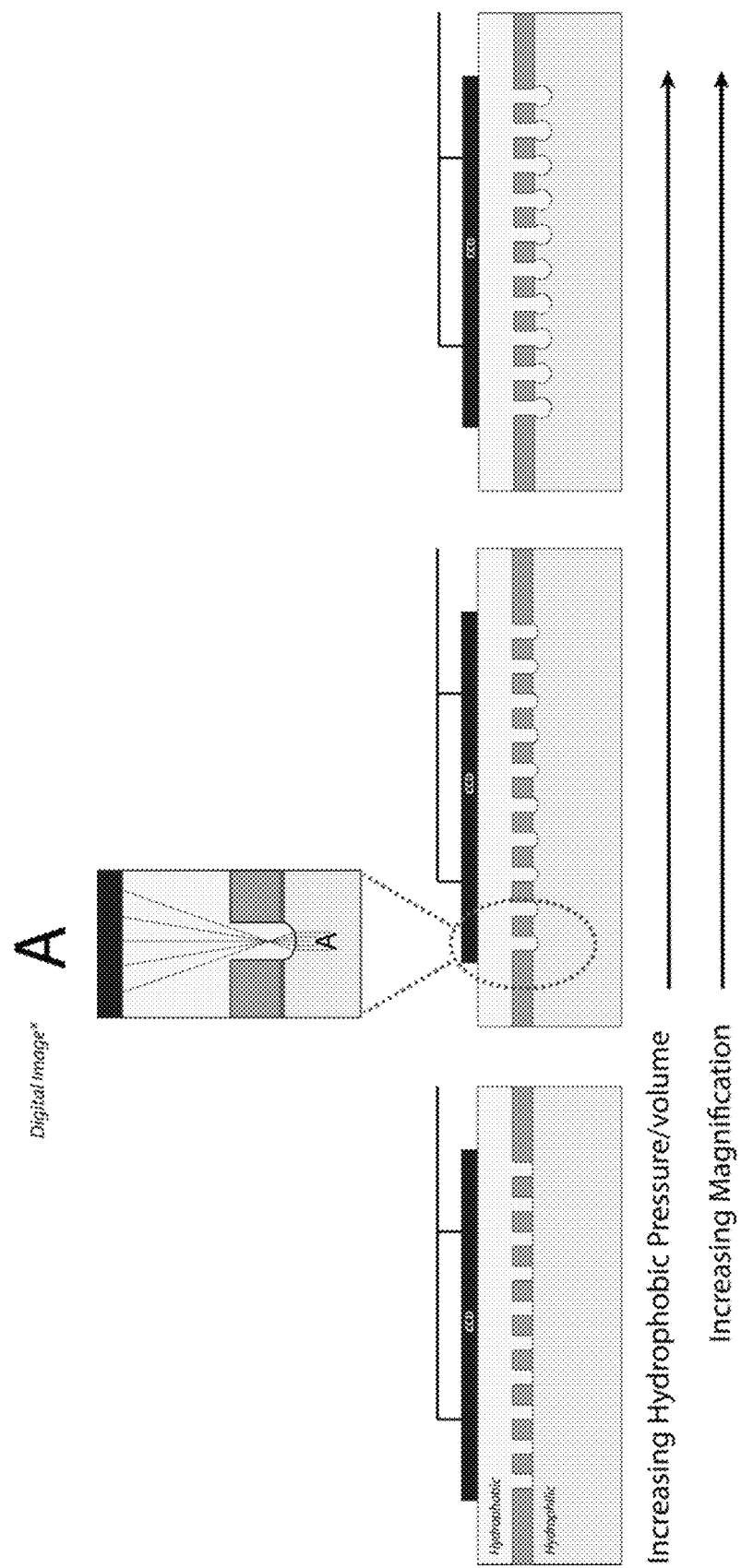
FIG. 18 shows an embodiment of a system as described herein. The system comprises a stabilized hydrophobic layer (yellow) in an enclosed container with a charge-coupled device (CCD), or other optical detector, in proximity to the porous structural material. The porous structural material immersed in hydrophobic fluid has regularly arrayed circular pores. By modulating the volume of hydrophobic fluid in the system, a complex set of light lenses can be formed. Depending on the volume of hydrophobic fluid in the system, light magnification can be increased or decreased.
Figure 19:
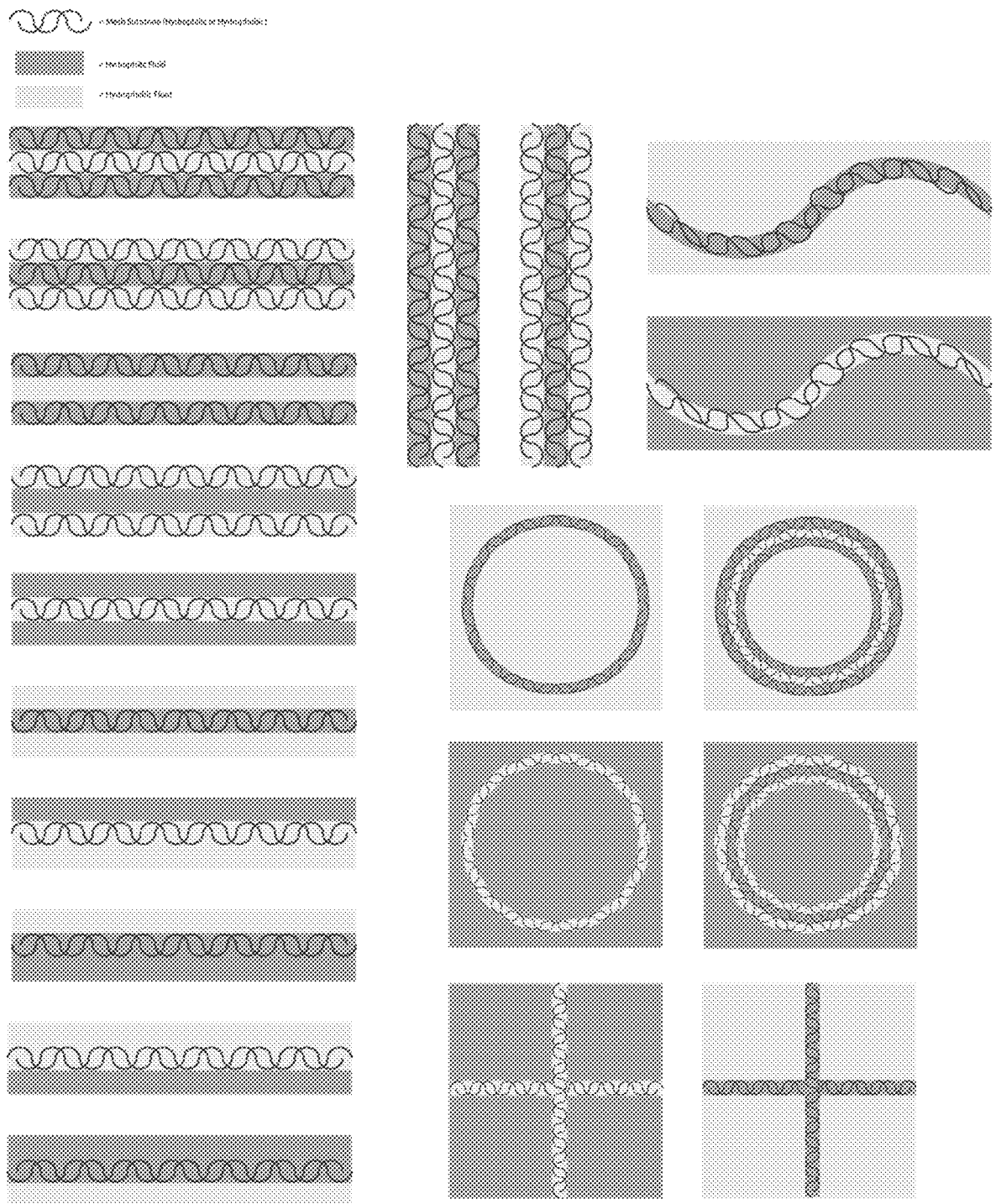
FIG. 19 shows examples of embodiments of different SIFT configurations involving single, and multiple stabilized aqueous and/or oil phases or layers. These views are shown as single cross-sections, in other words, the cross-section need not remain constant in the dimension in and out of the page. Twisting or bending, for example, or changing position or dimensions of the cross-section elements can occur at different cross-sectional locations.
Figure 20:
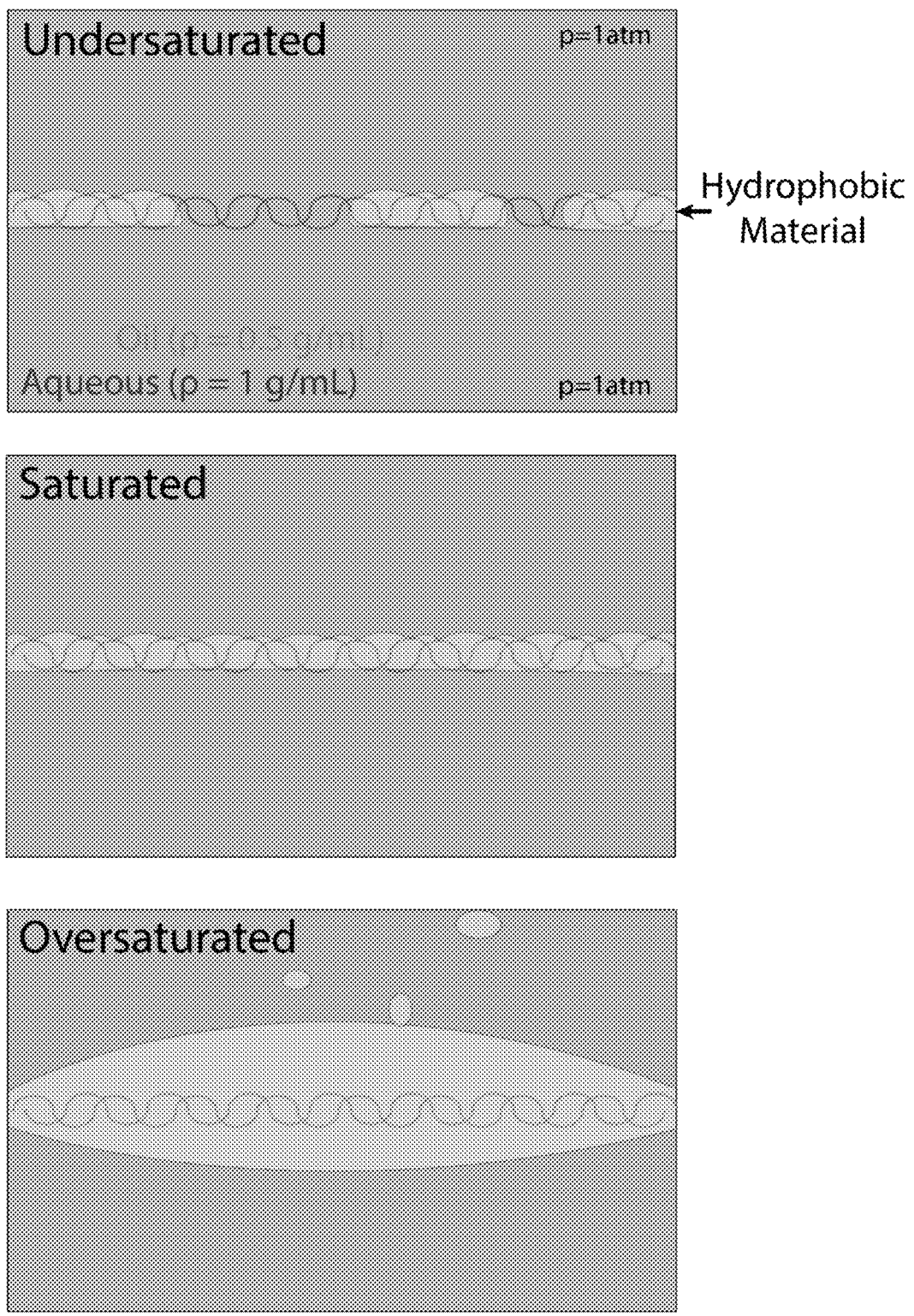
FIG. 20 shows a porous structural material with a preference for a fluid immersed in a volume of preferred fluid where it is undersaturated, saturated, and oversaturated. If the volume of the preferred fluid is insufficient to associate with the material throughout the entire material, it is considered an under-saturating volume. In undersaturated cases, the preferred fluid typically remains supported by the porous structural material but the non-preferred fluid can potentially fill the remaining space within the porous supporting structure. The volume of preferred fluid may be considered saturating if the preferred fluid is able to associate with the material throughout the entire material. Volumes of preferred fluid in excess of saturating volumes are considered over-saturating volumes and result in fluid which is not fully-contained and/or supported by the porous structural material. The region of preferred fluid above or below the porous structural material will generally be less stable than the supported volume of preferred fluid and is subject to convection, or turbulent forces, or bulk mixing.

In some embodiments of the invention, a porous structural material with a preference for a fluid is immersed in a volume of preferred fluid. The volume of fluid may be considered saturating if the preferred fluid is able to associate with the material throughout or across the entire material. There is typically a range of volumes that can saturate a given porous structural material. If the volume is insufficient to associate with the material throughout or across the entire material, it is considered an under-saturating volume. In undersaturated cases, the preferred fluid typically remains supported by the porous structural material but the non-preferred fluid can potentially associate with the remaining space within the porous supporting structure. Volumes in excess of saturating volumes are considered over-saturating volumes and may also be used. In some cases, while this may result in some fluid which is not well-contained and/or well-supported by the porous structural material, it can be advantageous in manufacture, for example. Thus, by way of example, a top fluid layer may be intentionally over-filled or over-saturated (see, e.g., FIG. 17). In other areas, a portion of the region over-filled with a fluid above or below the porous structural material is generally less stable or less supported than the supported region or volume of preferred fluid and is more susceptible to bulk fluid motion, or turbulent forces, or bulk mixing. In this example, the over-filled region can be useful (e.g., easier or more forgiving to manufacture) but may be less optimal without impeding function. In some embodiments stabilized layers or phases are underfilled, filled, or overfilled. See FIG. 20.

In some embodiments, a stabilized interface system and method and related compositions comprise (1) at least one structural material with at least one pore, (2) at least two fluids, and (3) at least one stabilized interface, phase or layer. In some embodiments, the size of the pore allows a target, or a target bound to another material (e.g. a solid phase or other carrier substance) to pass through without application of an external force. In other embodiments, a target, or a target bound to another material (e.g. a solid phase or other carrier material) is moved through a pore using an external force (e.g. a magnetic force, centrifugation).

In some embodiments, MIFT (miscible interface system) or SIFT (stabilized interface system) devices, methods and compositions can be used to move or position a material, e.g. a target. In some embodiments, moving or positioning with MIFT and/or SIFT systems, devices, methods and compositions can be active moving or positioning (e.g. using an external force, including a magnetic force, a rotating force, an accelerating force, an assisted gravitational force, etc.). In some embodiments, moving or positioning with MIFT and/or SIFT systems, devices, methods and compositions can be passive moving or positioning and carried out without using an external force (e.g. by diffusion, simple gravity, osmosis, etc.)

System performance can be modulated by changing fluid preferences to provide advantage for some applications (e.g., increased stability during handling or transport of a device employing structural material(s) to stabilize interfaces). Therefore, in some embodiments of the invention, it is advantageous to include at least one system fluid that is preferred or energetically favored to interact with the system structural material relative to at least one other system fluid. Indeed, the more disparate the energetics of interaction (i.e., relative preference), the more stable the interface. For example, preference of untreated polystyrene for water relative to oil can be altered via oxygen plasma treated of the polystyrene to further increase preference of the polystyrene for water, increasing stability. Also, for example, surfactants can be added to a fluid prior to or during use of the invention to differentially affect fluid-material interactions, changing the stability of the interface(s). Likewise, for example, temperature can also be used to alter the energetics of interactions.

Furthermore, in some embodiments, some or all of the fluids may undergo one or more transitions between solid and fluid form (i.e., are "switchable"). For example, in some embodiments, it is advantageous to have at least one fluid solid at room temperature and fluid at the operating temperature for a particular application. Solidification of one of the fluids allows an interface to become ultra-stable in the presence of destabilizing pressures while the fluidic form enables application of forces and pressures to destabilize the interface(s) as needed for different applications. In some embodiments, transition between solid and fluid form is achieved with temperature. In other embodiments, it is achieved with chemistry (e.g., liquifying agents that could potentially change the chemical nature of the original fluid) or hydration (e.g., rehydration of dried sucrose) or by mechanical means (e.g., ultrasonic liquification of dense colloids). Therefore, we refer to such interfaces as "switchable" fluids that can be used to create switchable interfaces. In some embodiments, the switchable fluids enable switchable behavior of the system. For example, temperature sensitive wax can be used to create a stable interface with water and interact with a polypropylene structural material for stabilization of wax-aqueous interfaces. In such a system, the wax can be solid at room temperature to provide much more stability to the interface than if it were fluid. In solid form, the interface would be robust to handling and transport, preventing passage of entities of interest through the pores of the structural material. Upon application of heat, the wax would become a fluid, enabling applications where one or more entities of interest must be passed through the pores in the structural material. For example, in fluid form, paramagnetic particles in a magnetic field can be used to overcome the stabilizing influence of surface tension to transport the paramagnetic particles, and any substances bound to those paramagnetic particles, through the pores of the structural material. Thus, use of switchable fluids and interfaces can provide additional functionality and flexibility to the invention.

In some applications, a consistent level of stability of the fluid interface(s) is maintained. In other applications, a level of stability of the fluid interface(s) is maintained until the interface(s) is/are destabilized on purpose. In other applications, stability of the interface(s) is maintained or destabilized in a controllable and reversible fashion. In any of the above applications, fluid-fluid interface(s) may be established or created, or potentially de-established or deconstructed at some point in time within the system (e.g., by adding or removing a fluid to reconfigure the system). In some embodiments, switchable fluids may be used for any of the fluids in the above scenarios to create a combinatorial set of possible configurations. Additional permutations of the above configurations can be created using different relative positions of the system components as well as timings of establishing or transitioning between configurations.

The topology and surface properties of the supporting structure can be tailored such that any externally applied forces, such as but not limited to gravity, centripetal forces, magnetic forces, electrical forces, are negligible. With this invention, the art is no longer constrained to microchannels and small tubes, but instead, using solid or semi-solid, porous supporting structures associated with phases or layers or at interfaces, nearly any desired fluidic system can be generated over any dimension. In embodiments of the system/composition, topology and surface chemistry are the main defining characteristics for the supporting structure (in order to alter liquid surface tension). Where a fluidic system with all of the fluids in contact with each other is desired, the supporting structure will contain at least one opening through which fluids can flow/interact. This opening will large enough to allow passage of a target or target-binding particle, and on the other side of the size spectrum, will be small enough to ensure a surface tension-prevailing interface for applications as desired. These size constraints will depend on the fluid, material properties, and system conditions such as temperature and pressure. The invention allows for an unlimited number of openings in the support structure as long as association with a preferred fluid is maintained throughout or across the support structure as needed during or for an application of the invention. Additionally, the shape of the openings or pores do not matter as long as association with a preferred fluid is maintained throughout or across the support structure openings or pores as needed during or for an application of the invention.

In another aspect, the invention provides a mesh-enhanced system for isolation of particles. Particles include target-binding particles, but need not be other particles, i.e., particles that are not target-binding particles. In the case of target-bound particles (e.g., target-bound PMPs), when the particles are brought through a fluid-fluid interface from fluid A to fluid B, a small amount of fluid A is typically brought through the interface with the target-bound particles, which can be referred to as carryover fluid. Carryover fluid is typically undesired during a target isolation process (e.g., causing reduction in sensitivity and specificity for qPCR); therefore, systems for reducing carryover are of significant value. The second graphic in FIG. 11A shows that inclusion of a porous supporting structure to stabilized interface at the point of isolation (SIFT) significantly reduces carryover, particularly when compared to isolation using a non-stabilized interface. These graphics are based on confirmed data.

Typically, as shown in the first graphic in FIG. 11A, as particles are brought through a fluid-fluid interface a focal point develops on the interface (in this case an aqueous-oil interface), deforming the interface as the particles aggregate to create a single "valley" where a large aggregate is formed that can overcome the interfacial barrier and enter into fluid B. When a stabilized interface is used, as shown in the second graphic in FIG. 11A, there are at least two very important and useful effects. First, many smaller "valleys" are formed on the interface instead of a single large valley. Thus, smaller aggregates are formed for passing through the interface. This reduces the average carryover fluid associated with an aggregate. This is because for large aggregates there is a lower surface to volume ratio than smaller aggregates. Particles at the surface of the aggregate are associated with less carryover fluid, therefore a higher surface to volume ratio for the aggregate results in an overall reduction in carryover. Second, as the aggregate pushes through and separates from the bulk of fluid A, the smaller valley has larger surface tension pressures pinching off the tail of fluid A that connects the aggregate to the bulk of fluid A prior to breaking free from the bulk fluid. This is supported by previous observations that fluids with more stable interfaces (without a stabilizing structure) reduce carryover fluid as well.

Thus, performance of a mesh-enhanced system as shown (or other system using another structural support with desired porosity, for example, e.g., a SIFT system), for isolation of target-bound particles with respect to fluid carryover can be modulated through modulation of the supporting structural material (e.g., geometry, pore size, porosity, distribution and heterogeneity of pore geometry, larger scale curvature or topology of the stabilized interface, etc.) or fluids employed (e.g., aqueous-oil, aqueous-gaseous, water-silicone oil, water-fluorinated oil, water-mineral oil, addition of surfactants, etc.). Similarly, the overall thickness of the stabilized layer may be increased or additional layers of supporting material within the stabilized fluid phase or layer can also be used to reduce carryover. If the stabilized layer is too thin, there is the possibility that aggregates brought through the stabilized layer could create a temporary (or potentially permanent) fluid bridge through the stabilized layer. In some cases (e.g., some applications with high bead densities, for example), this may be advantageous, allowing for a steady stream of highly dense particles to form that provides rapid isolation of particles at a high target to carryover ratio. The fluid bridge may have other purposes as well such as to allow electrical continuity through the stabilized layer. In other cases (e.g., some applications with lower bead densities, for example) such fluid bridges may be seen as disadvantageous, in which case increasing the thickness of the stabilized layer can reduce or eliminate the potential for forming fluid bridges. Additional layers or depth to a porous support structure can also provide other advantages. For example, if multiple layers of supporting material are used with smaller and smaller pore size, large aggregates formed upon entering fluid B can be trapped at subsequent layers of the support structure, resulting in a secondary isolation step where smaller aggregates are isolated from the larger aggregates, to further reduce carryover. Such mesh-enhancement of particle isolation (whether target-binding or not) will be useful across multiple industries from medical diagnostics, sample preparation to agricultural and large-scale bio-chemical engineering applications.

This system and associated devices, methods and compositions, allows target positioning to proceed faster and more efficiently. See FIG. 11A. Additionally, while contaminants are fundamentally excluded instead of washed away in the traditional sense, carryover of contaminants, which is generally limited to the interstitial volume between the beads, is reduced and minimized with these systems, devices, methods and compositions. Stabilized interface systems and compositions of the invention can be assembled and manufactured as described herein. To create a stabilized layer, the first of two immiscible fluids is added to a container. A porous support material, with a preference for the first fluid, cut to the appropriate dimensions (e.g. diameter, thickness, etc.) such that the material may be press-fit, as needed, into place once inside the container, is submerged in the first fluid. The second fluid is then added to the container. Optionally, a porous support material, with a preference for the second fluid, cut to the appropriate dimensions (e.g. diameter, thickness, etc.), is associated with (e.g. immersed) in the second fluid.

In some embodiments, the systems, devices and methods are designed and used for positioning a target. By way of example, using a system, device or method of the invention, one or more targets can be moved, separated, isolated, detected, identified, analyzed, screened for, quantified, or purified using the systems, devices and methods of the invention. The systems, devices and methods of the invention include systems, devices and methods for the isolation and/or detection of an analyte in a sample. In some embodiments, the system, method or device comprises one or more oil and/or one or more aqueous phases and/or one or more gas phases stabilized in close proximity to each other. These systems and devices have many uses. For example, they may be used for isolating, separating, moving, purifying, mixing, binding and/or subsequently detecting the presence or amount of a target or target analyte from a sample or other mixture.

Targets may be positioned positively or negatively, and in a number of ways. Targets may be positioned positively, for example, by moving or isolating a target or removing a target from a sample (e.g., for detection or measurement, or disposal, etc.). Targets may be positioned negatively, for example, by positioning or removing one or more or all non-targets.

In some embodiments, positioning a target by, for example, isolating, separating, moving or binding the target or a material bound to the target using a method, device or system of the invention may be done positively.

In some embodiments, positioning a target by, for example, isolating, separating, moving or binding the target or a material bound to the target using a method, device or system of the invention may be done negatively.

In some aspects, provided herein is a system and a device and method comprising one or more stabilized oil and/or one or more stabilized aqueous phases and/or one or more gas phases that may be used to move or purify a target or analyte away from a sample or mixture that contains, may contain, or is or may be suspected of containing the target or analyte using a magnetic, electric, or acceleration-based force (e.g., via gravity or via a centrifuge) to draw the target or analyte through one or more layers. In some embodiments, the system and the device comprises reagents for detection, identification, analysis, isolation or quantification of the target or analyte. The quantification may be positive-negative for the target, semi-quantitative or quantitative. The isolation may be complete or partial. One or more or all of the reagents for detection, identification, analysis, isolation or quantification of the target or analyte may be contained the system or device.

In some embodiments, the systems, devices, compositions and methods of the invention the autonomous operation of processing steps. In some embodiments, the inventions provide for the processing/exposure/modification of any solid phase (e.g. para-magnetic particles) that can be moved through the layers/interfaces. In one aspect, each step functions as a purification/separation step as, by way of example, the paramagnetic particle passes through a phase, layer or interface. In other aspects, when the paramagnetic particle, for example, is within a phase, layer or interface other functionality may take place (e.g. chemical modification of the solid phase, elution off the solid phase, etc.). As noted, a solid phase is a solid support to which a target has been bound, attached or fixed (whether directly or indirectly). Solid phases include paramagnetic particles. Semi-solids can serve as solid phases. In some embodiments, anything to which a target is attached may serve as a "solid phase." A mesh other porous solid support structure is not generally considered a solid phase. In some embodiments, the target can be the solid phase, e.g. a cell.

One embodiment of the invention is the application of a system, device or method as described herein to a specific target or analyte in a specific matrix.

In some aspects, provided herein are systems and methods for isolating a target from a sample. In some embodiments, the systems and methods of the invention are used for detecting and/or quantifying a target in a sample. In some embodiments, the systems and methods of the invention are used for determining the presence or amount of a target in a sample. In some embodiments, the systems comprise a container housing at least one aqueous phase (e.g. aqueous layer) and at least one oil phase (e.g. oil layer). The aqueous and oil phases or layers are stabilized in the container and, in some embodiments, are stabilized in close or otherwise functional proximity to each other within the container, the distance between being as desired or needed for the function of the system, method or device.

The system may comprise any suitable or desired number of aqueous and oil and/or gaseous phases or layers to facilitate isolation of the target analyte. In some embodiments, the system comprises one aqueous phase. In some embodiments, the system comprises more than one aqueous phase. In some embodiments, the system comprises one oil phase. In some embodiments, the system comprises more than one oil phase. In some embodiments, the system comprises one aqueous phase and one oil phase. In some embodiments, the system comprises more than one aqueous phase and more than one oil phase. In some embodiments, the system comprises at least two aqueous phases and at least two oil phases. In some embodiments, the aqueous and oil phases are stacked in an alternating fashion, such that no two aqueous phases are in direct contact with each other and no two oil phases are in direct contact with each other. In some embodiments, the phase closest to the top of the container (e.g. the phase that will contact the sample first) is an aqueous phase. In other embodiments, the phase closest to the top of the container is an oil phase. For example, in some embodiments the aqueous and oil phases are stacked in an alternating fashion, such that the system comprises, from top to bottom, a first aqueous phase, a first oil phase, a second aqueous phase, and a second oil phase. In other embodiments, the system comprises, from top to bottom, a first oil phase, a first aqueous phase, a second oil phase, and a second aqueous phase. In some embodiments, the system comprises at least three aqueous phases and at least three oil phases, at least four aqueous phases and at least four oil phases, at least five aqueous phases and at least five oil phases, etc. In some embodiments, one or more of the aqueous phases are stabilized. In some embodiments, one or more of the oil phases are stabilized. In some embodiments, one or more of the aqueous and one or more of the oil phases are stabilized.

In some embodiments, at least one aqueous phase comprises a lysis buffer. In some embodiments, the lysis buffer is the first aqueous phase (e.g. the aqueous phase closest to the top of the container). A suitable lysis buffer is chosen based on the nature of the sample and the target. Accordingly, the sample may be added to the system, such that the sample contacts the lysis buffer prior to coming into contact with any other components of the system. For example, the lysis buffer may be housed within the container above the plurality of porous materials and above any oil phases present in the container, such that the biological sample contacts the lysis buffer prior to passing through the plurality of porous materials. This facilitates lysis of cells contained within the sample, thereby facilitating release of the target analyte contained therein prior to isolation, purification, or evaluation of the presence or amount of the target. In other embodiments, the first aqueous phase is below the first oil phase (e.g. the first oil phase is closest to the top of the container). In such embodiments, the first oil phase will help to remove potential contaminants from the sample prior to lysing the sample to release the target analyte.

In some embodiments, a lysis buffer may be housed in between one or more layers of the plurality of porous materials (e.g. in between one porous material and another). In some embodiments, the lysis buffer is housed above the plurality of porous materials and/or in between one or more layers of the plurality of porous materials. In other words, a first aqueous phase and a second aqueous phase may comprise a lysis buffer. In some embodiments, for example, in nucleic acid isolation, a first lysis step is performed followed by a wash step with the lysis or other buffer. In some embodiments, the lysis buffer is added to the biological sample prior to adding the sample to the system. For example, a lysis buffer may be added to the biological sample as part of one or more pre-treatment steps performed prior to adding the sample to the system.

Any suitable lysis buffer may be used. In some embodiments, the lysis buffer comprises a salt (e.g. NaCl, KCl, $(NH_4)_2SO_4$, etc.). In some embodiments, the lysis buffer comprises a detergent. For example, the biological sample may comprise an ionic detergent (e.g. sodium dodecyl sulfate, deoxycholate, cholate, etc.), a non-ionic detergent (e.g. Triton X-100, DDM, digitonin, Tween 20, Tween 40, NP-40, Pluronic F-127), a zwitterionic detergent, or a chaotropic detergent. In some embodiments, lysis buffer comprises 0-5% detergent (v/v). For example, the biological sample may comprise 0%, about 0.1%, about 0.2%, about 0.3%, about 0.4%, about 0.5%, about 0.6%, about 0.7%, about 0.8%, about 0.9%, about 1%, about 1.5%, about 2%, about 2.5%, about 3%, about 3.5%, about 4%, about 4.5%, or about 5% detergent. Detergents are most widely used for lysing mammalian cells. For lysing bacterial cells, the cell wall has to be broken down in order to access the cell membrane, and detergents are often used along with lysozymes. Agents for lysing viruses for downstream assays are virus dependent, and known in the art. The lysis buffer may be brought to a suitable volume for subsequent use by the addition of a suitable buffer. For example, the lysis may be brought to a suitable volume by the addition of phosphate buffered saline (PBS), Tris hydrochloride, saline, and the like. The lysis buffer may comprise one or more enzymes or chemical agents to assist with breaking down the contents therein to facilitate release of the desired target. For example, the lysis buffer may further comprise one or more enzymes, such as one or more proteases. In particular embodiments, the lysis buffer may comprise proteinase K. The lysis buffer may additionally comprise one or more suitable reagents to prevent degradation of the target within the sample. For example, suitable reagents and/or inhibitors (e.g. RNase inhibitors, nuclease inhibitors, etc.) may be added to the lysis buffer prior to use in a system as described herein.

In some embodiments, at least one aqueous phase comprises a wash buffer. The purpose of the wash buffer is generally to dilute unwanted components of a sample that are carried into the wash buffer layer by, for example, by PMPs, where PMPs are used, prior to moving the PMPs into the next phase or layer. Another purpose is to promote desorption of unwanted sample components bound to the PMPs, for example, prior to moving them into the next layer. A wash or wash buffer may also be used to "mitigate" (e.g., chemically) an unwanted sample component carried into the wash layer prior to moving it to the next layer.

In some embodiments, the aqueous phase comprising the wash buffer is not the first aqueous phase (e.g. is not the aqueous phase closest to the top of the container). For example, the wash buffer may be the second aqueous phase, the third aqueous phase, the fourth aqueous phase, etc. In some embodiments, multiple aqueous phases comprise a wash buffer. For example, the first aqueous phase may comprise a lysis buffer, and the second and third aqueous phases may comprise a wash buffer. In some embodiments, the aqueous phases comprising the wash buffer reside below the aqueous phase comprising the lysis buffer, and above the reagents for detecting the target. In some embodiments, the wash buffer comprises water. In some embodiments, the wash buffer comprises ethanol. In some embodiments, the wash step or wash buffer is performed with a lysis buffer or a mixture of wash and lysis buffers.

In some embodiments, the system further comprises paramagnetic particles. In some embodiments, one or more aqueous phases further comprises paramagnetic particles (PMPs). In some embodiments, the first aqueous phase further comprises paramagnetic particles. The paramagnetic particles bind to the target analyte, thus creating one or more target-PMP complexes. In some embodiments, PMPs bind to a target or target analyte, and are referred to as "target-binding" PMPs (or other target capture solid phase). In some embodiments, target-binding PMPs or other target-binding solid phases are conjugated with a target-binding agent, for example, an antibody, an antibody fragment, a single chain Fv, oligonucleotide, aptamer, peptidomimetic, etc., directed to the target and used as a PMP targeting agent, "target-binding" PMP, as described. Any suitable paramagnetic particle may be used. In some embodiments, paramagnetic particles may be purchased from a commercial vendor. The specific type of paramagnetic particle used depends on the target to be isolated from the sample. For example, particles with a relatively large surface area may be preferable for binding nucleic acid, such as viral RNA. In some embodiments, as noted, one or more paramagnetic particles may be functionalized to aid in capture/purification of the target. For example, some or all of the paramagnetic particles may be functionalized with one or more antibodies, antigen-binding fragments (e.g., F(ab')2, Fab, Fab', Fv, etc., generated form the variable region of IgG and IgM, for example, which may vary in size, valency and Fc content), single chain variable fragments (scFV) recombinant antibody fragments (rAbFs), aptamers, peptides and peptidomimetics, natural and chemically modified antisense oligonucleotides, or other suitable agents to assist with capture of a target. In some embodiments, different paramagnetic particles are functionalized for different targets such that one group of paramagnetic particles can function to indicate successful interaction with and/or isolation from a sample (e.g., a particle targeting human RNaseP RNA/DNA in saliva as a means to indicate sample was successfully lysed and or that PMPs and sample were successfully mixed and subsequently isolated). In some embodiments, different sets of paramagnetic particles can serve as positive or negative controls. In some embodiments, the paramagnetic particles may be functionalized with one or more spike protein antibodies to assist with the capture of SARS, coronavirus, SARS-CoV-2 and related targets. As used herein, reference to paramagnetic particles or PMPs includes functionalized paramagnetic particles.

The paramagnetic particles may be lyophilized or dried. PMPs may be contained in a lyophilized or dried mixture or solution. In other embodiments, the paramagnetic particles may be in a liquid formulation. The paramagnetic particles are contacted with the sample, thus generating a plurality of target-PMP complexes. In some embodiments, the paramagnetic particles are housed within the container holding the plurality of porous materials. For example, the PMPs may be a part of a first aqueous phase. Alternatively, the paramagnetic particles may be housed separately (e.g. in a separate container from the plurality of porous materials). When housed separately, the paramagnetic particles may be added to the container housing the plurality of porous materials prior to adding the sample to the container, after adding the sample to the container, or concurrently with adding the sample to the container. For example, the PMPs may be added to a first aqueous phase present in the container. In some embodiments, the first aqueous phase also comprises a lysis buffer, such that addition of the sample to the container results in lysis of cells contained therein and binding of the target or analyte to the PMPs present within the aqueous layer. Alternatively, the paramagnetic particles may be mixed with the sample to generate a composition comprising a plurality of target-PMP complexes, and the composition may be added to the container.

Any suitable amount of PMPs may be contacted with the sample. In embodiments where the PMPs are contained in a liquid formulation, any suitable volume of the liquid composition comprising paramagnetic particles may be contacted with the sample. In some embodiments, the volume of the liquid composition comprising the PMPs may equal or exceed the volume of the sample. For example, the volume of the liquid composition comprising PMPs may be at least 100%, at least 150%, at least 200%, at least 250%, at least 300%, at least 350%, at least 400%, at least 450%, or at least 500% the volume of the sample.

Any suitable concentration of PMPs may be used to ensure sufficient binding of the PMPs to the target (e.g. formation of a sufficient number of target-PMP complexes). For lyophilized PMP formulations, any suitable weight of lyophilized product may be used to ensure the proper concentration of PMPs to be contacted with the sample. For liquid formulations, the liquid composition comprising the PMPs may comprise any suitable concentration of PMPs to ensure sufficient binding of the PMPs to the target (e.g. formation of a sufficient number of target-PMP complexes). For example, PMPs may be present in the liquid composition at about 1-20% (v/v). For example, PMPs may be present in the liquid composition in an amount of about 1%, 2%, 3%, 4%, 5%, 6%, 7%, 8%, 9%, 10%, 11%, 12%, 13%, 14%, 15%, 16%, 17%, 18%, 19%, or about 20% (v/v).

In some embodiments, the liquid composition comprising PMPs contains other suitable reagents for processing/handling of samples. For example, the liquid composition comprising PMPs may contain one or more detergents, reducing agents, buffers, inhibitors, enzymes (e.g. proteases), denaturants, etc. Any additional reagents present in the sample may additionally be present in the liquid composition comprising PMPs. For example, the liquid composition may further comprise one or more reagents to decrease viscosity of the sample. For example, the liquid composition may comprise PMPs and DTT. The liquid composition may comprise other suitable buffers, inhibitors, and the like to prevent degradation of the target (e.g. target nucleic acid, target protein, etc.) during sample processing. Suitable inhibitors that may be present in the liquid composition comprising PMPs include, for example, RNase inhibitors, protease inhibitors, nuclease inhibitors, and the like. Lyophilized PMP formulations may contain other suitable reagents commonly used in the lyophilization process, including bulking agents, stabilizers, and other suitable excipients.

In some embodiments, the systems described herein further comprise at least one oil phase. The oil phase may be any suitable hydrophobic liquid. In some embodiments, the oil phase may comprise mineral oil, coconut oil, vegetable oil, and the like. In some embodiments, an oil phase (e.g. a layer of light mineral oil, coconut oil, etc.) resides above the plurality of porous materials and above the wash buffer and/or lysis buffer, if present in the system. Accordingly, the sample will pass through the layer of oil prior to contacting the lysis buffer.

The aqueous and oil phases may be stabilized within the container by one or more factors. In some embodiments, the aqueous and oil phases are stabilized, at least in part, by the use of porous materials. For example, the systems described herein may comprise a plurality of porous materials. The plurality of porous materials are stacked within the container, such that the target (e.g. target-PMP complexes) passes through multiple porous layers during the purification process. In some embodiments, the porous materials are not in direct contact with one another within the stack. For example, one or more porous materials may be separated by an aqueous phase (e.g. wash buffer, lysis buffer) or an oil phase (e.g. mineral oil, coconut oil). In some embodiments, one or more porous materials are in direct contact with one another.

Any suitable porous material may be used. In some embodiments, the porous material is hydrophilic. In some embodiments, the hydrophilic porous material is within or comprises an aqueous phase or layer. In some embodiments, the porous material is hydrophobic. In some embodiments, the hydrophobic porous material is within or comprises an oil phase or layer. In some embodiments, the porous material is fibrous glass material. For example, the porous material may be a fibrous, hydrophilic glass mesh. In some embodiments, the porous material is a synthetic mesh material. For example, the porous material may comprise a polypropylene mesh, a polyethylene mesh, a polyester mesh, a nylon mesh, or a polyetheretherketone (PEEK) mesh. In some embodiments, the synthetic mesh material is hydrophobic. In some embodiments, the synthetic mesh material is hydrophilic. For example, nylon-6 is an exemplary synthetic mesh material that is hydrophilic. Nylon-6 and nylon-6 capillary-channeled polymer (C-CP) fibers are hydrophilic.

In some embodiments, each of the porous materials are the same. In other words, the system comprises a plurality of porous materials stacked within the container, and each layer in the stack comprises the same porous material. In other embodiments, one or more of the porous materials are different from one or more other porous materials. In other words, the system comprises a plurality of porous materials stacked within the container, and one or more layers in the stack is different from another layer.

In various embodiments, the porous material is selected based on the size of the pores or openings in the material and the size of the target or analyte, the size of the target or analyte bound to a carrier or solid phase (e.g. a PMP) and/or the size of elements in the sample desired to be excluded during the method. In some embodiments, the size of the pores or openings in one or more of the porous materials are different from those in one or more other porous materials. In some embodiments, the size of the pores or openings in one or more of the porous materials are the same as those in one or more other porous materials in the system.

In some embodiments, a hydrophilic porous material is associated with at least one aqueous phase or layer, and a hydrophobic porous material is associated with at least one oil phase or layer. For example, hydrophilic porous material (e.g. glass mesh, nylon) may be associated with one or more aqueous phases or layers within the container, and a synthetic hydrophobic mesh material may be associated with at least one oil phase or layer. In some embodiments, each aqueous phase or layer comprises or consists essentially of a hydrophilic porous material and each oil phase or layer comprises or consists essentially of a hydrophobic porous material. In some embodiments, the first aqueous phase or layer comprises or consists essentially of a lysis buffer and is stabilized by a hydrophilic porous material (e.g. glass mesh, nylon) associated with the first aqueous phase or layer. In some embodiments, the first aqueous phase or layer and at least one additional aqueous phase or layer comprises or consists essentially of a hydrophilic porous material. For example, the first aqueous phase or layer may comprise or consists essentially of a lysis buffer, and the second aqueous phase or layer (and potentially a third aqueous phase or layer, a fourth aqueous phase or layer, etc.) comprises or consists essentially of a wash buffer and a hydrophilic porous material. In some embodiments, at least one oil layer is stabilized by a hydrophobic mesh (e.g. a hydrophobic synthetic mesh). For example, a first oil layer, second oil layer, a third oil layer, etc. may contain or consist essentially of a hydrophobic synthetic mesh associated with the oil layer.

In some embodiments, the aqueous and oil phases or layers are stabilized, at least in part, by modulating one or more chemical or physical material characteristics. For example, the aqueous and oil phases or layers may be stabilized by modulating geometry or one or more chemical or physical material characteristics including density, surface chemistry, surface free energy, fluid retention, and/or porosity of a hydrophilic or hydrophobic porous material, if present in the system. In some embodiments, the aqueous and oil phases or layers are stabilized in close proximity to each other by suitable conditions such that fluid retention forces associating the fluid layer with the support structure dominate other forces (e.g. buoyancy) that might otherwise disrupt the functional layering or order of the phases. For example, in a simple two-phase system where water is introduced into a vessel over the top of an oil that is less dense than water in the presence of gravity, buoyancy forces reorganize the system such that the oil will form a layer over the top of the water phase, relative to gravity. If a hydrophobic stabilizing porous material is present at the top surface of the oil, and is attached to the walls of the container prior to introducing the water, fluid retention forces in porous materials can prevent buoyancy forces and forces/ pressures arising from the act of pouring from reordering the oil layer to the top position, keeping the oil below the aqueous layer.

In some embodiments, oil phase stabilization is adjusted, modified or selected by using oils of different densities. Oil phases may also be adjusted or modified by creating phases or layers where surface tension and/or capillary forces dominate over forces arising from density and/or acceleration (e.g., gravity).

The density and/or surface properties of an aqueous phase or layer or potentially the associated supporting structure can be adjusted to adjust the stability or association of a layer with the device or a supporting structure. In some embodiments, the densities and/or surface properties of one or more aqueous phases or layers are adjusted or modified by using aqueous phases or layers comprising different salt or amounts of salts, surfactants, etc. Surface properties of structures associated with the fluid can be adjusted as well, such as via oxygen plasma treatment of a polystyrene mesh to increase preference for fluids like water. Aqueous phases or layers may also be modified by creating phases or layers comprising heavy liquids. Heavy liquids include sodium polytungstate, sodium metatungstate, and the lithium metatungstate. These are all inorganic compounds, based on the $[H_2W_{12}O_{40}]6$-polyanion, which is dissolved in water to form very dense solutions, which can be diluted for forming less dense aqueous phases or layers, but more than pure water-based phases or layers. In some embodiments, aqueous phases or layers are modified by creating phases or layers where surface tension and/or capillary forces dominate over forces arising from density and/or acceleration (e.g., gravity).

The density, mechanical properties, and/or surface properties of a phase or layer in a system, device and method of the invention can also be adjusted with phase change, e.g. melting, boiling, sublimation, etc. of materials. Useful phase change materials for adjusting or modifying the buoyancy and/or surface tension in a phase or layer include polymeric compounds such as polyethylene glycols and methoxypolyethylene glycols. In some embodiments the phase change material can be a paraffin wax with an operational temperature above the melting temperature of the wax, for example.

The porosity of a supporting structure can be adjusted or selected by using specific materials of varying pore size, or differing pore size ranges. Some useful porous materials (e.g., nitrocellulose) are made with different pore sizes. Pore size may also be adjusted or modified in situ (e.g., using hydrogels that swell or degrade, or porous materials laden with dried sugars).

In some embodiments, targets are positioned positively or negatively. Targets may be positioned positively, for example, by positioning or isolating a target (e.g., for detection or measurement) or removing a target from a sample or material. Targets may be positioned negatively, for example, by positioning or removing one or more or all non-targets. In some embodiments, positioning a target by, for example, isolating, separating, moving or binding the target or a material bound to the target using a method, device or system of the invention is done positively by positioning the target or a material connected to the target away from other materials, e.g., materials in a biological or other sample.

In some embodiments, positioning a target by, for example, isolating, separating, moving or binding the target or a material bound to the target using a method, device or system of the invention is done negatively by removing non-target materials away from the target of material bound to the target.

In some embodiments of the invention using antibody-based cell isolation, for example, either positive or negative selection may be used. Cells that may be isolated using a method, device or system of the invention, include, for example, stem cells, circulating fetal cells, circulating tumor cells, etc. The invention may also be used to isolate rare cells that may be masked within larger, more diverse backgrounds of cells (e.g., the bloodstream, biopsy tissue, etc.) or by patient-to-patient variation. Amongst other things, the methods, devices and systems of the invention provide the means to separate rare target cells from background, either positively or negatively.

Positive selection may utilize antibodies to capture cells in an antigen-dependent manner, yielding a captured population specific to a chosen cellular marker (through antibodies, carbohydrate receptors, etc.). While precise, positive selection requires the marker to be specific to the target population and known a priori. Negative selection may be used if distinguishing markers are unknown or non-differential (i.e., shared by neighboring cell populations), even if expressed at differing levels. Negative selection embodiments of the invention leverage known non-target markers to deplete background populations. In this approach, the target cells remain uncaptured, enabling a negative approach to isolation. In the case of negative selection, the target is positioned away from other materials by moving the other material away from the target rather than moving the target itself (or the material to which the target is bound).

The systems described herein comprise a container housing the various components of the system (e.g. the at least one aqueous phase (e.g. aqueous layer), the at least one oil phase (e.g. oil layer), the plurality of porous materials, etc.). Any suitable container may be used. The appropriate container may be selected based upon the desired application of the system. Examples include, but are not limited to, test tubes, microcentrifuge tubes, dishes, slides, plates, multi-well plates (e.g., 4-well, 8-well, 12-well, 96-well, 384-well, etc.), flasks, vials, channels, and the like. In some embodiments, the container is a multi-well plate, such that a plurality of samples may be processed simultaneously.

The container may be any suitable size. In some embodiments, a small container (e.g. a multi-well plate) may be well-suited for isolation of analytes from biological samples. In other embodiments, a larger container may be well suited for isolation of analytes from environmental samples, such as sewage samples. Any suitable volume of aqueous and oil phases may be used, depending on the container selected. For example, for multi-well plates relatively small volumes of aqueous and oil phases may be used (e.g. less than 0.5 ml). However, as the size of the container increases, it is understood that the volume of aqueous and oil phases will scale appropriately.

In some embodiments, the system further comprises reagents for detecting the target. In some embodiments, reagents for detecting the target are housed toward, at or on a bottom surface of the container such that the sample passes through the plurality of porous materials prior to contacting the reagents for detecting the target. For example, the reagents for detection of the target may be stabilized on a bottom surface of the container by a suitable porous material. For example, reagents for detection of the target may be associated with a hydrophilic porous material (e.g., glass mesh, nylon) and positioned or stabilized below an oil phase or layer. Reagents may be stabilized above or on the bottom surface of the container by a structural porous material, e.g. a hydrophilic porous material (e.g. glass mesh, nylon) in some embodiments. In some embodiments, reagents for detection of the target may not be associated with a supporting structure. For example, the reagents can be positioned below a stabilized oil phase or layer to hold them in place. In some embodiments, reagents are associated with a supporting structure (e.g., porous glass mesh, or non-porous material device such as an nylon O-Ring) and positioned below a stabilized oil phase or layer. For example, reagents for detection of a target or targets are retained on the bottom of the container by adding a suitable material on top of the reagents to hold them in place. In some embodiments, reagents for detection of a target or targets may be held toward, at or on the bottom surface of the container by placing a fibrous material on top of the reagents (e.g. polypropylene mesh). In some embodiments, the reagents are held on the bottom surface of the container by a non-mesh or non-porous material device, for example, an O-Ring (e.g. PTFE O-Ring).

In other embodiments, reagents for detecting the target may be present in a separate container from the container housing the at least one aqueous phase and at least one oil phase. For example, the container housing the at least one aqueous phase, at least one oil phase, and the stacked porous materials may be placed on top or within a separate container holding reagents for detecting the target. For example, the container housing the at least one aqueous phase, at least one oil phase, and the porous materials may be used as an insert and placed within a separate container holding the reagents for detection of the target. The magnet may be placed below the container holding the reagents for detection of the target, such that the target-PMP complexes are drawn through the materials held within the insert and brought into contact with the reagents for detecting the target. It will be noted that in some described embodiments, the system contains at least one aqueous phase or layer and at least one gaseous phase or layer, but no oil phase or layer, and that in other embodiments, the system contains at least one oil phase or layer and at least one gaseous phase or layer, but no aqueous phase or layer.

In some embodiments of the system, the magnet is a part of the container. In some embodiments, including embodiments for disposable uses, for example, the magnet may be included or fixed within the container (e.g. at the side of the container, at the bottom of the container, etc.). In other embodiments of the system, the magnet may be attached or fixed to the outside bottom or side of the container. In other embodiments of the system, the bottom of the container, or a portion of the bottom of the container, comprises a magnet. In other embodiments of the system, the side of the container, or a portion of the side of the container, comprises a magnet.

In other embodiments, the magnet used is part of a fixture, instrument, holder, tool or the like that is used to position the magnet relative to the PMPs.

In some embodiments, reagents for detection of the target comprise reagents for nucleic acid amplification (e.g. PCR, isothermal amplification, and the like) and/or sequencing. In some embodiments, the reagents for detecting the target comprise reagents for RT-PCR. qPCR, qtPCR, multiplex PCR, assembly PCR or asymmetric PCR, for example. In other embodiments, the reagents for detecting the target comprise reagents for immunoassays, which may use antibodies and/or antibody fragments to detect or measure a target or target analyte. In some embodiments, the immunoassay is an enzyme immunoassay, an ELISA (enzyme-linked immunosorbent assay, including direct ELISAs, indirect ELISAs, sandwich ELISAs and competitive ELISAs), an IEMA (immunoenzymometric assay), a radioimmunoassay (RIA), a fluoroimmunoassay, a chemiluminescent immunoassay (CLIA) and counting immunoassay (CIA).

In some embodiments, the invention provides a disposable cartridge comprising a flow-through assay to determine the presence or amount of a target in a sample of a fluid comprising a sample application space, a cartridge top, a cartridge bottom, reagents for detection or quantification of the target and an enclosure, the improvement comprising employing within the enclosure target-binding paramagnetic particles, at least one aqueous phase and at least one oil phase stabilized in proximity to one another by inclusion of a porous structural material associated with the aqueous phase or the oil phase or both, and a magnet. Other phases, and/or alternative phases, may be used or included.

In some embodiments, the invention provides a flow assay device (e.g., lateral flow, vertical flow) comprising a sample application portion, a conjugate portion, a test portion and pre-immobilized reagents in different parts of the device, the improvement comprising employing target-binding paramagnetic particles, at least one aqueous phase and at least one gaseous or oil phase stabilized in proximity to one another by inclusion of a porous structural material associated with the aqueous phase or the gaseous or oil phase or both, and a magnet. Other phases, and/or alternative phases, may be used or included. In some embodiments, the improved flow assay device is designed for use as a disposable, point-of-care device or cartridge.

In some embodiments, the invention provides an immunometric assay to determine the presence or concentration of a target substance in a sample comprising forming a ternary complex of a first labeled binding agent, said target substance, and a second binding agent said second binding agent being bound to a solid carrier wherein the presence or amount of the substance in the sample is determined by measuring either the amount of labeled binding agent bound to the solid carrier or the amount of unreacted labeled binding agent, the improvement comprising employing target-binding paramagnetic particles, at least one aqueous phase and at least one oil phase stabilized in proximity to one another by inclusion of a porous structural material associated with the aqueous phase or the oil phase or both, and a magnet. Other phases, and/or alternative phases, may be used or included. In some embodiments, the solid phase is a paramagnetic particle. in some embodiments one or more of the binding agents is an antibody, an antibody fragment, an oligonucleotide, an aptamer, a peptide, a peptidomimetic, natural or chemically modified antisense oligonucleotides, or other suitable agent to assist with capture of a target. In other embodiments, the assay improved with use of target-binding paramagnetic particles, at least one aqueous phase and at least one oil phase stabilized in proximity to one another by inclusion of a porous structural material associated with the aqueous phase or the oil phase or is an IEMA, an RIA, a CIA, a CLIA or a fluoroimmunoassay.

In some embodiments, reagents for detecting a target comprise reagents for identifying one aspect of the target. In some embodiments the reagents for detecting a target comprise reagents for identifying more than one aspect of the target. Target aspects include, for example, a peptide, a protein, a glycoprotein, epigenetic modifications of a nucleic acid, a nucleic acid sequence, cell surface receptor, a cell type, etc. In some embodiments the reagents for target detection comprise reagents for identifying more than one target, or one or more aspects of one or more targets. In some embodiments, the reagents for detecting more than one target are contained in different, physically separated, portions of the system or device, or in different part of a container comprising a system or device of the invention. In some embodiments, multiple targets are isolated, and multiple types of reagents for detecting these targets are contained within a single device or system. See, e.g., Example 13.

In some embodiments of the invention useful for performing one or more steps of an assay for the detection or measurement of a target or target analyte, one or more of the phases or layers of the device or system may comprise one or more of several different buffers. In some embodiments, one or more phases or layers comprise a coating buffer, a blocking buffer, a stabilization buffer, a washing buffer, or act as or comprise a sample diluent. In some embodiments, antibodies or antibody fragments are used to generate a detection signal. In some embodiments, the assay carried out using a device, system or method of the invention comprises in magneto-actuated immunoassay in which the movement or positioning of a target or target analyte is achieved using magnetic separation using a magnetic particle. In some embodiments, the particle used in these embodiments is made of a core of magnetite that is chemically modified by the attachment of antibodies or antibody fragments. In some embodiments, one or more or all components of an assay are used to isolate or purify a target or target analyte.

In some embodiments, the reagents for detection of the target comprise reagents for loop-mediated isothermal amplification (LAMP)-based detection of the target. In general, LAMP reactions include a DNA polymerase with strong strand displacement activity and tolerance for elevated temperatures and up to six DNA oligonucleotides of a certain architecture. RT-LAMP reactions additionally include a reverse transcriptase. Samples with potential template molecules are added to the reaction and incubated for 20 to 60 min at a constant temperature (e.g. 65° C.). The oligonucleotides act as primers for the reverse transcriptase, and additional oligonucleotides for the DNA polymerase are designed so the DNA products loop back at their ends. These, in turn, serve as self-priming templates for the DNA polymerase. In the presence of a few RNA template molecules, a chain reaction is set in motion, which then runs until the added reagents (in particular, the deoxynucleotide triphosphates) are used up.

LAMP assays or RT-LAMP assays are a particularly useful embodiment due to their rapid nature, one-tube processing, and easy visualization of results without the need for expensive equipment or additional materials. In particular embodiments, the reagents for detection of the target comprise reagents for a colorimetric assay for detecting the presence amount the target. Such embodiments allow for a facile visualization of whether or not the sample contains the target of interest. In some embodiments, the sample collection device contains reagents for a colorimetric loop mediated isothermal amplification (LAMP) assay. In embodiments wherein the nucleic acid is RNA, the sample collection device may contain reagents for a colorimetric RT-LAMP assay. In some embodiments, the reagents for a colorimetric LAMP assay (or colorimetric RT-LAMP assay) further include an indicator, which permits evaluation of a color change in the sample in the presence of sufficient nucleic acid (e.g. the target nucleic acid which the LAMP or RT-LAMP reagents are designed to detect). Suitable indicators include pH-sensitive indicators and metal-sensitive indicators. In some embodiments, pH-sensitive indicators (e.g. phenol red) may be used, due to their easy visualization with the naked eye. The best signal detection approach for particular applications (e.g., enzyme (fluorometric, calorimetric, chemiluminescent, enhanced chemiluminescent), radiometric, direct fluorescent, time-resolved fluorescent, direct chemiluminescent, phosphorescent, etc.) will be determined by the user. Signal amplification techniques and strategies may also be used in systems, devices, compositions and methods of the invention, as may multiplex techniques.

In some embodiments, the reagents for detection of the target comprise reagents for a fluorescent assay for detecting the target, or for determining the amount of the target, either quantitatively, semi-quantitatively, or at a predetermined threshold amount. For example, the sample collection device may contain reagents for a fluorescent LAMP or fluorescent RT-LAMP assay. Any suitable fluorescent dye may be used in a fluorescent LAMP or fluorescent RT-LAMP assay to permit a fluorescent signal to be generated in the presence of sufficient nucleic acid.

In some embodiments, the reagents for detection of the target comprise reagents for a "Yes/No" assay.

In some embodiments, the reagents comprise oligonucleotides (e.g. primers) designed for detection of bacterial nucleic acid or nucleic acid from any life form or replicating unit, including nucleic acid from eukaryotic cells, mitochondria and chloroplasts, etc. In some embodiments, the nucleic acid is bacterial nucleic acid. In some embodiments, the nucleic acid is viral nucleic acid. In some embodiments, the nucleic acid is nucleic acid from any source, including synthetic or genetically engineered source.

In some embodiments, the reagents comprise oligonucleotides designed for detection of viral RNA. In some embodiments, the reagents comprise oligonucleotides designed for detection of, for example, a SARS-CoV2, a coronavirus, a rhinovirus, an influenza virus, a respiratory syncytial virus, an adenovirus, a parainfluenza virus, a human immunodeficiency virus, a human papillomavirus, a rotavirus, a hepatitis virus (including a hepatitis A, B, C, D and/or E virus), a zika virus, an Ebola virus, a tuberculosis bacterium, *Borrelia burgdorferi, Borrelia mayonii*, a *Staphylococcus* bacterium, an *Aspergillus* fungus (including *Aspergillus niger*), or a *Streptococcus* (including *Streptococcus pyogenes*). For example, the reagents may comprise oligonucleotides designed for detection of a viral upper respiratory infection selected from a SARS-CoV2, a SARS, a coronavirus, a rhinovirus, an influenza virus, a respiratory syncytial virus, etc. In some embodiments, the reagents comprise oligonucleotides for detection of a SARS-CoV-2 RNA or a fragment thereof.

In some embodiments, the system further comprises a magnet. The magnet is used to draw the target-PMP complexes through the stacked porous materials and into contact with the reagents for detection of the analyte, and therefore may be referred to herein as a "purification magnet". The purification magnet may provide partial or complete purification. The purification magnet may be of suitable strength and/or placed in a suitable proximity to the bottom of the container, or within the container, to draw some, most, substantially all, or all of the target-PMP complexes through the stacked porous materials. For example, the purification magnet may be positioned below the container. In some embodiments, the system comprises a plurality of purification magnets (e.g. arranged in an array). For example, a plurality of purification magnets may be used to address a plurality of containers (e.g. a multi-well plate containing multiple samples from which isolation and detection of the analyte is desired) at the same time or in sequence. In some embodiments, a second set of magnets are used to influence or adjust the uniformity and strength of the purification magnets. For example, when the purification magnets are arranged in an array pattern, a second set of magnets may be positioned around the perimeter of the array to reduce edge effects, maintaining a more consistent magnetic field for each purification magnet in the array. Accordingly, a second set of magnets may be referred to herein as "field stabilization magnets". After binding, a magnet may be applied to the system, such as to the base of the container housing the plurality of porous materials, thus drawing target-PMP complexes through the stacked porous materials to purify or substantially isolate the target from other components within the sample. The pore size of the porous materials should be sufficient to permit target-PMP complexes to pass through the pores, while preventing other undesired contaminants from passing. Undesired contaminants may be from any source, e.g., undesired components of an original sample, environment, assay reagents, device, etc.

The pore size of the porous material may be optimized depending on the target to be isolated. In some embodiments, the pore size may range from 0.5 µM-0.5 mm.

The systems described herein may be used to isolate a target from any desired sample. In some embodiments, the sample is a biological sample. In some embodiments, the biological sample is a nasopharyngeal sample, an oropharyngeal sample, an oral swab or sponge sample, a nasal swab sample, a mid-turbinate sample, or a saliva sample. In particular embodiments, the biological sample is a saliva sample. In other embodiments, the biological sample is an NP sample. In some embodiments, the sample is an environmental sample. For example, the sample may be a sewage sample. In some embodiments, the environmental sample or biological samples are crude samples and/or wherein the one or more target molecules are not purified or amplified from the sample prior to application of a method of the invention or manipulation with a device, system, method or composition of the invention.

In some embodiments, biological sample is first mixed with lysis/binding buffer with or with a solid phase or a lysis/binding buffer and a solid phase (e.g. PMPs), and then added to the system or device, which may be in a container. In some embodiments the system or device already contains lysis/binding buffer and PMPs, and the biological sample is added to it. In some embodiments involving a biological sample acquired via a swab (e.g. nasopharyngeal sample, an oropharyngeal sample, an oral swab sample, an oral sponge sample, a nasal swab sample, a mid-turbinate sample, etc.), the swab is submerged and mixed into the lysis/binding buffer (and PMPs if already contained in the container). In some embodiments, a biological sample is acquired using a separate device or container which then interfaces with a container which already contains lysis/binding buffer and solid phase, e.g., PMPs. The joining/mating of the two containers/devices facilitates biological sample introduction into the system or device. In some embodiments, the biological sample undergoes certain preprocessing or pretreatment steps before being added to the system or device.

The sample may be collected and/or stored in a suitable container (e.g. a sample collection container) prior to adding the samples to a system as described herein. Any type of sample collection container may be used that is suitable for receiving a sample and storing the sample. Examples of sample collection containers include, but are not limited to, tubes containing a reversibly removal cap, bags, syringes, droppers, and the like. In some embodiments, the samples are pre-treated prior to use in a system as described herein. For example, the samples may be pre-treated in the sample collection container. As another example, the samples may be moved to a suitable second container and pre-treated within said second container.

In some embodiments, the samples may be pre-treated to inactivate potential pathogens (e.g. virus, bacteria) within the sample. For example, the samples may be pre-treated prior to use in a system as described herein. In some embodiments, the samples may be pre-treated to lyse cells within the sample, thus releasing the target (e.g. nucleic acid) for subsequent detection. In such embodiments, a pre-treatment step accomplishes both cell lysis (e.g. release of nucleic acid) and inactivation of potential pathogens within the sample. In some embodiments, the samples may be pre-treated by freezing, heating and/or the addition of a denaturant to the sample. For example, the sample may be pre-treated by heating to a sufficient temperature for a suitable duration of time to inactivate potential pathogens within the sample. For example, the sample may be heated to about 40° C. or higher. For example, the biological sample may be heated to about 40° C., 45° C., 50° C., 55° C., 60° C., 65° C., 70° C., 75° C., 80° C., 85° C., 90° C., 95° C., 100° C., or more than 100° C. The sample may be maintained at the heated temperature for a suitable duration of time, such as 5 minutes, 10 minutes, 20 minutes, 30 minutes, 40 minutes, 50 minutes, 60 minutes, or more than 1 hour. In particular embodiments, the sample may be heated to 98° C.-100° C. for 5 minutes to accomplish both cell lysis and viral inactivation in a single heat treatment step. In some embodiments, pre-treating the sample comprises adding a denaturant to inactivate potential pathogens within the sample. For example, a denaturant may be present in the lysis buffer with which the sample is contacted. For example, suitable denaturants include guanidine-based denaturants (e.g. guanidine hydrochloride, guanidine thiocyanate, etc.) and surfactants (e.g., Triton X-100, tween20). In some embodiments, the sample does not contain a denaturant. For example, in some embodiments the sample (e.g. saliva sample) may not contain a guanidine-based denaturant. In some embodiments, the sample (e.g. saliva sample) contains less than 0.3M of a guanidine-based denaturant. For example, the sample (e.g. saliva sample) may contain less than 0.3M, less than 0.25M, less than 0.2M, less than 0.15M, less than 0.1M, or less than 0.5M of a guanidine-based denaturant.

The viscosity of certain samples (e.g. saliva) makes sample handling difficult. Moreover, the viscosity of samples collected from different individuals varies, introducing potential issues with variability of sample collection between subjects. For example, a saliva sample with high viscosity may result in less volume of saliva successfully being pipetted into a desired container (e.g. for subsequent detection of a pathogen in the sample) compared to saliva with decreased viscosity. This can introduce potential downstream issues for variations or inaccurate results, including false negative results. In some embodiments, the samples may be pre-treated to reduce viscosity of the sample and thereby improve sample handling in subsequent processing steps. In particular embodiments, the pre-treatment step may be performed to inactivate pathogen(s) within the sample and reduce the viscosity of the sample in one step. In some embodiments, one or more agents to decrease viscosity may be added to the sample prior to using the sample in a system as described herein. In some embodiments, the agent to decrease viscosity is a reducing agent. Suitable reducing agents include, for example, dithiothreitol (DTT), tris(2-carboxyethyl)phosphine (TCEP), or 2-mercaptoethanol.

Any suitable amount of a reducing agent may be added to the sample (or present in the storage buffer in which the sample is placed upon collection). In some embodiments, the reducing agent is present in the lysis buffer with which the sample is contacted. In some embodiments, suitable concentrations of reducing agents may range from 0-500 mM. For example, suitable concentrations of DTT or TCEP may range from 0-250 mM (e.g. 0 mM, about 10 mM, about 20 mM, about 30 mM, about 40 mM, about 50 mM, about 60 mM, about 70 mM, about 80 mM, about 90 mM, about 100 mM, about 110 mM, about 120 mM, about 130 mM, about 140 mM, about 150 mM, about 160 mM, about 170 mM, about 180 mM, about 190 mM, about 200 mM, about 210 mM, about 220 mM, about 230 mM, about 240 mM, or about 250 mM). For example, dithiothreitol (DTT)) may be added to a biological sample (e.g. a saliva sample) at a suitable concentration to decrease viscosity of the sample. In some embodiments, DTT may be added to achieve a 1× concentration within the saliva sample. As another example, suitable concentrations of 2-mercaptoethanol may range from 0-500 mM (e.g. 0 mM, about 25 mM, about 50 mM, about 75 mM, about 100 mM, about 125 mM, about 150 mM, about 175 mM, about 200 mM, about 225 mM, about 250 mM, about 275 mM, 300 mM, about 325 mM, about 350 mM, about 375 mM, about 400 mM, about 425 mM, about 450 mM, about 475 mM, or about 500 mM.

In some embodiments, the viscosity reducing agent (e.g. DTT) is added to the sample prior to heating the sample (e.g. to inactivate pathogens and/or induce cell lysis). In some embodiments, the viscosity reducing agent may be present in a sample storage buffer to which the sample is added after collection. In some embodiments, the viscosity reducing agent is added to the sample after heating the sample. In some embodiments, the viscosity reducing agent is present in the lysis buffer with which the sample is contacted. In some embodiments, freezing the sample may be performed to reduce the viscosity of the sample. Any suitable pre-treatment step or combination of pre-treatment steps may be performed to achieve the desired result (e.g. cell lysis, pathogen inactivation, and/or reduction of viscosity of the sample).

The sample may additionally comprise a suitable detergent. For example, the sample may comprise an ionic detergent (e.g. sodium dodecyl sulfate, deoxycholate, cholate, etc.), a non-ionic detergent (e.g. Triton X-100, DDM, digitonin, Tween 20, Tween 40, Pluronic F-127), a zwitterionic detergent, or a chaotropic detergent. In some embodiments, the sample comprises 0-5% detergent (v/v). For example, the sample may comprise 0%, about 0.1%, about 0.2%, about 0.3%, about 0.4%, about 0.5%, about 0.6%, about 0.7%, about 0.8%, about 0.9%, about 1%, about 1.5%, about 2%, about 2.5%, about 3%, about 3.5%, about 4%, about 4.5%, or about 5% detergent. The detergent may be added to the sample (e.g. contacted with the sample as part of a lysis buffer) and/or present in a sample storage buffer to which the sample is added upon collection.

In some embodiments, the sample comprises a non-ionic detergent (e.g. Triton X-100). For example, the sample may comprise 0.001-0.1% Triton X-100. The sample may be brought to a suitable volume for subsequent use by the addition of a suitable buffer. For example, the sample may be brought to a suitable volume by the addition of phosphate buffered saline (PBS), universal transport medium (UTM), saline, and the like. Such buffers may be added to the sample or present in a sample storage buffer to which the sample is added upon collection. The sample may comprise one or more enzymes or chemical agents to assist with breaking down the contents therein to facilitate release of the desired target. For example, the sample may comprise one or more enzymes, such as one or more proteases. In particular embodiments, the sample may comprise proteinase K. The sample may additionally comprise one or more suitable reagents to prevent degradation of the target within the sample. For example, suitable buffers and/or inhibitors (e.g. RNase inhibitors, nuclease inhibitors, etc.) may be added to the sample prior to use in a system as described herein.

The systems, devices, compositions and methods described herein may be used for isolation, detection, identification, or quantification of any desired target from any sample or source. The devices, compositions and methods of the invention may be used for positioning any desired target from any sample or source for any purpose, including detection, quantification, etc.

In some embodiments, the devices, systems and/or methods are used for isolation and subsequent detection of a desired target. In some embodiments, the target is a cell. In some embodiments, the target is a nucleic acid (e.g. DNA, RNA, or various subtypes thereof including mRNA and rRNA), a protein, a metabolite, a carbohydrate, a glycopeptide, or a lipid. For example, the target may be DNA or RNA. In some embodiments, the target may be nucleic acid or proteins (e.g. antibodies, hormones, etc.) resulting from a pathogen infecting one or more subjects from which the sample was obtained. For example, the target may be bacterial nucleic acid (e.g. bacterial DNA or RNA) or viral nucleic acid (e.g. viral DNA or RNA). As another example, the target may be antibodies produced by the subject in response to infection with a pathogen.

In some embodiments, the devices, systems and/or methods are used to determine identity or paternity by sample analysis. In some embodiments, a sample is provided for use in device, system and/or method of the invention for prenatal or postnatal screening.

In some embodiments, the sample is obtained from a subject suspected of having an infection. For example, the biological sample may be obtained from a subject suspected of having an infection. In some embodiments, an environmental sample may be obtained from an area in which one or more members of the population are suspected of having an infection. For example, sewage may be collected and used to determine whether one or more members in the surrounding population have an infection of interest. The subject or one or more members of the population may be suspected of having any infection by a pathogen that can be detected in the sample, or an infection which causes the person to produce antibodies which may be detected in the sample. In some embodiments, the subject from which a biological sample is obtained or one or more persons in a population proximal to an area from which an environmental sample is collected are suspected of having a SARS-CoV2, a coronavirus, a rhinovirus, an influenza virus, s respiratory syncytial virus, an adenovirus, a parainfluenza virus, a human immunodeficiency virus, a human papillomavirus, a rotavirus, hepatitis virus (including a hepatitis A, B, C, D and/or E virus), a zika virus, an Ebola virus, a tuberculosis bacterium, *Borrelia burgdorferi*, a *Staphylococcus* bacterium, an *Aspergillus* fungus (including *Aspergillus niger*), or a *Streptococcus* (including *Streptococcus pyogenes*). In some embodiments, the subject or a member of the population may be suspected of having a bacterial infection or a viral infection. For example, the subject or a member of the population may be suspected of having an upper respiratory infection. For example, the subject or a member of the population may be suspected of having a viral upper respiratory infection, including infection with SARS-CoV-2, a coronavirus, rhinovirus, influenza, respiratory syncytial virus, and the like.

The systems described herein find use in methods for positioning or isolating a target from a sample, and/or the detection, identification, quantification or purification (partial or complete) of a target. In some embodiments, the systems described herein find use in methods for isolating and subsequently detecting the target in the sample. For example, in some aspects provided herein is a method for isolating a target from a sample, comprising adding the sample to a system as described herein. In some embodiments, the sample is lysed by coming into contact with a lysis buffer, thereby releasing the target analyte. The method further comprises applying a magnetic force to the bottom or side of a container, depending on the orientation of the phases or layers, meshes, etc., thus drawing the target analyte through the plurality of porous materials, thereby purifying the target from other potential contaminants present in the sample. In some aspects, provided herein is a method for isolating and detecting a target in a sample. The method comprises adding the sample to a system comprising a container housing a plurality of porous materials and reagents for detection of the target as described herein. The method further comprises applying a magnetic force to the bottom or side of the container, thereby drawing the target through the plurality of porous materials and into contact with reagents for detection of the target housed on a bottom surface of the container.

In some embodiments of the methods described herein, the sample is contacted with paramagnetic particles or functionalized paramagnetic particles (PMPs) as described herein prior to applying the magnetic force to the system. Contacting the sample with the paramagnetic particles generates one or more target-PMP complexes, and applying the magnetic force to the system draws the target-PMP complexes through the plurality of porous materials towards a bottom surface of the container. In some embodiments, the sample is contacted with (e.g. mixed with) paramagnetic particles in a separate container to generate a composition comprising one or more target-PMP complexes, and the composition is subsequently placed (e.g. pipetted into) the container housing the plurality of porous materials. In other embodiments, the paramagnetic particles are housed in the container housing the plurality of porous materials and the aqueous and oil phase(s). For example, lyophilized paramagnetic particles may be present within the container. The paramagnetic particles may be present within the container in liquid form (e.g. as part of a lysis buffer). In such embodiments, adding the sample to the container will cause the sample to contact the PMPs, thereby generating the target-PMP complexes within the container itself.

In some embodiments, the sample is contacted with a lysis buffer as described herein. As described above, the lysis buffer may be contacted with the sample prior to adding the sample to the system or the lysis buffer may be present within the container housing the plurality of porous materials. Contacting the sample with the lysis buffer enables release of the target from the various components of the sample, thereby facilitating subsequent isolation and/or detection of the target.

In some embodiments, the sample is contacted with a wash buffer. As described above, the wash buffer may be present within the container housing the plurality of porous materials. Application of the magnetic force to the bottom surface of the container thereby draws the target (e.g. target-PMP complexes) through the wash buffer present within the container, thereby facilitating further purification of the target.

In some embodiments, the methods further comprise detecting the target following removal or isolation of some, all or substantially all (as desired or required for purposes of the method), from the sample. In such methods, the systems comprise reagents for detecting the target housed at, near or on a bottom (or side) surface of the container, as described herein. The target-PMP complexes are drawn through the aqueous and oil phases, and through the plurality of porous materials, and come into contact with the reagents for detection of the target. In some embodiments, a suitable incubation time is allowed to pass at a suitable temperature (e.g. 20-60 minutes at 65° C.) and a signal resulting from contact is measured. For example, a colorimetric signal (e.g. a color change) or a fluorescent signal may be measured to determine which wells contain the target. Measuring a signal (e.g. color change, fluorescent signal) may occur, for example, by visualization (e.g. by the naked eye). Alternatively, the signal may be measured using equipment, such as a plate reader. For example, a fluorescent signal may be measured using a plate reader. In some embodiments, the isolated target-PMP complexes are contacted with the reagents for LAMP-based detection of the target, and a signal resulting from contact is measured. For example, the signal may be a colorimetric signal (e.g. a signal from a colorimetric RT-LAMP assay) or a fluorescent signal (e.g. a signal from a fluorescent RT-LAMP assay).

In some embodiments, the methods described herein are performed on a single sample. In other embodiments, the methods are performed simultaneously on a plurality of samples. In some embodiments, samples may be pooled and subsequently used in the systems and methods described herein. For example, biological samples may be collected from a plurality of distinct individuals, pooled together, and used in the methods described herein to determine whether a population has cases of infection with a pathogen (e.g. with SARS-CoV2). As another example, a plurality of biological samples may be collected from an individual, and the plurality of biological samples from a distinct individual may be pooled to increase the amount of sample available to be used in the methods described herein. Such embodiments may be useful for instances where an individual may be unable to provide an adequate volume of saliva during one collection, or when multiple tests may be performed using the same sample.

In some embodiments, the method steps described herein are automated. In some embodiments, sample preparation steps described herein are automated. In some embodiments, detection steps described herein are automated. In some embodiments, acquisition of results is automated. In some embodiments, communication of results to other devices or non-user third parties is automated. In some automated embodiments, the steps and/or methods described herein are executed by a computer, wherein the computer comprises a processor and a memory. The memory may contain software which instructs the processor to execute a given task. For example, the memory may contain software which instructs the processor to cause a multichannel pipette to attach pipette tips to the pipette, aspirate a sample, mix the biological sample with a PMPs to generate a composition comprising one or more target-PMP complexes, aspirate the composition into a system as described herein, bring a magnet into proximity to a bottom or other surface of the container (e.g. a side surface) housing the sample, or turning on an electromagnet that is within or in proximity of a surface of the container, and a plurality of porous materials, and other necessary functions to perform the claimed method.

The inventions described herein include a system for isolating a target from a sample, the system comprising at least one aqueous phase and at least one oil phase stabilized in proximity to one another within a container. In some embodiments of this system, the at least one aqueous phase and the at least one oil phase are stabilized within the container by a hydrophilic porous material immersed within the at least one aqueous phase and/or a hydrophobic porous material immersed within the at least one oil phase. In some embodiments of this system, the at least one aqueous phase and the at least one oil phase are stabilized within the container by modulating one or more chemical or physical material characteristics selected from buoyancy, surface chemistry, and porosity of a hydrophilic/hydrophobic porous material, if present in the system. In some embodiments, the at least one aqueous phase and the at least one oil phase are stabilized within the container by a hydrophilic porous material immersed within the at least one aqueous phase, a hydrophobic porous material immersed within the at least one oil phase, and by modulating surface chemistry such that the buoyancy of the at least one oil phase is less than the surface tension of the at least one aqueous phase. In any of these embodiments, the system may comprise a first aqueous phase, a second aqueous phase, a first oil phase, and a second oil phase. In any of these embodiments of a system described herein, the phases may be stacked in an alternating fashion within the container, such that the first and second aqueous phase are not in direct contact with one another and the first and the second oil phases are not in direct contact with one another. In any of these embodiments, the system is provided in a device comprising a container, and the container may comprise a top opening to permit addition of a sample to the container. In any of these embodiments, the system is provided in a device comprising an insert, and the insert may comprise an opening to permit addition of a sample to the insert. In some embodiments, the at least one aqueous phase is closest to the top opening of the container. In some embodiments, the at least one aqueous phase is closest to the portion of the insert where a sample is added. In some embodiments, the at least one oil phase is closest to the top opening of the container. In some embodiments, the at least one oil phase is closest to the portion of the insert where a sample is added. In any of these embodiments, the at least one aqueous phase may comprise, consist essentially of, or consist of a lysis buffer. In any of these embodiments, the at least one aqueous phase may comprise, consist essentially of, or consist of a wash buffer. In any of these embodiments, the system, device, container or insert may comprise paramagnetic particles (PMPs). In some embodiments, the PMPs are housed within the container. The system of claim the PMPs are lyophilized or dried, or in a liquid form. In some embodiments, PMPs are housed within the at least one aqueous phase. In some embodiments with more than one aqueous phase or layer, PMPs are housed within more than one or all of the aqueous phases or layers. In some embodiments, PMPs are housed within the at least one oil phase or layer. In some embodiments with more than one oil phase or layer, PMPs are housed within more than one or all of the oil phases or layers. In any of these embodiments, the system further comprises a magnet or other device to provide a magnetic force.

The inventions described herein include a system for isolating a target analyte from a sample, the system comprising a first aqueous phase, a second aqueous phase, a first oil phase, and a second oil phase wherein (a) the phases are stacked in an alternating fashion within a container, such that the first and second aqueous phases are not in direct contact with one another and the first and the second oil phases are not in direct contact with one another, and (b) the phases are stabilized within the container by (i) a hydrophilic porous material immersed within the first aqueous phase, (ii) a hydrophilic porous material immersed within the second aqueous phase; (iii) a hydrophobic porous material immersed within first oil phase; and (iv) a hydrophobic porous material immersed within the second oil phase.

In some embodiments of this system, the phases are further stabilized within the container by modulating surface chemistry such that the buoyancy of each oil phase is less than the surface tension of each aqueous phase, and/or such that the buoyancy of each oil phase is less than the water retention of each hydrophilic porous material. In some embodiments, the container comprises a top opening to permit addition of a sample to the container. Either the first aqueous phase or layer or the first oil phase or layer may be closest to the top opening of the container. The first aqueous phase or layer may comprise or consist essentially of a lysis buffer. In some embodiments of this system, the second aqueous phase comprises a wash buffer. In some embodiments of this system, the system further comprises PMP. In some embodiments of this system, the PMPs are housed within the container. In some embodiments, the PMPs may be in lyophilized or dried or liquid form. In some embodiments, the PMPs are housed within the first aqueous phase or the second aqueous phase or both. In some embodiments, the PMPs are housed within the first oil phase or the second aqueous phase or both. In any of these embodiments, the system further comprises a magnet or other device to provide a magnetic force. In some embodiments, the container comprises a multi-well plate. In some embodiments, the container comprises an insert. In some embodiments, the insert can be inserted into a multi-well plate. In some embodiments, the container comprises a single-use device.

Systems, devices, methods and compositions of the invention may be used for (and include reagents for) moving, isolating (in whole or in part), purifying (in whole or in part), detecting and/or quantifying a target. Targets and/or analytes include, for example, small molecules, proteins, peptides, immunoglobulins (e.g. IgA, IgM, IgG, IgE, lambda light chain, kappa light chain), enzymes, lipids, receptors (e.g. Her2 receptor), nucleic acids (e.g. DNA, introns, exons, non-coding elements, RNA, rRNA, mRNA, microRNA), circulating tumor DNA (ctDNA), orphan non-coding RNA (oncRNA), circulating pathogen DNA and circulating pathogen RNA, antigens (e.g. PSA), hormones (e.g. testosterone) and cancer and other cells, including circulating tumor cells (e.g., circulating tumor cells of epithelial origin which are related to metastatic breast, prostate, and colorectal cancers), circulating endothelial cells, cellular vesicles, exosomes, bacterial quorum sensing molecules. Targets and analytes include biomarkers, including molecular and histologic biomarkers, screening markers (primary, secondary and targeted), diagnostic biomarkers, prognostic biomarkers, predictive biomarkers, pharmacodynamic/response biomarkers, susceptibility/risk biomarkers, monitoring biomarkers and safety biomarkers.

Any bacterial, virus or other pathogen may be tested, isolated, separated, purified, identified, detected or quantified using a system, device, method or composition of the invention. In some embodiments, a viral target for testing, isolation, separation, purification, detection or quantification is a Coronaviridae virus, a Picornaviridae virus, a Caliciviridae virus, a Flaviviridae virus, a Togaviridae virus, a Bornaviridae, a Filoviridae, a Paramyxoviridae, a Pneumoviridae, a Rhabdoviridae, an Arenaviridae, a Bunyaviridae, an Orthomyxoviridae, or a Deltavirus. In other embodiments, the virus is a Coronavirus, a SARS, a Poliovirus, a Rhinovirus, a Hepatitis A virus, a Norwalk virus, a Yellow fever virus, a West Nile virus, a Hepatitis C virus, a Dengue fever virus, a Zika virus, a Rubella virus, a Ross River virus, a Sindbis virus, a Chikungunya virus, a Borna disease virus, an Ebola virus, a Marburg virus, a Measles virus, a Mumps virus, a Nipah virus, a Hendra virus, a Newcastle disease virus, a Human respiratory syncytial virus, a Rabies virus, a Lassa virus, a Hantavirus, a Crimean-Congo hemorrhagic fever virus, an Influenza virus, or a Hepatitis D virus. In some embodiments, the virus is one or more of the above viruses (or another virus) that has evolved or mutated to a new strain. In some embodiments, the virus is a virus that has been created, mutated or engineered by humans.

In some embodiments, the invention provides a method for monitoring or evaluating viral disease outbreaks and/or viral evolution using a system, device, method or related composition of the invention.

In some embodiments, devices, systems, methods and compositions of the invention are used in a method of screening samples for viral antigens, viral nucleic acids and/or viral specific antibodies, bacterial and/or other pathogen-specific antigens, nucleic acids and/or antibodies.

In some embodiments, a nuclease inactivation step is carried out in or with a device, system, method or composition of the invention in assaying, testing for, screening for, separating, isolating, purifying, identifying, detecting and/or quantifying a target nucleic acid. Some embodiments include heat inactivation, chemical inactivation, ultrasonic inactivation, etc. In some embodiments, targets for tests or assays or other protocols using systems, devices, methods and compositions of the invention include tumor markers (e.g., alpha-fetoprotein (AFP), beta-2-microglobulin (B2M), beta-human chorionic gonadotropin (ß-hCG), bladder tumor antigen (BTA), chromogranin A (CcA, neuroendocrine tumors), gastrin (gastrinoma), 5-HIAA (carcinoid tumors) ALK gene rearrangements and overexpression, BCL2 gene rearrangements, BRCA1 and BRCA2 gene mutations); cancer genes and subsequences; cancer markers, including, for example, programmed death ligand 1; ER/PR, CA15-3 and CA27.29 (breast cancer); EGFR, KRAS and UGT1A1 (colorectal cancer); HER-2/neu (breast and gastric cancers); c-KIT/CD117 gastrointestinal stromal tumor, mucosal melanoma, acute myeloid leukemia, and mast cell disease); CD20, CD30, FIP1L1-PDGFRalh, Philadelphia chromosome, PML/RAR-alpha, TPMT, UGT1A1 (leukemia, lymphoma); EML4/ALK, EGFR, KRAS (lung cancer), BRAF (melanoma), CA125, CA125 II and HE4 (ovarian cancer); BRAF V600 mutations (e.g., cutaneous melanoma, colorectal cancer, and non-small cell lung cancer); CA19-9 and CA19-9 XR (pancreatic, gallbladder, bile duct, and gastric cancers); calcitonin (medullary thyroid cancer); carcinoembryonic antigen (CEA) (colorectal cancer and other cancers; CD19 and CD22 (B-cell lymphomas and leukemias); CD20 (non-Hodgkin lymphoma); CD25 (non-Hodgkin (T-cell) lymphoma); CD30 (classic Hodgkin lymphoma, B-cell and T-cell lymphomas); CD33 (acute myeloid leukemia); chromosome 17p deletion (chronic lymphocytic leukemia); chromosomes 3, 7, 17, and 9p2 (bladder cancer); nuclear matrix protein 22, fibrin/fibrinogen (bladder cancer); cytokeratin fragment 21-1 (lung cancer); cyclin D1 (CCND1) gene rearrangement or expression (lymphoma, myeloma); Des-gamma-carboxy prothrombin (DCP)(hepatocellular carcinoma); gene mutations (e.g. DPD, EGFR, FGFR2, FGFR, FLT3, IDH1, IDH2, JAK2, KRAS and MYD88 gene mutations); gene rearrangements (e.g.,IRF 4 gene, ROS1 gene, and T-cell receptor gene rearrangements); gene fusions (e.g., NTRK gene fusion and PML/RARα fusion gene); PCA3 mRNA, PSA free and PSA total (prostate cancer); HER2/neu gene amplification or protein overexpression (breast, ovarian, bladder, pancreatic, and stomach cancers); lactate dehydrogenase (germ cell tumors, lymphoma, leukemia, melanoma, and neuroblastoma); MYC gene expression, myeloperoxidase (MPO), terminal transferase (TdT) (lymphomas, leukemias); neuron-specific enolase (NSE) (neuroblastoma); and, e.g., prostatic acid phosphatase (PAP) (metastatic prostate cancer), tumor suppressors lost in cancer (e.g. BRCA1, BRCA2); cardiovascular and cardiometabolic markers (e.g. C-reactive protein (CRP), troponins, including high-sensitivity cardiac troponin I and cardiac troponin T (e.g., cTnI and cTnT), B-type natriuretic peptides (e.g., BNP and NT-proBNP), D-dimer, tetranectin, serum cyclin-dependent kinase 9), CK-MB, galectin-3, adiponectin, adipocyte fatty acid-binding protein, heart-type fatty acid-binding protein, lipocalin-2, fibroblast growth factor 19 and 21, retinol-binding protein 4, plasminogen activator inhibitor-1, 25-hydroxyvitamin D, and proprotein convertase subtilisin/kexin type 9 (PSCK9), lipocalin-2, H-FABP, A-FABP), triglycerides, high-density lipoprotein (HDL)-cholesterol, and low-density lipoprotein (LDL)-cholesterol, etc.; growth factors (e.g., TGFβ, FGF-19, FGF-21, EGF, PDGF); and, inflammatory biomarkers (e.g., interferons and cytokines (e.g. TNFα, IL-1, IL-6 and other interleukins), alpha-1 antitrypsin, alpha-1 glycoprotein, anti-CCP, ASO (anti-streptolysin), complement C3, complement C4, CRP, IgA, IgE, IgG, IgM), procalcitonin, PCT (BRAHMS), rheumatoid factor), chemokines (e.g., G-CSF, GM-CSF), RPB-4, PAI-1, 25-hydroxyvitamin D, etc.). In some embodiments, targets include hormones, amyloids and other receptors (e.g., IFN receptors, IL-6 receptors, IL-10 family receptors, TGFβ family receptors, chemokine receptors); protein signatures (e.g., 5-Protein signature (OVA1)) and gene signatures (e.g., 17-, 21-, 46- and 70-gene signatures). In other embodiments, targets include disease vectors, including bacteria, viruses and fungi. In some embodiments, targets include bacterial, viral and/or fungal nucleic acids, alone, together or in multiplex format.

Other targets include active B-12, B12, ferritin, folate, haptoglobin, homocysteine, iron, transferrin and UIBC (unsaturated iron-binding capacity). These targets may be used, for example, in assays or tests for anemia.

Other targets include active alkaline phosphatase, calcium, intact PTH (intact PTH), magnesium, phosphorous and vitamin D. These targets may be used, for example, in assays or tests for bone disease or disorders, including evaluation of bone remodeling and the identification of disorders involving mineral pathways that impact bone formation.

Other targets include targets for use in tests or assays to test for many types of cancers including, breast, colon, gastrointestinal, liver, ovarian, pancreatic, testicular and prostate cancer, and others as noted. Additional cancer-related targets include CYFRA 21-1 (cytokeratin 19 fragment), pepsinogen I and pepsinogen II, and PIVKA-II (a circulating precursor of prothrombin and hepatocarcinoma marker), and proGRP (progastrin-releasing peptide) and SCC (squamous cell carcinoma associated antigen.

Other targets include targets for use in tests or assays to test for metabolic diseases impacting glucose function, including diabetes. They include C-peptide, creatinine, creatinine (enzymatic), fructosamine, glucose, hemoglobin A1c, insulin and microalbumin.

Other targets include targets for use in tests or assays to test for the presence of abused drugs and toxic levels of prescription medications. Targets include acetaminophen, amphetamine/methamphetamine, barbiturates, benzodiazepines, cannabinoids, cocaine, ecstasy, methadone, ethanol, methanol, opiates, PCP (phencyclidine), salicylate, and antidepressants, including tricyclic antidepressants.

Other targets include targets for use in reproductive endocrinology tests or assays to evaluate fertility and/or pregnancy status. They include DHEA-S, estradiol, FSH, hCG (including total beta-hCG), LH (luteinizing hormone), progesterone, prolactin, SHBG (sex hormone binding globulin), testosterone (free testosterone, attached testosterone and/or total testosterone). Assays that may be carried out using systems, devices, methods and compositions of the invention include that testosterone $2^{nd}$ generation assay.

Other targets include targets for use in infectious disease tests or assays. They include CMV IgG, CMV IgM, CMV IgG avidity, rubella IgG, rubella IgM, toxoplasma IgG, toxoplasma IgM, toxoplasma IgG avidity.

Targets also include hepatitis targets, including anti-HAV IgG, anti-HAV IgM, anti-HBc IgM, anti-HBe, anti-HBs, anti-HCV, HBeAg (including HBsAg Quantitative and Qualitative) and HCVAg. Targets for other infectious diseases include chagas (caused by the parasite *Trypanosoma cruzi*), EBV EBNA-1-IgG, EBV VCA IgG, EBV VCA IgM, syphilis TOP. Other targets include anti-HTLV-I/HTLV-II (retrovirus).

Other targets include targets for use in tests or assays using systems, devices, methods and compositions of the invention to evaluate or diagnose hepatic function and/or liver disease. These targets include albumin (BCB and BCP), alkaline phosphatase, alpha-1 antitrypsin, ALT (alanine aminotransferase), ALT, activated (alanine aminotransferase), ammonia, AST (aspartate aminotransferase), AST, activated (aspartate aminotransferase), bile acids, cholinesterase, cholinesterase/dibucain, direct bilirubin, total bilirubin, GGT (gamma-glutamyl transferase), lactate dehydrogenase and PIVKA-II (des-gamma-carboxy prothrombin).

Other targets include targets for use in tests or assays using systems, devices, methods and compositions of the invention to evaluate or diagnose traumatic brain injury (mTBI [UCH-L1+GFAP]).

Other targets include targets for use in tests or assays using systems, devices, methods and compositions of the invention to evaluate or diagnose thyroid disorders. They include anti-thyroid peroxidase (anti-TPO) and anti-thyroglobulin (anti-TG) antibodies, free T3 (triiodothyronine), total T3, free T4 (thyroxine), total T4, TSH (thyroid stimulating hormone) and T-uptake (thyroid hormone uptake, which provides information on the number of thyroid hormone binding sites, consisting primarily of thyroid binding globulin, thyroxine binding prealbumin and albumin).

Other targets include targets for use in tests or assays using systems, devices, methods and compositions of the invention to evaluate or diagnose renal diseases or disorders. These targets include beta-2-microglobulin, creatine, creatine (enzymatic), cystatin C, microalbumin, NGAL (neutrophil gelatinase-associated lipocalin), protein (urine/CSF), urea nitrogen and uric acid.

Other targets include targets for use in tests or assays using systems, devices, methods and compositions of the invention to help prevent rejection and reduce toxicity in transplant patient. Targets include cyclosporine, sirolimus and tacrolimus.

Other targets include the proteins apolipoprotein A1, apolipoprotein B, transferrin, ceruloplasmin, haptoglobin, Lp(a) and prealbumin.

Other targets include any therapeutic drug(s) for treatment monitoring and precision medicine, e.g., for helping make medical decisions, treatments, practices, or products tailored to a subgroup(s) of patients. Targets for monitoring or evaluation of use in, therapeutic activity in, or suitability for a subject include any marketed therapeutic or therapeutic candidate (including clinical trial candidates). They include, for example, amikacin, digitoxin, digoxin, lithium, methotrexate, steroids (e.g. progesterone), phenytoin, quinidine, theophylline, anticonvulsants (e.g. valproic acid), antifungals, antivirals and antibiotics (e.g. tobramycin, vancomycin).

In some embodiments, a device, system, method or composition is used in (or as) a diagnostic method. Diagnostic methods include but are not limited to diagnostic methods, assays and tests for targets, including pathogens, cardiovascular and neurological events, and diseases, disorders and conditions including cancers (e.g. early detection of cancer), and other methods, assays and tests directed to any of the targets disclosed or referred to herein.

Devices, systems, methods and compositions of the invention can be used in or with any assay format or device. Formats include direct, indirect and sandwich assays which are run manually or semi-automated on multi-well plates (e.g., 8-, 24-, 48-, 96 and 384-well plates) where samples are measured in duplicate, for example. They include any immunoassay, including any of the immunoassays described or referred to herein. They include the use of devices, systems, methods and compositions of the invention in or for any ligand-binding assay that measures binding between a ligand and a receptor, any immunoassay that detects antibody-antigen binding, and any bioassay that measures biological activity in response to certain stimuli.

In some embodiments, the invention comprises any assay or assay device or assay format, the improvement comprising a fluid-fluid interface and/or fluid phase or layer stabilized with an associated supporting structure (e.g. a porous mesh) having preference for at least one fluid.

In some embodiments, reagents for detection or quantification or a target may be housed at, near or on a bottom surface of a container. In some embodiments, the reagents for detecting the target comprise reagents for a loop mediated isothermal amplification (LAMP) or a reverse transcriptase loop mediated isothermal amplification (RT-LAMP) assay. In some embodiments, the LAMP or RT-LAMP assay is a colorimetric assay or a fluorescent assay.

The inventions include the use of a system or device in a method for isolating a target from a sample. Another embodiment of the invention comprises a method for isolating a target from a sample, the method comprising (a) adding a sample to a system comprising at least one aqueous phase and at least one oil phase stabilized in proximity to one another within a container; and (b) applying a magnetic force to the system, wherein the sample is contacted with paramagnetic particles (PMPs) prior to applying the magnetic force to the system, wherein contacting the sample with the paramagnetic particles generates one or more target-PMP complexes, and wherein applying the magnetic force to the system draws the target-PMP complexes through the at least one aqueous phase and the at least one oil phase towards a bottom surface of the container. In some embodiments of the method, the at least one aqueous phase and the at least one oil phase are stabilized within the container by a hydrophilic porous material immersed within the at least one aqueous phase and/or a hydrophobic porous material immersed within the at least one oil phase and/or by modulating one or more chemical or physical material characteristics selected from buoyancy, surface chemistry, and porosity of a hydrophilic/hydrophobic porous material, if present in the system. In some embodiments of the method, the method comprises use of a system two or more aqueous phases or layers, and two or more oil phases or layers, which may or may not be stacked in an alternating fashion within the container, such that, for example, a first and second aqueous phase are not in direct contact with one another and a first and second oil phase are not in direct contact with one another. Other embodiments relating to containers, inserts, PMPs, wash buffers, lysis buffers and so on, as well as samples and reagents, are as above.

In another method embodiment of the invention isolating a target from a sample, the method comprises (a) adding a sample to a system comprising a first aqueous phase, a second aqueous phase, a first oil phase, and a second oil phase, wherein the phases or layers are stacked in an alternating fashion within the container, such that the first and second aqueous phases are not in direct contact with one another and the first and the second oil phases are not in direct contact with one another, and the phases or layers are stabilized within the container by a hydrophilic porous material immersed within the first aqueous phase, a hydrophilic porous material immersed within the second aqueous phase, a hydrophobic porous material immersed within first oil phase; and a hydrophobic porous material immersed within the second oil phase; and (b) applying a magnetic force to the system, wherein the sample is contacted with paramagnetic particles (PMPs) prior to applying the magnetic force to the system, wherein contacting the sample with the paramagnetic particles generates one or more target-PMP complexes, and wherein applying the magnetic force to the system draws the target-PMP complexes through the phases towards a bottom surface of the container. In some embodiments of this method, the phases are further stabilized within the container by modulating surface chemistry such that the buoyancy of each oil phase is less than the surface tension of each aqueous phase, and/or such that the buoyancy of each oil phase is less than the water retention of each hydrophilic porous material. In some embodiments of this method, the container comprises a top opening to permit addition of a sample. In some embodiments of this method, the first aqueous phase or layer or the first oil phase or layer is closest to the top opening of the container. In some embodiments of this method, the first or second aqueous phase or layer, or both, comprises or consists essentially of a lysis buffer. In some embodiments of this method, the first or second aqueous phase or layer, or both, comprises or consists essentially of a wash buffer. In some embodiments of this method, the first or second aqueous phase or layer comprises or consists essentially of a lysis buffer and the first or second aqueous phase or layer comprises or consists essentially of a wash buffer. In some embodiments of this method, all PMPs are housed within the container. In some embodiments of this method, all PMPs are housed within one or more aqueous and/or oil phases or layers. In other embodiments of this method, some PMPs are housed within the container and some are added to the sample or the container or both during the method. In some embodiments, the sample is biological sample, an environmental sample (e.g., a sewage sample), a saliva sample, a swab sample, a sample obtained from a subject suspected of having an infection. In some embodiments, the subject is suspected of having a viral infection, a viral upper respiratory infection, or, for example, an infection selected from SARS-CoV2, SARS, a coronavirus, rhinovirus, influenza, and respiratory syncytial virus. In certain embodiments, the target comprises viral nucleic acid. In some embodiments, the target comprises SARS-CoV-2, hepatitis B, hepatitis C, HIV, West Nile Virus, herpes and/or influenza nucleic acid.

In some embodiments, the fluid phases and layers, including aqueous, gas and oil phases and layers, stabilizing structures and other components described herein are designed and incorporated together in a holding body (e.g., a vessel, container, insert, etc.) to form the systems, devices and methods using certain predefined design guidelines. The design guidelines for each component can be dependent upon one or more factors such as, e.g., holding body design (i.e., single-piece body, multiple piece body, modular body, single read chamber, multiple read chamber, and the like), manufacturing process (e.g., injection molding, blow molding, hot stamping, casting, machining, etc.), phases and layers (e.g., aqueous, oil, gas, blends, mixtures and emulsions, etc.), structural materials (e.g., polypropylene mesh, nylon mesh, glass mesh, porous plastic screen, PVDF, polystyrene, or other stabilizing structure), porosity of materials, functional requirements (e.g., sample size, reagent volumes, detection technology, time-to-result, incubation, heating, etc.), safety/handling requirements (e.g., self-containment, regulatory approval, ease of use, etc.), and/or the like, and in the case of assays, assay requirements (e.g., binding assay, competitive binding assay, single step assay, two-step assay, etc.).

Figure 15:
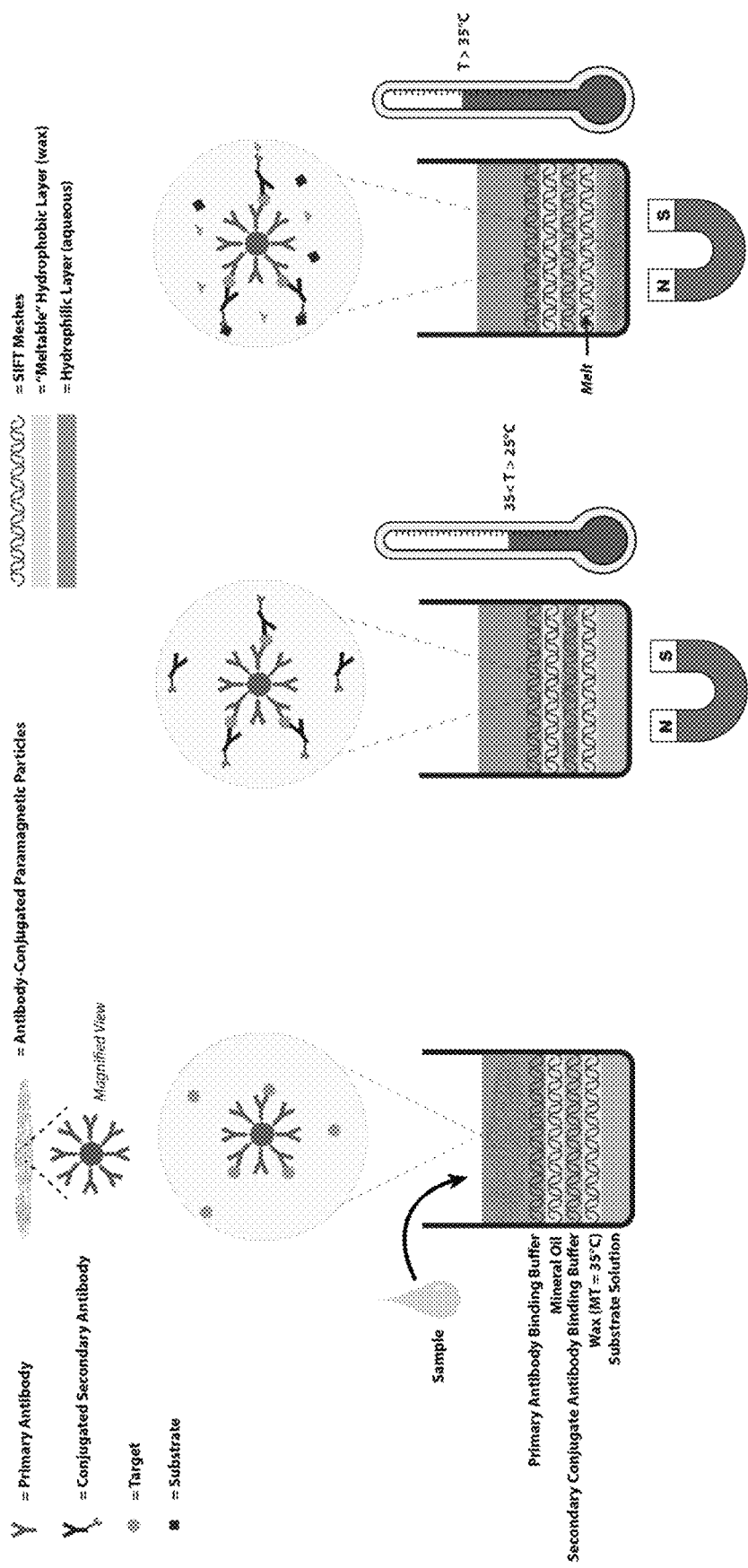
FIG. 15. is a schematic showing an overview of one embodiment of a system and method of the invention described and claimed herein. In this embodiment, the system contains reagents for detecting a target in a biological sample (e.g. saliva, sputum, urine, blood, cell culture media etc.) using an enzyme-linked immunosorbent assay (ELISA). The system comprises, from top to bottom, a primary antibody binding buffer consisting in part of antibody-conjugated PMPs with a nylon porous material, mineral oil with a polypropylene porous material, a secondary conjugate antibody binding buffer (or buffer) comprising a secondary antibody conjugated to an enzyme (e.g. horseradish peroxidase), a solidified wax layer with a polypropylene porous material, and a substrate solution containing enzyme substrate (e.g. 3,3',5,5'-Tetramethylbenzidine). In this embodiment, a biological sample is added to the top of the system and mixed with a primary antibody binding buffer allowing target to bind to primary antibody. A magnetic field is applied to the bottom of the container causing the target-PMP complexes to be pulled through the mineral oil layer, and into the secondary conjugate antibody binding buffer. If the temperature is above the freezing temperature of the secondary conjugate antibody binding buffer and below the melting temperature of the wax layer, the target-PMP complexes will remain in the secondary conjugate antibody binding buffer until the temperature increases above the wax melting temperature. Incubation in this layer allows for secondary conjugate antibodies to bind to target-PMP complexes. In this embodiment, when the temperature increases above the melting point of the wax, the conjugated secondary antibody-target-PMP complexes are pulled into the substrate solution. Once in the substrate solution conjugated secondary antibody-target-PMP complexes can catalyze the enzymatic reaction on the substrate allowing for detection of target.

The embodiment of the invention depicted in FIG. 15 for using the invention in a sandwich ELISA assay, for example, involves the following materials and methods for assembly. This embodiment uses the following materials: a container (e.g. 96-well microtiter plate, injection molded commodity, etc.), hydrophobic porous structural material (e.g. polypropylene mesh, etc.), hydrophilic porous structural material (nylon mesh, etc.), paraffin wax with a melting temperature around 35° C., mineral oil, primary antibody binding buffer (containing buffering components, salt components, detergent, protein components, etc.), paramagnetic particles conjugated to an antibody against a target, secondary conjugate antibody binding buffer (containing, a secondary antibody conjugated to an enzyme, e.g. HRP, alkaline phosphatase, etc.), buffering components, salt components, detergent, protein components, etc.), and a substrate solution (e.g. TMB, para-Nitrophenylphosphate, etc.). Assembly and establishment of the stabilized layers and other assay components is as follows: substrate solution is first added to bottom (surface) of the container. The container is then heated to above 35° C. and liquid paraffin wax is added. Hydrophobic porous structural material cut to the appropriate dimensions (e.g. diameter, thickness, etc.), such that the material is press-fit into place once inside the container, is added to the liquid paraffin. The container is then brought to room temperature (e.g. 22° C.) solidifying the paraffin into wax. A hydrophilic porous structural material (e.g. nylon), cut to the appropriate dimensions (e.g. diameter, thickness, etc.) is first submerged in secondary conjugate antibody binding buffer, and then placed in the container. Mineral oil is added to the container, along with a hydrophobic porous structural material, cut to the appropriate dimensions (e.g. diameter, thickness, etc.). Lastly, primary antibody binding buffer and paramagnetic particles conjugated to an antibody against a target are then added to the container along with a hydrophilic porous structural material (e.g. nylon), cut to the appropriate dimensions (e.g. diameter, thickness, etc.).

In other embodiments, the assay is a RT-LAMP assay, for example. In some embodiments, reagents for RT-LAMP are dried or lyophilized onto the bottom surface of the container. In some embodiments, the stabilized phases are established by first submerging an appropriate permeable material (based on, e.g. contact angle, pore size, porosity, etc.) into a desired fluid and then placed in a container. In some embodiments, the layers are assembled in a dry format whereby an appropriate porous material for association with a phase or layer is submerged into a desired fluid, removed from said fluid, and then frozen (e.g. wax solidification, water freezing, etc.). These components are then added to the container in layers. In some embodiments an excess of fluid is added to a container, and porous structural material, with and without an associated fluid, is added to the fluid. In some embodiments, the porous structural material is first placed in a container and fluid is added. In some embodiments the temperature is changed to adjust the fluid phase to aid assembly. In some embodiments ambient pressure is changed to adjust the fluid phase to aid assembly. In some embodiments, atmospheric gas composition is adjusted to aid assembly. In some embodiments, reagents are dried or lyophilized in the container. In some embodiments, solid components (e.g. salt crystals, PMPs, etc.) are added to a stabilized phase before additional stabilized phases are layered on top. In some embodiments, the assembly of stabilized phases are done in an automated fashion.

In some embodiments, a device or system of the invention, including a disposable and/or point-of-care device or assay or cartridge, is fitted with bluetooth functionality (e.g., a chip with bluetooth radio) to allow transmission of results to a bluetooth-equipped device (e.g., a phone or computer). In some embodiments, system or device results or results from a method as described herein are transmitted via bluetooth or other communication functionality (e.g. Wifi, near field communication, cellular networks, etc.) to another device (e.g. a phone, a tablet, a CPU, a computer, an imaging device, a storage device, etc.).

In some embodiments, a computer system is programmed or otherwise configured to implement methods of the present disclosure (or is associated with or comprises a device or system of the invention). In some embodiments, a CPU or computer can execute a sequence of machine-readable instructions, which can be embodied in a program or software. The instructions may be stored in a memory location. The instructions can be directed to the CPU, which can subsequently program or otherwise configure the CPU to implement methods of the present disclosure. Examples of operations performed by the CPU can include sample addition, addition of PMPs (or other target-binding solid phase material(s)), movement of a stabilizing interface structure, application of a magnetic or other force to a device or system (or in a method), heating, cooling or thermocycling. The CPU can be part of a circuit, such as an integrated circuit. One or more other components of the system can be included in the circuit. In some cases, the circuit is an application specific integrated circuit.

The computer system can also include a memory or memory location (e.g., random-access memory, read-only memory, flash memory), electronic storage unit (e.g., hard disk), communication interface for communicating with one or more other systems, and peripheral devices, such as cache, other memory, data storage and/or electronic display adapters. The storage unit can be a data storage unit (or data repository) for storing data. The computer system can be operatively coupled to a computer network with the aid of the communication interface. The network can be the Internet, an internet and/or extranet, or an intranet and/or extranet that is in communication with the Internet. The network can include one or more computer servers, which can enable distributed computing, such as cloud computing. The network, in some cases with the aid of the computer system, can implement a peer-to-peer network, which may enable devices coupled to the computer system to behave as a client or a server.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

EXAMPLES

Example 1: System and Method for LAMP-based Detection of SARS-CoV-2 RNA

The system and device and methods described in this Example comprises reagents for LAMP-based detection of the target housed on a bottom surface of the container. The system comprises two porous materials, a lysis buffer, and a wash buffer. As shown in the FIG. 1, the system in this embodiment is configured in layers in the following order, from top to bottom: (1) coconut oil, (2) lysis buffer with a glass mesh, (3) coconut oil with a porex mesh, (4) wash buffer with a glass mesh, (5) coconut oil with a porex mesh, and (6) reagents for LAMP reaction with a glass mesh.

Each porous material may be a hydrophilic glass mesh. Alternatively, one porous material may be a glass mesh and the other porous material may be a synthetic hydrophobic polymer mesh.

Figure 12:
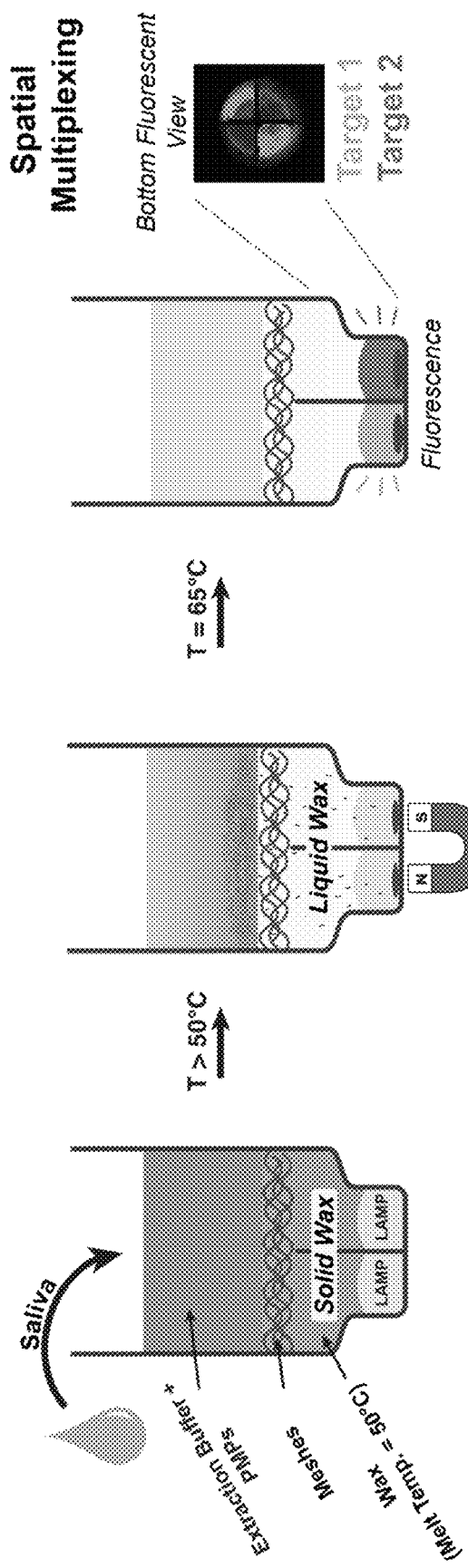
FIG. 12 shows a diagram of a point-of-care (POC), single use system as described herein. This embodiment comprises reagents for LAMP-based (or RT-LAMP) detection housed on the bottom surface of the container. In this embodiment, the bottom surface of the container includes a septum which divides the bottom portion of the container into multiple wells which can be filled with reagents for LAMP-based detection, assaying for different portions of the target, i.e. spatially separated multiplexing. In this embodiment, from top to bottom, the system comprises a lysis/binding buffer with PMPs ("Extraction Buffer+PMPs"), a solidified wax with polypropylene meshes, and LAMP reagents. In this embodiment the sample is a biological sample, containing target or suspected, and is saliva. In this embodiment the sample is added and mixed to the lysis/binding buffer containing PMPs. Upon heating to above the melting temperature of the wax, and application of a magnetic field to the bottom of the container, the wax will melt, permitting target-PMPs to be pulled down into contact with the plurality of LAMP reagents. The container may be incubated at a suitable temperature (e.g. 65° C.) to perform the LAMP assay.
Figure 13:
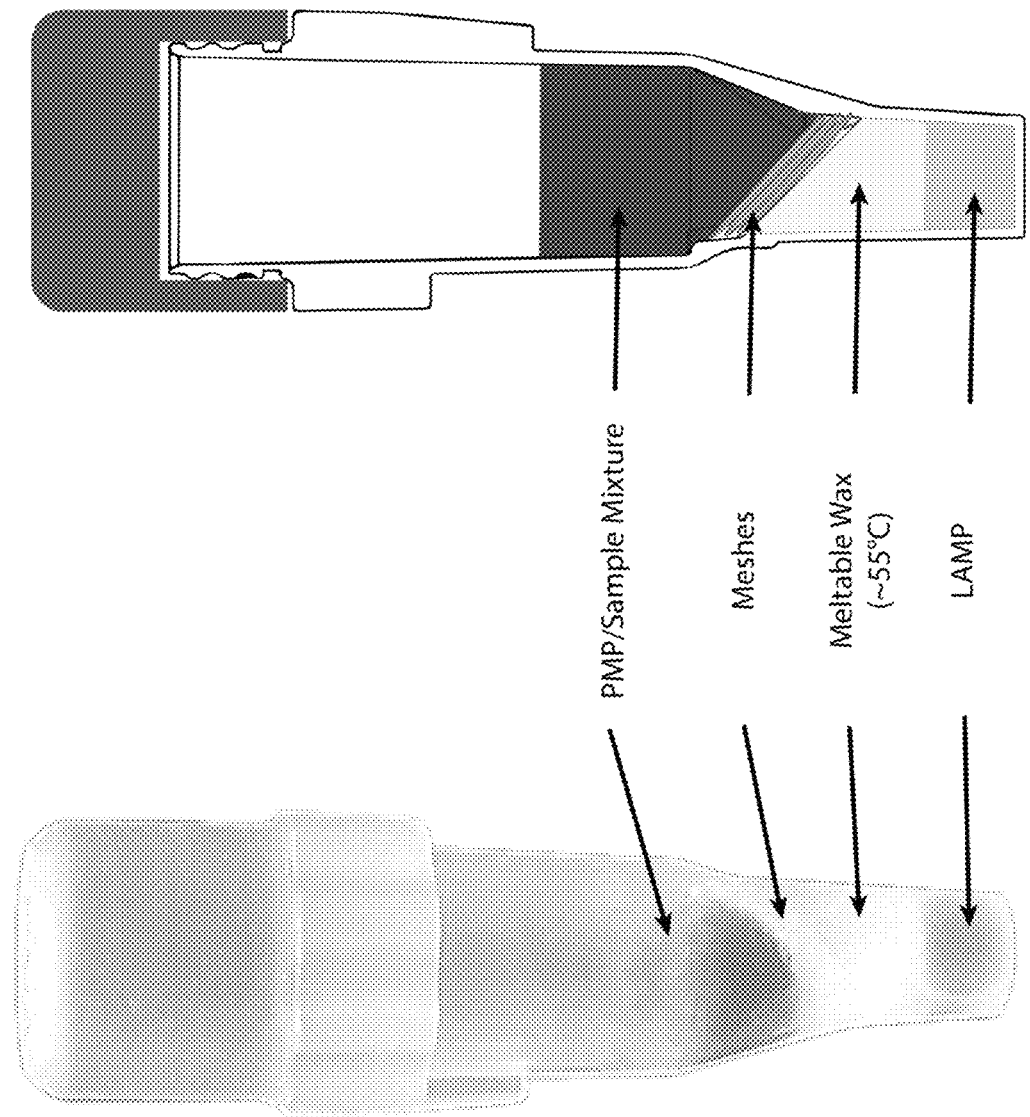
FIG. 13 shows a picture (left) and a cutaway diagram (right) of one embodiment of a system as described herein. This embodiment of a point-of-care (POC), single use system comprises reagents for LAMP-based (or RT-LAMP) (green) detection housed on the bottom surface of the container. The system comprises a meltable wax layer (yellow) and a plurality of porous polypropylene materials ("meshes")(grey). The system comprises a lysis/binding buffer with PMPs ("PMP/Sample Mixture"). As shown in the figure, the system is configured in layers in the following order, from top to bottom: lysis/binding buffer with PMPs, porous material, reagents for LAMP reaction. Each porous material may be a polypropylene mesh, for example. Alternatively, one porous material may be a nylon mesh and the other porous material may be a synthetic hydrophobic polymer mesh, for example. The sample, e.g. biological sample, may be added to the container. A magnet is applied to the bottom of the container, thereby drawing the target-PMP complexes through the layers and into contact with the LAMP reagents. The container may be incubated at a suitable temperature (e.g. 65° C.) to perform the LAMP assay.
Figure 14:
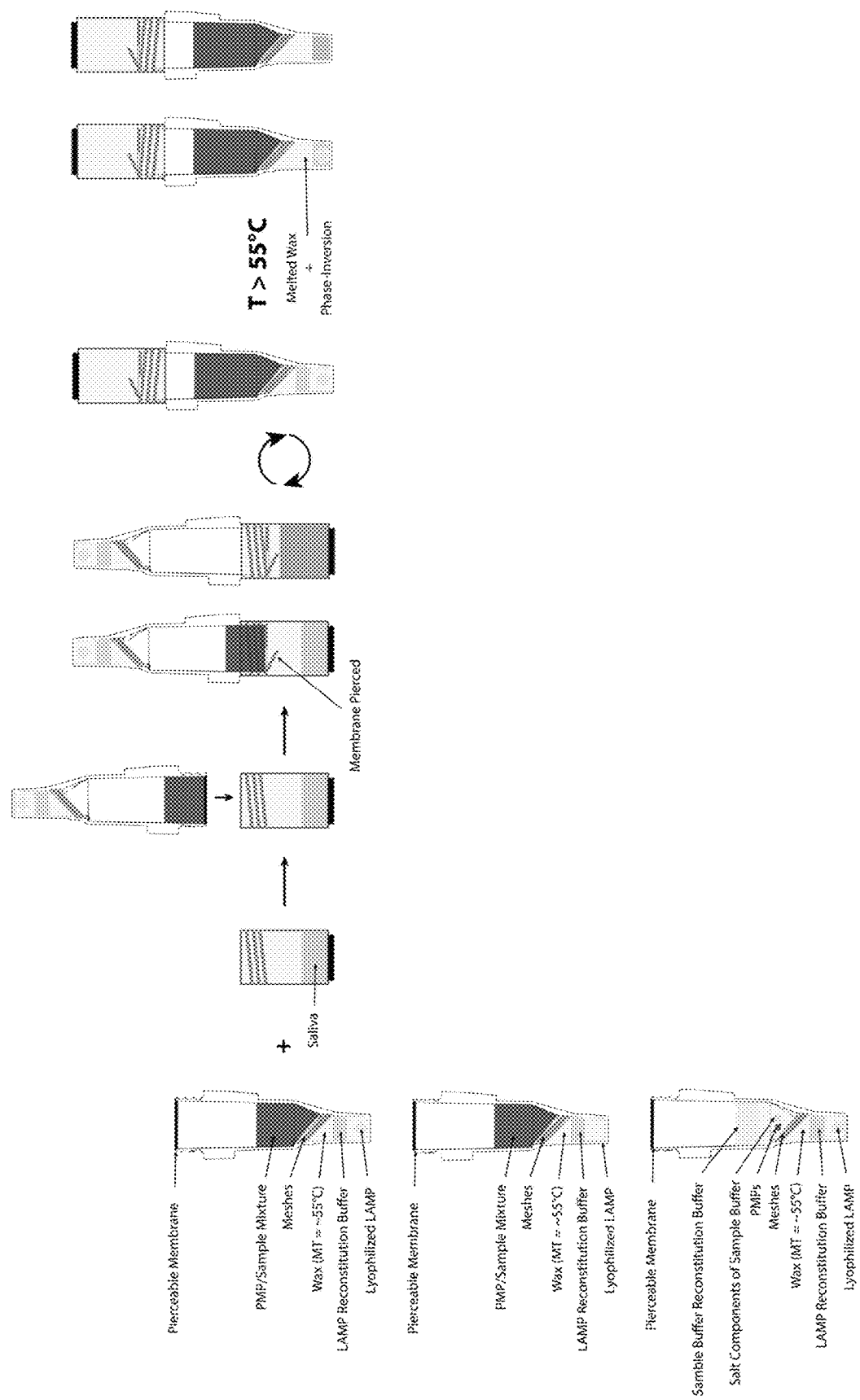
FIG. 14 shows another embodiment of a system as described herein. Like FIG. 13, in this embodiment, one embodiment of a POC, single-use system is shown along with a corresponding workflow, from sample acquisition to LAMP reconstitution. In this embodiment, lyophilized LAMP (or RT-LAMP) is housed in the bottom surface of the container in either a bead-form or distributed onto the surface of the bottom of the container. The system comprises a meltable wax layer (yellow), LAMP reconstitution buffer, a plurality of porous polypropylene materials ("meshes") (grey), and lysis/binding buffer with PMPs ("PMP/Sample Mixture"). In some embodiments, the PMPs and the salt components of the lysis/binding buffer are frozen into a meltable wax layer, and a sample reconstitution buffer is housed separately in the device such that upon melting of the wax, the reconstitution buffer, salt components, and PMPs combine. In some embodiments, a pierceable membrane is affixed to the top of the container. In this embodiment of a workflow, a biological sample (e.g. saliva, sputum, urine, blood, etc.) is collected in a separate tube. The tube and container (housing the LAMP reagents and plurality of porous materials) are then attached together which pierces the pierceable membrane which allows for lysis/binding buffer ("Sample Buffer") and PMPs to mix with the biological sample. Upon inversion and heating of the system above the melting temperature of the wax, the LAMP mixture and LAMP reconstitution buffer will mix.

In some embodiments, the biological sample is mixed with PMPs, for example, and subsequently added to the container. In some embodiments, as shown in FIG. 12, the sample, saliva for example, can be added directly to the lysis/binding buffer with PMPs which are already present in the container of the invention. In some embodiments, like those shown in FIG. 12 and FIG. 13, coconut oil is replaced with a solidified wax. In these embodiments, the system in this embodiment is configured in layers in the following order, from top to bottom: (1) lysis/binding buffer with PMPs, (2) solidified wax associated with polypropylene meshes, (3) spatially multiplexed RT-LAMP reagents. In some embodiments, like those in FIG. 12 and FIG. 13, the system needs to be heated to above the melting temperature of the wax before next steps are taken. A magnet is applied to the bottom of the container, thereby drawing the target-PMP, SARS-CoV-2 RNA in this case, complexes through the layers and into contact with the LAMP reagents. In some embodiments, like those in FIG. 13 and FIG. 14, a magnet is applied to the side of the container, thereby drawing the target-PMP complexes through the layers and into contact with the LAMP reagents. The container may be incubated at a suitable temperature (e.g. 65° C.) to perform the LAMP assay and subsequently measure the resulting signal. In this embodiment, the resulting signal is colorimetric.

Example 2: System and Device with Layered Aqueous and Oil Phases

Figure 2A:
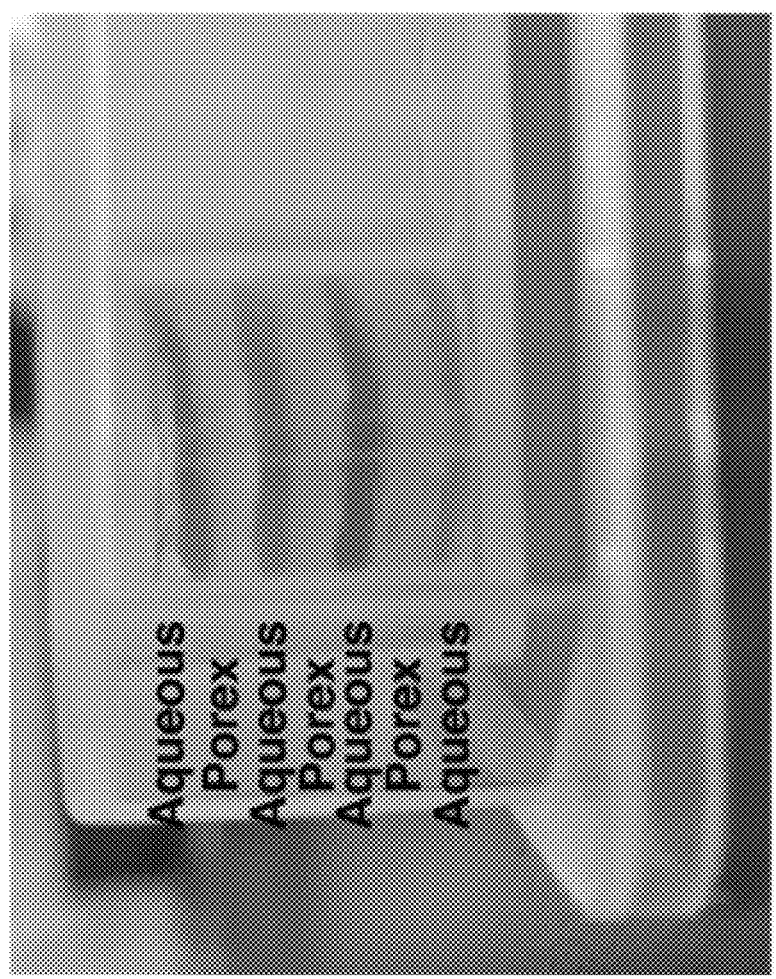
FIG. 2A shows a side view of one embodiment of a system as described herein. The container comprises a multi-well plate. One well contains stacked porous materials associated with oil (yellow). In the figure, the porous materials are synthetic hydrophobic polypropylene polymer mesh, referred to herein as "porex", and hydrophilic glass mesh. The system contains 7 mesh materials. From top to bottom, the layers are as follows: (1) lysis buffer (blue aqueous layer)(stabilized by hydrophilic glass mesh), (2) porex (which stabilizes the oil phase), (3) wash buffer (red aqueous layer)(stabilized by glass mesh), (4) "porex," (5) wash buffer (blue aqueous layer)(stabilized by hydrophilic glass mesh), (6) "porex," and (7) LAMP reagents (red aqueous layer)(stabilized by hydrophilic glass mesh).

A side view of the device of the invention is shown in FIG. 2A. The container comprises a multi-well plate. One well contains stacked porous materials associated with oil (yellow). In the figure, the porous materials are synthetic hydrophobic polypropylene polymer mesh, referred to as in the Figure as "porex", and hydrophilic glass mesh. The system contains 7 mesh materials. From top to bottom, the layers are as follows: (1) lysis buffer (blue aqueous layer) (stabilized by glass mesh), (2) polypropylene polymer mesh (porex) (which stabilizes the oil phase), (3) wash buffer (red aqueous layer)(stabilized by glass mesh), (4) polypropylene polymer mesh (porex), (5) wash buffer (blue aqueous layer) (stabilized by glass mesh), (6) polypropylene polymer mesh (porex), (7) LAMP reagents (red aqueous layer)(stabilized by glass mesh).

Example 3: Devices with Different Solid Substrates and Layers

Figure 1:
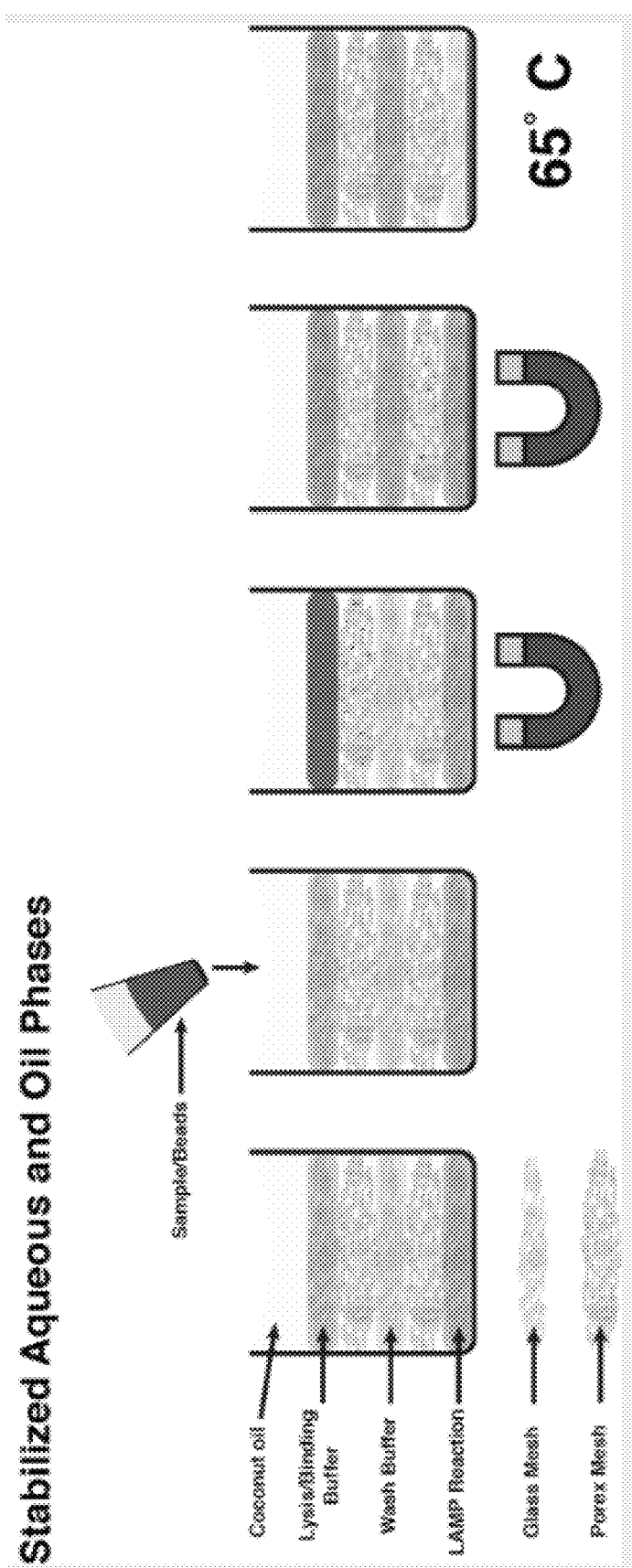
FIG. 1 shows one embodiment of a system as described herein. The system comprises reagents for LAMP-based detection of the target housed on a bottom surface of the container. The system comprises a plurality (2) porous materials. The system comprises a lysis buffer and a wash buffer. As shown in the figure, the system is configured in layers in the following order, from top to bottom: (1) coconut oil, (2) lysis buffer (with associated glass mesh), (3) coconut oil (with associated porous ("porex") material), (4) wash buffer (with associated glass mesh), (5) coconut oil (with associated porous ("porex") material), (6) reagents for LAMP reaction (with associate glass mesh). Each porous material may be a hydrophilic glass mesh. Alternatively, one porous material may be a glass mesh and the other porous material may be a synthetic hydrophobic polymer mesh. The biological sample may be mixed with PMPs, and subsequently added to the container. A magnet is applied to the bottom of the container, thereby drawing the target-PMP complexes through the layers and into contact with the LAMP reagents. The container may be incubated at a suitable temperature (e.g. 65° C.) to perform the LAMP assay and subsequently measure the resulting signal. In this embodiment, the resulting signal is colorimetric. In some embodiments the PMPs are conjugated with a target binding agent, for example, an antibody, an antibody fragment, a single chain Fv, etc., directed to the target and used as a PMP targeting agent. Embodiments of the invention can include as many phases or layers as desired, each phase or layer being with or without associated structural materials (including, e.g., materials with desired porosity), including those structural materials with a preference for a phase or layer.
Figure 2B:
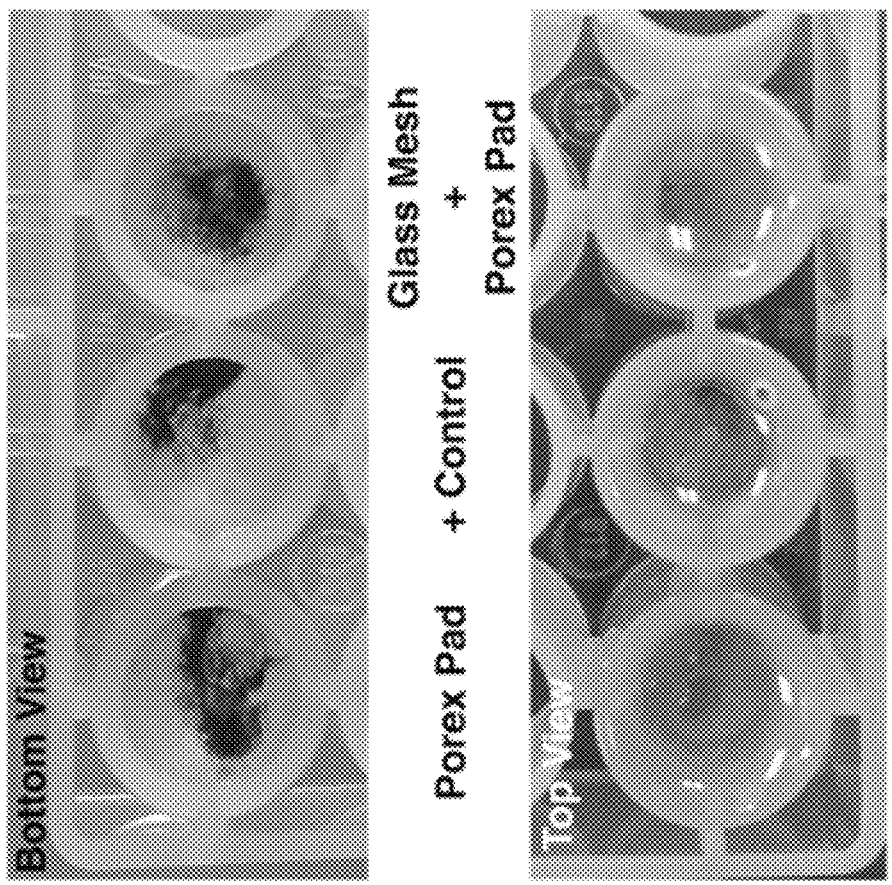

FIG. 2B shows a bottom view and a top view of the system described in Example 1 above and shown in FIG. 1 following application of paramagnetic particles and magnetic pull down. A comparison of a system comprising the synthetic polymer mesh, the synthetic polypropylene polymer mesh and a glass mesh, and no porous material (e.g. only aqueous or oil layers) is shown. As shown in the FIG. 2B, the synthetic polymer mesh (e.g. porex pad) and the combination of the porex pad and glass mesh both permit paramagnetic particles to pass through the porous material.

Example 4: Modified Methods and Systems

Figure 3:
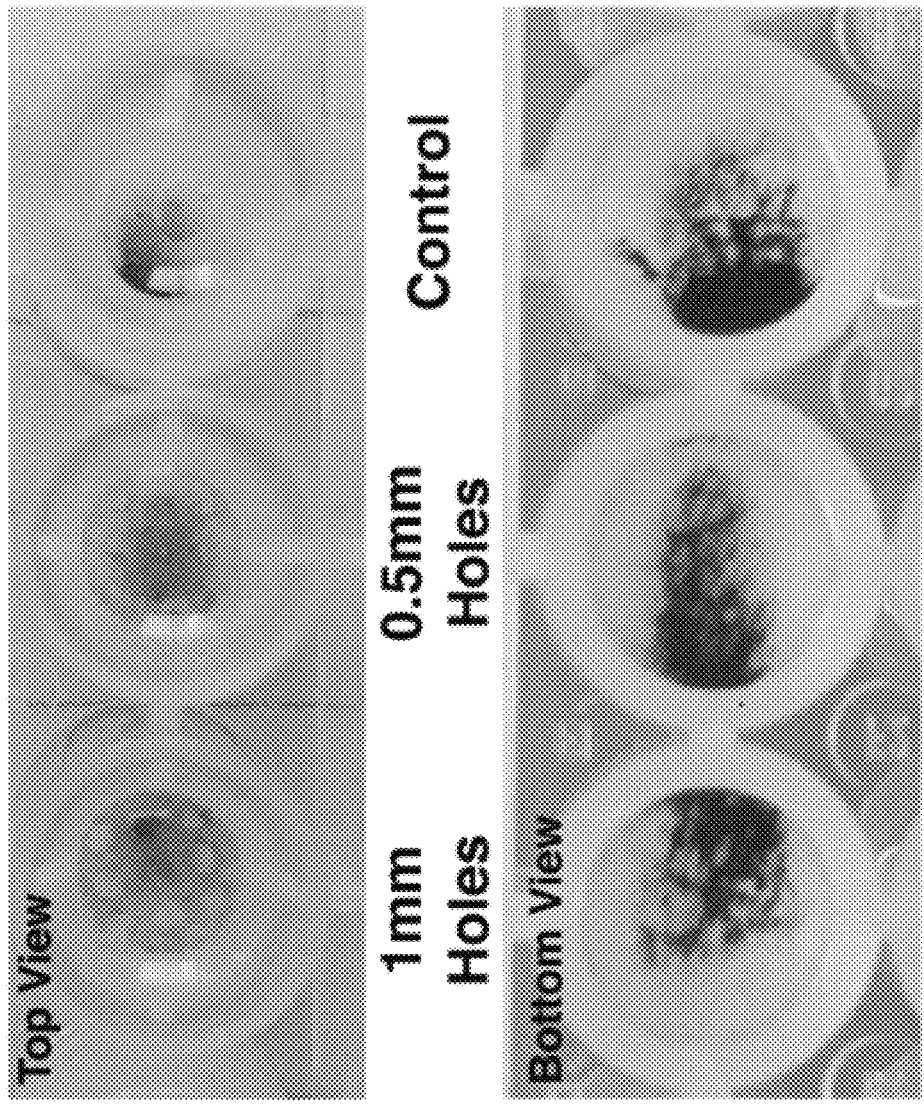
FIG. 3 shows a bottom view and a top view following magnetic bead pull down when small holes were created in the glass mesh material. 1 mm holes allowed for significantly faster pulldown and larger clumps of beads. 0.5 mm holes allowed for faster pulldown.

To test whether additional modifications to the porous materials may be made to further enhance bead pull down, small holes were created in glass mesh material and used in a system as described herein. FIG. 3 shows a bottom view and a top view following magnetic bead pull down when these small holes were created in the glass mesh material. As shown in the figure, 1 mm holes allowed for significantly faster pulldown and larger clumps of beads, and 0.5 mm holes allowed for faster pulldown. Accordingly, additional pores may be generated in the porous materials to facilitate isolation of target-PMP complexes as needed.

Example 5: Solid Substrate Variations

Figure 4:
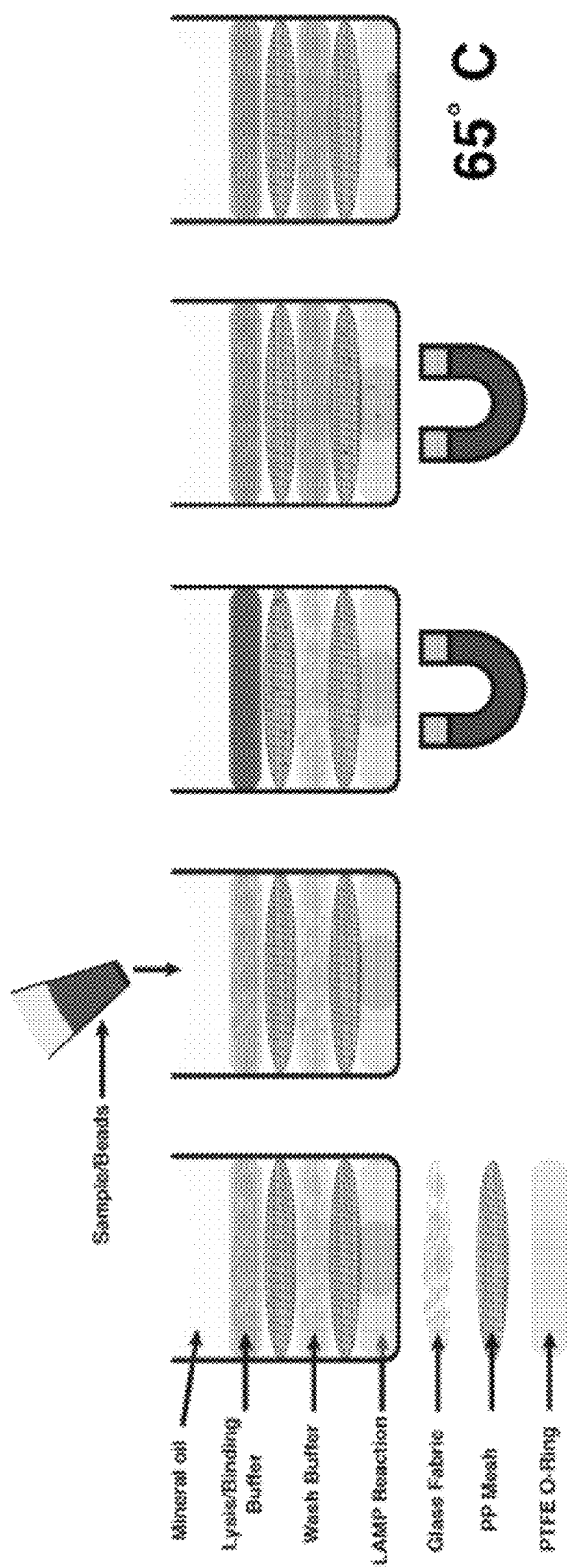
FIG. 4 shows another embodiment of a system as described herein. As in FIG. 1, the system comprises reagents for LAMP-based detection of the target housed in a final or terminal layer, e.g., a layer on, or toward or at a bottom surface of the container. In this particular embodiment, the system comprises a Polytetrafluoroethylene (PTFE) O-ring to hold the LAMP reagents on the bottom of the container, and to provide a firm surface for a porous material to rest on. In this embodiment, the porous material comprises polypropylene (PP) mesh, which is hydrophobic. The system comprises a plurality of porous materials. In this instance, two porous materials are shown (e.g. two layers). Each porous material may comprise, consist essentially of, or consist of PP mesh, for example. Alternatively, one material may comprise a PP mesh (hydrophobic) and the other material may comprise a glass mesh (hydrophilic), for example. The system in this embodiment also comprises a lysis buffer and a wash buffer. As shown in the figure, the system is configured in layers in the following order, from top to bottom: (1) mineral oil, (2) lysis buffer (hydrophilic glass mesh/fabric), (3) porous material (hydrophobic PP mesh), (4) wash buffer (hydrophilic glass mesh), (5) porous material (hydrophobic PP mesh), (6) PTFE O-ring and reagents for LAMP or other reaction. The biological sample is mixed with PMPs to which the target will bind, and subsequently added to the container. A magnet is applied to the bottom of the container, thereby drawing the target-PMP complexes through the layers and into contact with, for example, the LAMP reagents. The container may be incubated at a suitable temperature (e.g. 65° C.) to perform the LAMP assay and subsequently measure the resulting signal. In this embodiment, the resulting signal is colorimetric.

Another embodiment of a system as described herein is shown in FIG. 4. As in FIG. 1, the system comprises reagents for LAMP-based detection of the target housed on a bottom surface (layer) of the container. In this embodiment, the system comprises a Polytetrafluoroethylene (PTFE) O-ring to hold the LAMP reagents on the bottom of the container, and to provide a firm surface for the porous material to rest on. In this embodiment, the porous material comprises polypropylene (PP) mesh. The system comprises a plurality of porous materials. In this instance, two porous materials are shown (e.g. two layers). Each porous material may comprise PP mesh. Alternatively, one material may comprise PP mesh and the other material may comprise glass mesh. The system comprises a viral lysis buffer and a wash buffer.

As shown in FIG. 4, the system is configured in layers in the following order, from top to bottom: (1) mineral oil, (2) viral lysis/RNA binding buffer (glass fabric/mesh), (3) mineral oil (PP mesh), (4) wash buffer (glass fabric/mesh), (5) mineral oil (PP mesh), (6) PTFE O-ring and reagents for LAMP reaction.

In this embodiment, a biological sample, for example, is mixed with PMPs, and subsequently added to the container. A magnet is applied to the bottom of the container, thereby drawing the target-PMP complexes through the layers and into contact with the LAMP reagents. The container may be incubated at a suitable temperature (e.g. 65° C.) to perform the LAMP assay and subsequently measure the resulting signal. In this embodiment, the resulting signal is colorimetric.

Example 6: System and Device with Constrained LAMP Reagents

Figure 5:
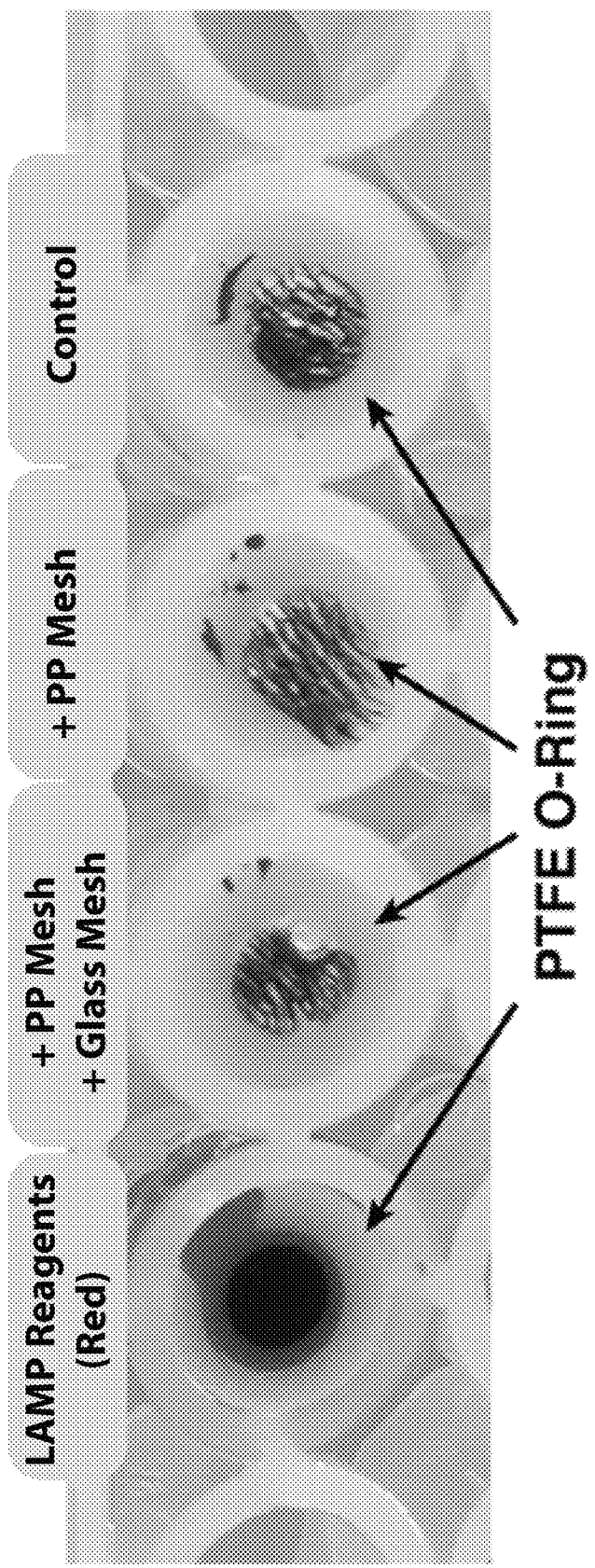
FIG. 5 shows an image of a system as described in FIG. 4 containing a PTFE O-Ring holding the LAMP reagents on the bottom surface of the container. As shown in the figure, the system labeled "+PP mesh+Glass mesh" is configured in layers in the following order from top to bottom: (1) mineral oil with polypropylene mesh, (2) water with glass mesh, (3) mineral oil with polypropylene mesh, (4) a PTFE O-Ring holding the LAMP reagents. As shown in the figure, the system labeled "+PP mesh" is configured in layers in the following order from top to bottom: (1) mineral oil with polypropylene mesh, (2) a PTFE O-Ring holding the LAMP reagents. As shown in the figure, the system labeled "control" is configured in layers in the following order from top to bottom: (1) a PTFE O-Ring holding the LAMP reagents. The image is shown after bead pull down, demonstrating that the target-PMP complexes are pulled down into the center of the O-Ring, thereby contacting the LAMP reagents. Red is shown to indicate where LAMP reagents are located.

An image of a system as described in FIG. 4 containing a PTFE O-Ring holding the LAMP reagents on the bottom surface of the container is shown in FIG. 5. The image is shown after bead pull down, demonstrating that the SARS-CoV-2 RNA target-PMP complexes are pulled down into the center of the O-Ring, thereby contacting the LAMP reagents. Red is shown to indicate where LAMP reagents are contained.

Example 7: System to Evaluate Hydrophilic Solid Substrate

Figure 6:
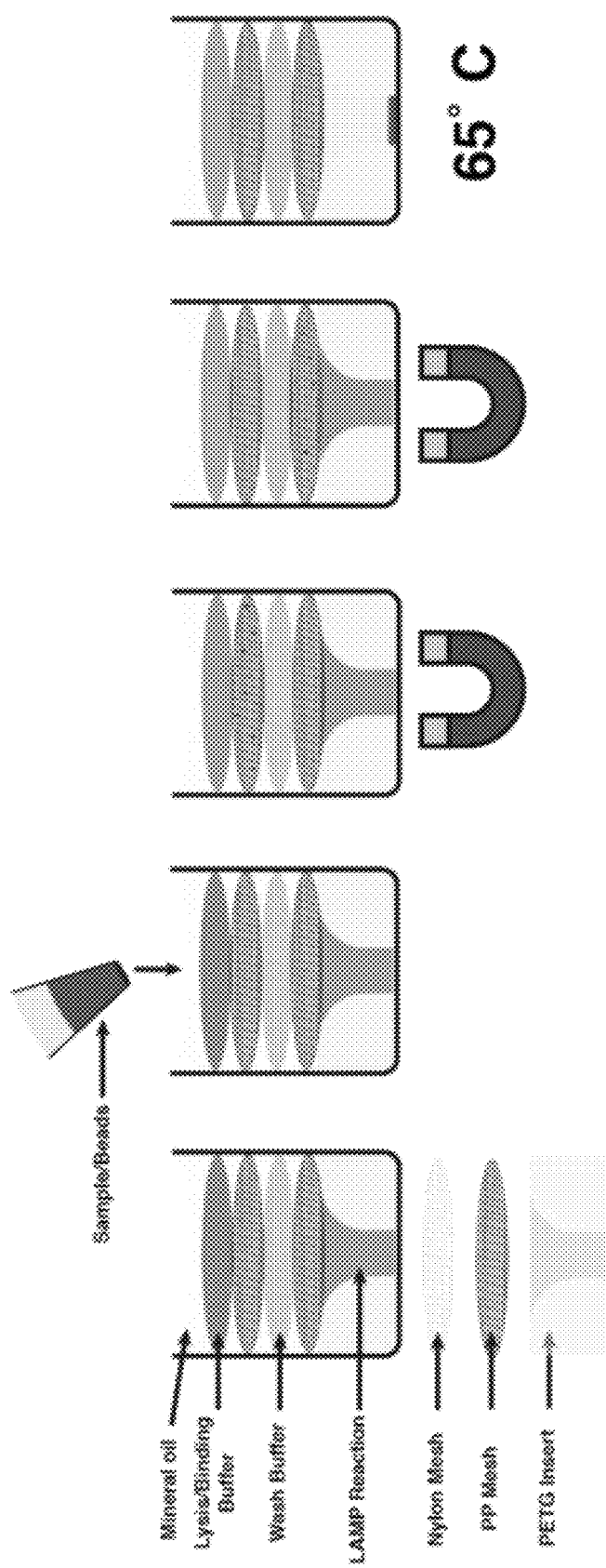
FIG. 6 shows another embodiment of a system of the invention. In this embodiment, the system comprises a custom glycol modified Polyethylene Terephthalate (PETG) insert to hold the LAMP reagents on the bottom of the container. The system comprises a plurality of porous materials. In this instance, two porous materials are shown (e.g. two layers). Each porous material may, for example, comprise a PP mesh. Alternatively, one material may comprise a PP mesh and the other material may comprise a nylon mesh. The system comprises a lysis buffer and a wash buffer. As shown in the figure, the system is configured in layers in the following order, from top to bottom: (1) mineral oil, (2) an aqueous lysis buffer (stabilized by a hydrophilic nylon mesh), (3) porous material (e.g. a PP mesh) associated with mineral oil, (4) an aqueous wash buffer (stabilized by nylon mesh), (5) porous material (e.g. a PP mesh) associated with mineral oil and (6) reagents for LAMP reaction held within the PETG insert. A sample, e.g. a biological sample, is mixed with PMPs to which a target, if present in the sample, will bind, and subsequently added to the container. A magnet is applied to the bottom of the container, thereby drawing target-PMP complexes through the layers and into contact with the LAMP reagents. The container may be incubated at a suitable temperature (e.g. 65° C.) to perform the LAMP assay and subsequently measure the resulting signal to determine the presence of amount of the target, if present. In this embodiment, the target is present and the resulting signal is colorimetric.
Figure 7:
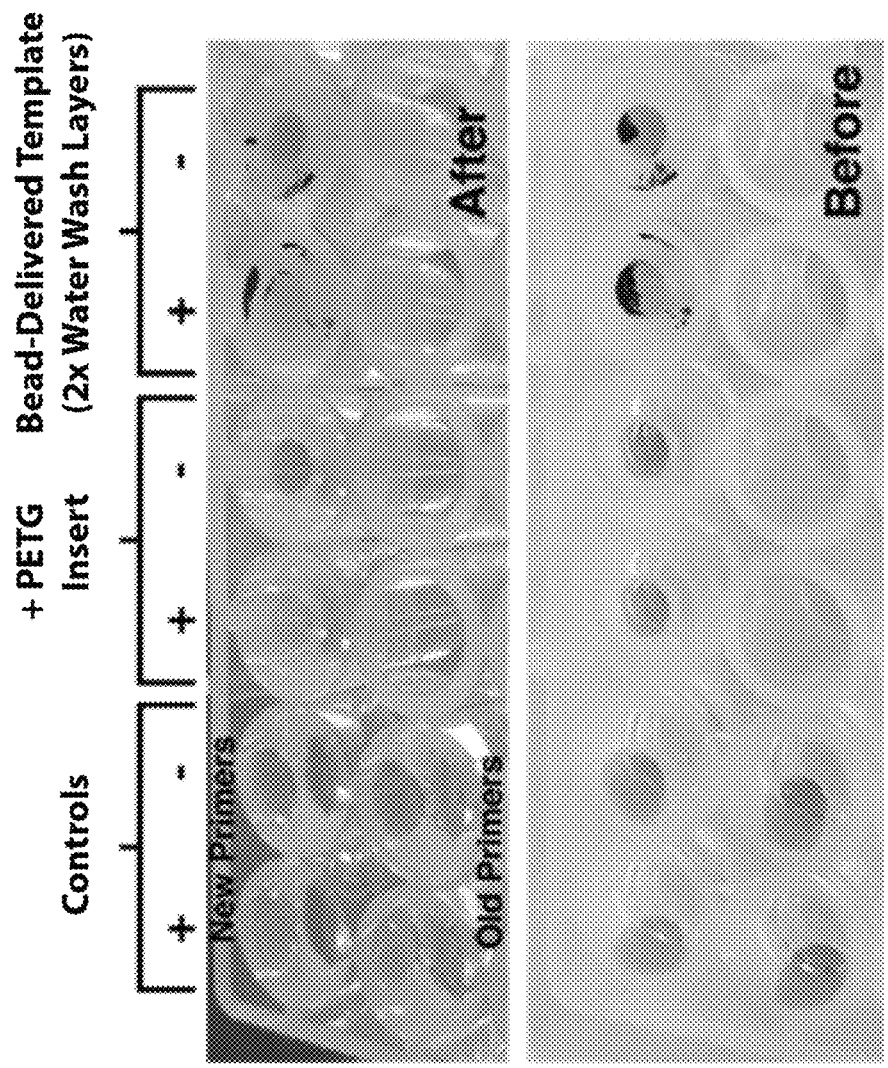
FIG. 7 shows results of a colorimetric LAMP assay following magnetic bead pull down using an embodiment of a system as described herein. A biological sample was mixed with PMPs and added to the system (referred to as a "bead-delivered template"). Data is compared to controls, and controls plus a PETG insert. As shown, the system allowed for pull down of sufficient target-PMP complexes (visible as brown spots in the wells), and for successful colorimetric LAMP-based detection of the target.

Another embodiment of a system as described herein is shown in FIG. 6. In this embodiment, the system comprises a CNC-milled glycol modified Polyethylene Terephthalate (PETG) insert (stabilizing hydrophilic structure) to hold the LAMP reagents on the bottom of the container. This custom PETG insert was manufactured to fit the exact geometry of the 96-well plate wells as seen in FIG. 7. The system comprises a plurality of porous materials. In this instance, two porous materials are shown (e.g. two layers). Each porous material may comprise PP mesh. Alternatively, one material may comprise PP mesh and the other material may comprise a hydrophilic nylon mesh. Mesh porosity will generally be such that target-PMP complexes can freely and robustly pass through from one side to the other. The system comprises a lysis buffer and a wash buffer.

As shown in the figure, the system is configured in layers in the following order, from top to bottom: (1) mineral oil, (2) lysis buffer (stabilized by nylon mesh), (3) mineral oil (stabilized by PP mesh), (4) wash buffer (stabilized by nylon mesh), (5) mineral oil (stabilized with PP mesh), and (6) reagents for LAMP reaction held within the PETG insert.

The biological sample is mixed with PMPs, and subsequently added to the container. A magnet is applied to the bottom of the container, thereby drawing the target-PMP complexes through the layers and into contact with the LAMP reagents. The container may be incubated at a suitable temperature (e.g. 65° C.) to perform the LAMP assay and subsequently measure the resulting signal. In this embodiment, the resulting signal is colorimetric.

Example 8: System and Device with PETG Insert

In this Example, a colorimetric LAMP assay following magnetic bead pull down using a system as described herein was carried out as seen in FIG. 7. Colorimetric RT-LAMP reaction reagents were pipetted into wells of flat-bottomed 96-well polypropylene plate containing mineral oil. A biological sample was mixed with PMPs and added to the system (referred to as a "bead-delivered template"). In the "Control" wells, no PETG insert was present, and in the experimental wells (e.g. "+PETG Insert", "Bead Delivered Template") a PETG washer was present. The reactions contained DNA primers, either a "New Primers" set or an "Old Primers" set, targeting DNA sequences specific to SARS-CoV-2. In the "Phase Jump Mechanism . . . (2× water washes)" condition wells, from top to bottom, the wells contained mineral oil+Porex mesh, water+glass mesh layer, another mineral oil+Porex mesh layer, another water+glass mesh layer, a third oil+Porex mesh layer, and finally the PETG washer+LAMP reaction.

For the "Controls" and "+PETG Insert" conditions, SARS-CoV-2 template or water was pipetted directly into the "+" or "−" wells respectively. For the "Phase Jump Mechanism . . . (2× water washes)" conditions, a biological sample containing either SARS-CoV-2 template ("+") or water ("−"), was mixed with PMPs and added to the system (referred to as a "bead-delivered template").

Data is compared to controls, and controls plus a PETG insert. As shown in FIG. 7, the system allowed for pull down of sufficient target-PMP complexes (visible as brown spots in the wells), and for successful colorimetric LAMP-based detection of the target. A positive reaction, or one in which SARS-CoV-2 DNA is detected, will turn yellow, whereas a negative reaction will remain pink. As shown, the system allowed for pull down of sufficient target-PMP complexes (visible as brown spots in the wells), and for successful colorimetric LAMP-based detection of the target.

Example 9: System and Method with SARS-CoV-2 Limit of Detection

Figure 8:
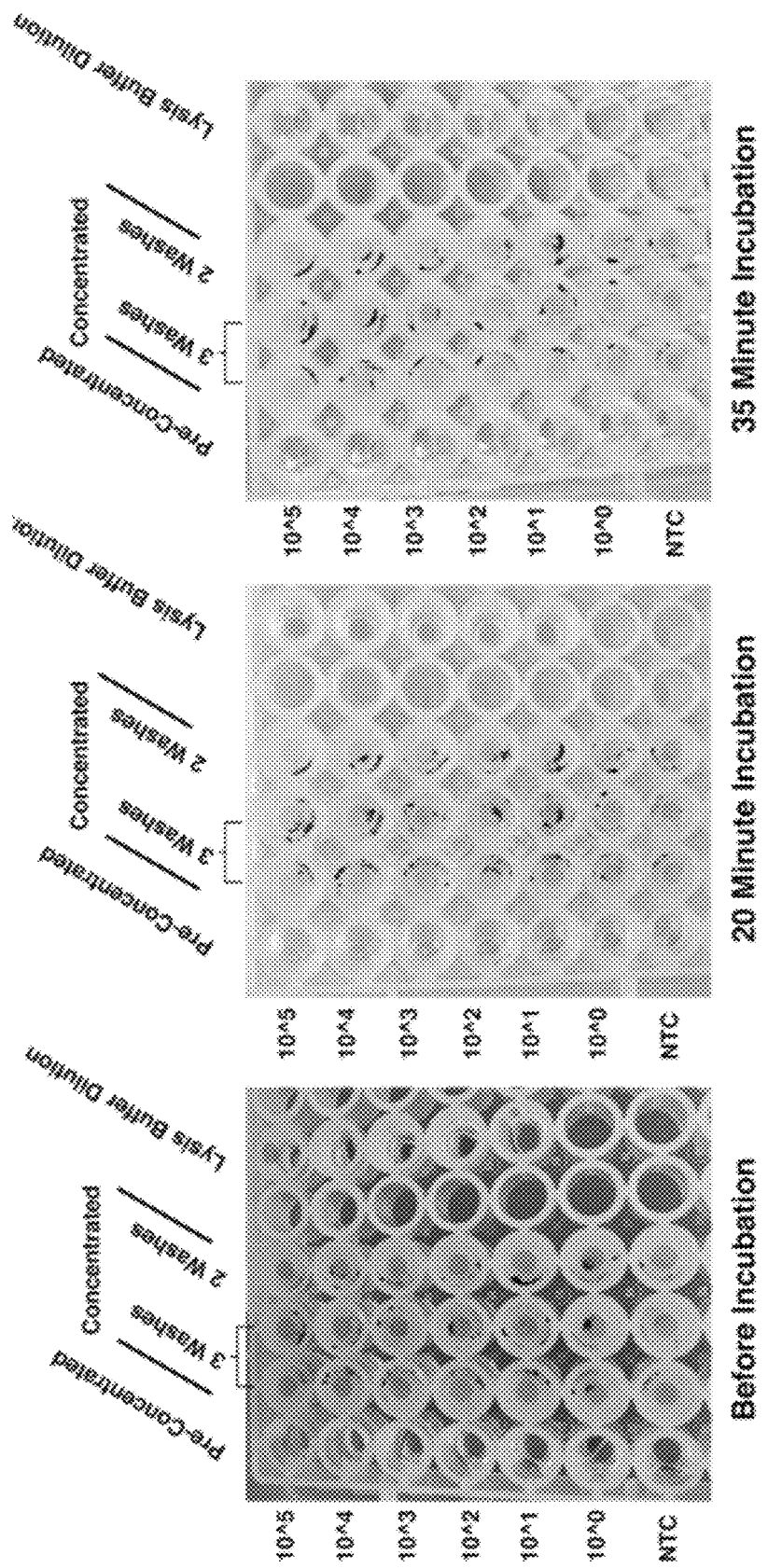
FIG. 8 shows results of a colorimetric LAMP assay to determine the limit of detection (LOD) using primers for SARS-CoV-2

The results of a colorimetric LAMP assay to determine the limit of detection (LOD) using primers for SARS-CoV-2 with different numbers of "wash layers" are shown in FIG. 8. In all of the wells, colorimetric RT-LAMP reagents, containing DNA primers for SARS-CoV-2, were pipetted into either PETG inserts or just the well itself ("Pre-Concentrated" wells) along with mineral oil. SARS-CoV-2 DNA was pre-concentrated and added directly to the LAMP reactions in the "Pre-Concentrated" wells at the number of copies listed on the left side of the figure. The "Concentrated" condition wells consisted of systems involving either 3 wash layers (Top-Bottom: mineral oil+Porex mesh layer, water+glass mesh layer, a second mineral oil+Porex mesh layer, a second water+glass mesh layer, a third oil+Porex mesh layer, a third water+glass mesh layer, a fourth mineral oil+Porex mesh layer, and finally the PETG+RT-LAMP reagents), or two wash layers (Top-Bottom: mineral oil+Porex mesh layer, water+glass mesh layer, a second mineral oil+Porex mesh layer, a second water+glass mesh layer, a third oil+Porex mesh layer, and finally the PETG+RT-LAMP reagents). To these wells, SARS-CoV-2 DNA, at the amounts listed on the left side of the figure, was added to saliva samples and lysis/binding buffer with PMPs, and then this mixture was added to the tops of the wells. After magnetic pulldown of the PMPs into contact with the LAMP reactions, the 96-well plate was placed in an oven at 65° C. and taken out for imaging at 0 minutes, 20 minutes, and 35 minutes.

Example 10: System and Device with Saliva Sample

Figure 9:
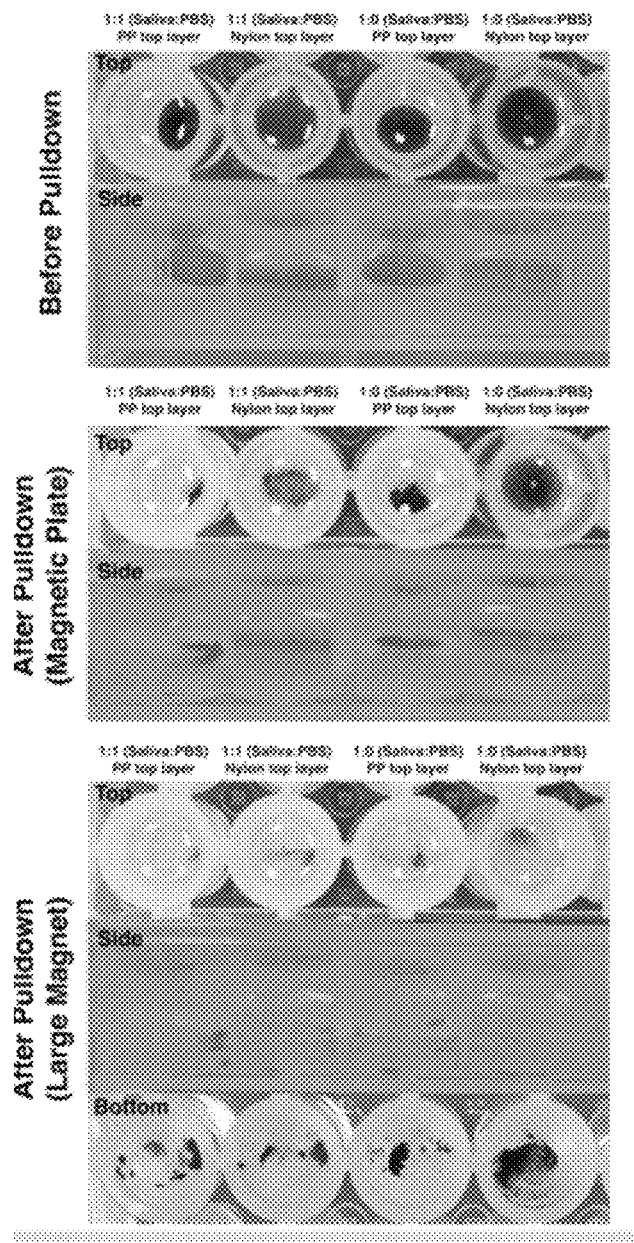
FIG. 9 shows images demonstrating successful target-PMP complexes from a saliva sample. The system comprised a PETG insert. The porous materials comprised polypropylene and nylon meshes. The saliva sample was diluted and lysis buffer was added directly to the sample. The sample was heated to 55° C. for 15 minutes, followed by heating to 98° C. for 3 minutes. The sample was cooled to room temperature, mixed with PMPs, and added to the container (e.g. added to the wells of a multi-well plate containing the porous materials and wash buffer). A magnet was applied to the bottom of the container to draw the target-PMP complexes through the purification layers.

In this Example, a device and system of the invention was used to successfully isolate target-PMP complexes from a saliva sample. From top to bottom, the systems comprised either a water+nylon mesh layer on top of a mineral oil+polypropylene mesh layer, or just a mineral oil+polypropylene mesh layer, on top of a PETG insert filled with water. The saliva sample was diluted with phosphate-buffered saline (PBS) and lysis buffer was added directly to the sample. The sample was heated to 55° C. for 15 minutes, followed by heating to 98° C. for 3 minutes to heat-inactivate infectious material. The sample was cooled to room temperature, mixed with PMPs, and added to the container (e.g. added to the wells of a multi-well plate containing the porous materials and wash buffer). A magnet was applied to the bottom of the container to draw the target-PMP complexes through the purification layers. As shown in the system, magnet size and thus field strength is critical to achieving adequate bead-pulldown. Additionally, this figure shows that undiluted saliva performs better than diluted saliva in terms of overall bead-pulldown. The results are shown in FIG. 9.

Example 11: System and Device for 96-Well Container

In this Example, a container is prepared containing reagents for LAMP-based detection of a desired target housed on a bottom surface of the container. The reagents may be secured on the bottom surface by a suitable means, including an insert (e.g. PETG insert) or an O-Ring. The system comprises a wash buffer and a plurality of porous materials stacked within the container. The system comprises, from top to bottom: (1) polypropylene mesh associated with mineral oil, (2) wash buffer associated with nylon mesh, (3) polypropylene mesh associated with mineral oil, (4) wash buffer associated with nylon mesh, (5) polypropylene mesh associated with mineral oil, and (6) a PETG insert with LAMP reagents. The container may be pre-packed into a multi-well plate, wherein each well of the plate contains the contents of a single container. This multi-well plate may be packaged into a kit.

Figure 10:
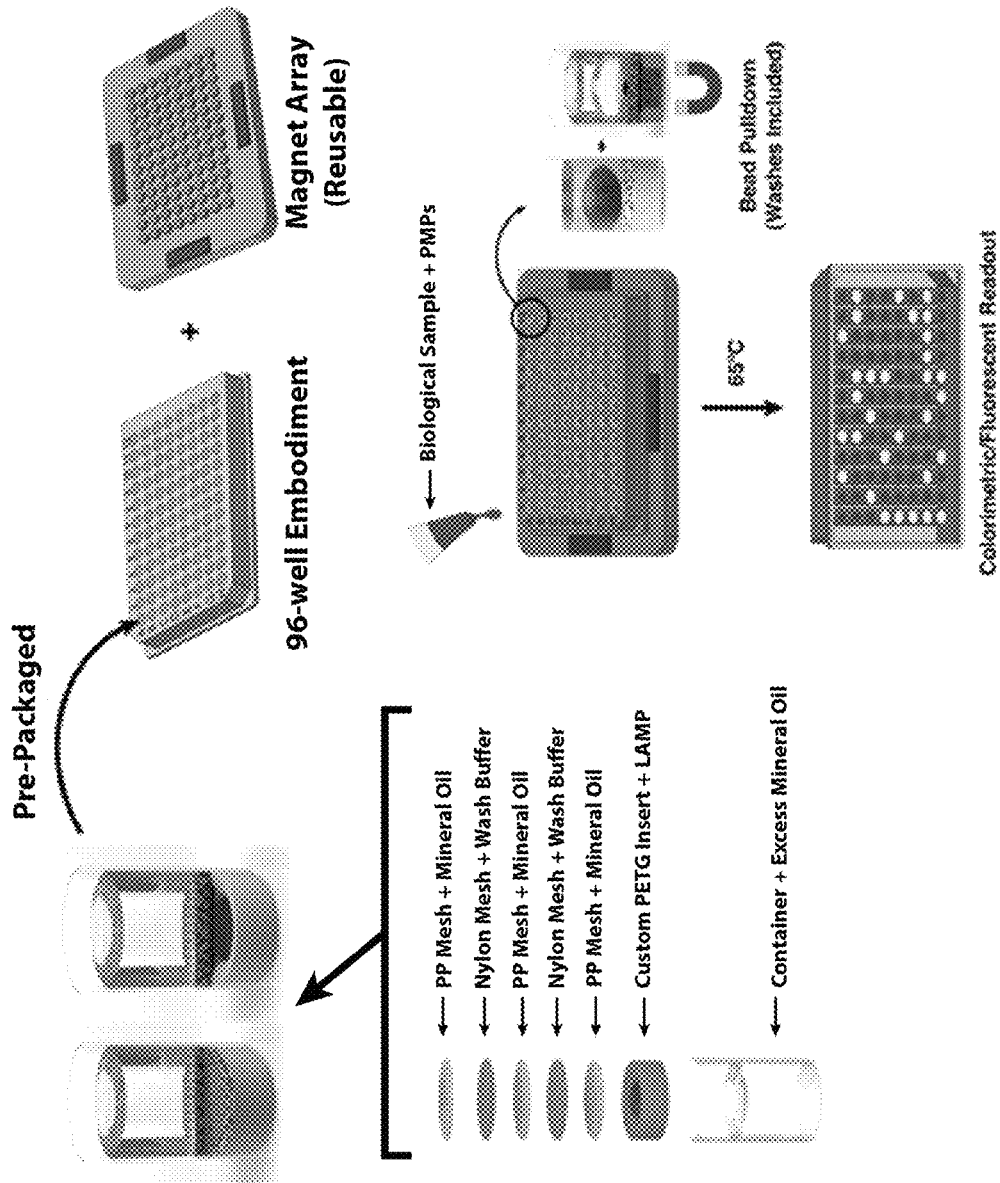
FIG. 10 is a schematic showing an overview of one embodiment of a system and method of the invention described and claimed herein. A container may be prepared containing reagents for LAMP-based detection of a desired target housed on a bottom surface of the container. The reagents may be secured on the bottom surface by a suitable means, including an insert (e.g. PETG insert) or an O-Ring. The system comprises a wash buffer and a plurality of porous materials stacked within the container. The system comprises, from top to bottom: (1) polypropylene mesh associated with mineral oil, (2) wash buffer associated with nylon mesh, (3) polypropylene mesh associated with mineral oil, (4) wash buffer associated with nylon mesh, (5) polypropylene mesh associated with mineral oil, and (6) a PETG insert with LAMP reagents. The container may be pre-packed into a multi-well plate, wherein each well of the plate contains the contents of a single container. This multi-well plate may be packaged into a kit. The system further comprises a magnet. In this case, the magnet is an array such that each magnet in the array can be aligned with a single well in the multi-well plate. A biological sample is lysed, mixed with paramagnetic particles, added to the multi-well plate, and the magnetic array is placed in a suitable position proximal to the bottom of the plate to draw the target-PMP complexes through the purification layers (e.g. through the porous materials and the wash buffer) and into contact with the LAMP reagents. The plate is incubated at 65° C., and a signal (e.g. colorimetric, fluorescent, etc., signal) is measured.

The system further comprises a magnet. In this case, the magnet is an array such that each magnet in the array can be aligned with a single well in the multi-well plate. For example, a biological sample is lysed, mixed with paramagnetic particles, added to the multi-well plate, and the magnetic array is placed in a suitable position proximal to the bottom of the plate to draw the target-PMP complexes through the purification layers (e.g. through the porous materials and the wash buffer) and into contact with the LAMP reagents. The plate is incubated at 65° C., and a signal (e.g. colorimetric or fluorescent signal) is measured. FIG. 10 is a schematic showing an exemplary overview of this embodiment.

Example 12 System and Device with Insert

Another overview of a system of the invention, in this case, for isolation and detection of analytes. FIG. 11A shows paramagnetic particles in the aqueous phase (i). Application of the magnetic force below the system pulls the paramagnetic particles (e.g. the target-PMP complexes) through the oil phase (ii, iii, and iv) towards the bottom surface of the system.

FIG. 11B shows an exemplary container holding the system. The bottom surface of the container contains reagents for detection of the analyte (shown in red). The aqueous and oil phases are stabilized by maximizing, or otherwise optimizing fluid retentive forces, via solid substrate adhesion and surface tension, compared to buoyancy forces.

FIG. 11C shows an exemplary process for isolating and detecting an analyte using a system as described herein, using an insert to house the system.

Example 13: LAMP-based Detection of a Target from a Complex Biological Sample

This system is designed for use in LAMP-based detection of a target from a complex biological sample. The system comprises a plurality of porous materials with different surface properties and reagents for LAMP-based, or RT-LAMP-based detection of a target housed on a bottom surface of the container. The system also comprises a lysis/binding buffer and can contain a wash buffer.

When LAMP reagents are in liquid form, and depending on the biological sample, the system may be configured in layers in the following order, from top to bottom: (1) mineral oil (optional), (2) lysis/binding buffer, (3) hydrophobic porous material (and associated mineral oil), and (4) reagents for LAMP (RT-LAMP) reaction. In other embodiments, the order of layers 1-3 is optional, and may be rearranged as desired.

In some embodiments, mineral oil is replaced with solidified wax which melts at operational temperatures.

If the inclusion of an aqueous wash layer is deemed beneficial or necessary, the system is then configured in layers in the following order, from top to bottom: (1) mineral oil (optional), (2) lysis/binding buffer, (3) hydrophobic porous material (and associated mineral oil), (4) hydrophilic porous material (wash buffer), (5) another hydrophobic porous material (and associated mineral oil), and (6) reagents for LAMP reaction. In other embodiments, the order of layers 1-4 is optional, and may be rearranged as desired.

When dry versions of LAMP reagents are used instead of liquid, the system layers are configured in the following order: (1) mineral oil (optional), (2) lysis/binding buffer, (3) hydrophobic porous material (and associated mineral oil), (4) an aqueous reconstitution buffer, mineral oil, and finally (5) the dried LAMP reagents. In this last configuration with dry LAMP reagents, oil/wax must be able to be solidified to keep the reconstitution buffer and dry lamp reagents separate until the device is heated, allowing the aqueous reconstitution buffer to combine with the dry reagents to then mimic the previous configuration where wet LAMP reagents are used. In other embodiments, the order of layers 1-4 is optional, and may be rearranged as desired.

Each porous material may be a hydrophobic mesh (polypropylene or other synthetic or natural polymer). Alternatively, one porous material may be a glass mesh and the other porous material may be a synthetic polymer mesh. The biological sample may be mixed with PMPs, for example, and subsequently added to the container, or the PMPs are already in the binding buffer and the biological sample can be simply added and mixed directly into the container. In some embodiments, the lysis of biological components contained in a complex biological sample is carried out using ultrasonication. In some embodiments, a sonotrode used to provide the ultrasonic vibrations, is applied externally to the device body. In some embodiments, the sonotrode, or similar device, is integrated into the body of a target-positioning device of the invention. A magnet is applied to the bottom of the container, thereby drawing the target-PMP complexes through the layers and into contact with the LAMP reagents.

In some embodiments, the portion of the device body in contact with the LAMP reagents is divided into more than one compartment to facilitate spatially-multiplexed reactions. The container may be incubated at a suitable temperature (e.g. 65° C.) to perform the LAMP assay and subsequently measure the resulting signal. In this embodiment, the resulting signal can be colorimetric, turbidimetric, or fluorometric, for example.

Example 14: RT-qPCR-based Detection of a Target from a Complex Biological Sample In this Example, a system of the invention is designed for use in the RT-qPCR-based detection of a target from a complex biological sample. This system comprises reagents for PCR-based, or RT-PCR-based detection of the target housed at a bottom layer of the system or on a bottom surface of the container. The container housing the PCR reaction can be a simple cup shape at the bottom of the device, or in some embodiments, the geometry of the container housing the reaction can be such that thermocycling and is more efficient. For example, in some embodiments, the container housing the reaction can have a high aspect ratio to facilitate quicker transfer of heat (i.e., reducing the distance over which temperature must be conducted to facilitate temperature cycling of the reaction). In some embodiments, the container housing the reaction comprises, consists essentially of, or consists of a microfluidic channel. In some embodiments, the container housing the reaction is made of different material as the rest of the device. In some embodiments, the container housing the reaction has integrated heating elements in it. The system can comprise a plurality of porous materials with different surface properties. The system comprises a lysis/binding buffer and can contain a wash buffer. Potential layer configurations match those of LAMP with the exception that RT-qPCR reagents would be used in place of LAMP reagents (either in liquid form or dry). Unlike LAMP/RT-LAMP which is an isothermal reaction, the container with RT-qPCR reagents may be thermocycled at appropriate temperatures (e.g. 95° C. for 10 s, 60° C. for 30 s) to perform the PCR (RT-PCR) assay and subsequently measure the resulting signal. In this embodiment, the resulting signal is fluorometric.

Example 15: Target Isolation from a Complex Biological Sample for Next Generation Sequencing In this Example, a system of the invention is designed for isolation of a target from a complex biological sample for sequencing. This system comprises reagents for next-generation sequencing (NGS) of the target housed toward or on a bottom surface of the container. However, unlike LAMP/RT-LAMP and RT-qPCR embodiments, this embodiment would be used for isolation, initial amplification reactions, and transfer of target material and may, but does not necessarily need, to include any endpoint detection. Instead, the isolated material can be used for nearly any downstream process.

In fact, the application of NGS is just one of many potential applications where isolated material may be used in a downstream process potentially outside a device of the invention. Indeed, depending on the analyte (e.g., cells, protein, nucleic acid, or glycoprotein) and the application (enumeration of cancer cells, isolation protein for mass spectrometry, or detection on a lateral or vertical flow device) an enumerable number of potential downstream uses are enabled. Thus, NGS is only used here as one relevant example. In the case of NGS, isolated nucleic acid is used with downstream equipment for sequencing. NGS sometimes requires isothermal, or may require thermocycling, for preamplification of material prior to sequencing. Therefore, a system, device or method of the invention may be used to pre-amplify the isolated material prior to transfer of the material into sequencing equipment. Pre-amplification can also be performed outside of a device as described after initial isolation and transfer.

In the case of NGS, in some embodiments, the container housing the reagents for stabilizing or buffering the isolated analyte for NGS is detachable. In some embodiments, the container housing the reagents for NGS facilitates transfer of NGS reagents to a new container. As with previous descriptions of layer configurations, NGS reagents may be in liquid form or dried and reconstituted with a layer of reconstitution buffer. In some embodiments, the NGS reagents are adhered to the surface of a detachable element in the bottom of the container. In some embodiments, devices of the invention are arrayed to interface with microtiter plates (48-well, 96-well, 384-well) such that the magnet is able to pull the analyte into the microtiter plate. In these embodiments, the NGS reagents may be housed in the wells of the microtiter plate, and the device of the invention, housing the other components of the method of the invention, is placed into the top of the well. In some embodiments the container housing the reagents for NGS is a simple cup, or in some embodiments, the geometry of the container housing the reaction can be such that thermocycling and is more efficient. In some embodiments, the container housing the NGS reagents has a high aspect ratio to facilitate quicker transfer of heat. In some embodiments, the container housing the reaction comprises, consists essentially of, or consists of a microfluidic channel.

In some embodiments, the container housing the reaction is made of different material as the rest of the device. In some embodiments, the container housing the reaction has integrated heating elements in it. The system comprises a plurality of porous materials with different surface properties. The system comprises a lysis/binding buffer and can contain a wash buffer. Depending on the biological sample, the system may be configured in layers in the following order, for example, from top to bottom: (1) mineral oil, (2) lysis/binding buffer, (3) hydrophobic porous material (mineral oil) and (4) reagents for NGS. If the inclusion of an aqueous wash layer is deemed beneficial or necessary, the system may be configured in layers in the following order, for example, from top to bottom: (1) mineral oil, (2) lysis/binding buffer, (3) hydrophobic porous material (mineral oil), (4) hydrophilic porous material (wash buffer), (5) another hydrophobic porous material (mineral oil), and (6) reagents for NGS. Each porous material may comprise a hydrophobic mesh (e.g. polypropylene or other synthetic or natural polymer). Alternatively, one porous material may comprise a glass mesh and the other porous material may comprise a synthetic polymer mesh.

The biological sample may be mixed with PMPs, and subsequently added to the container, or the PMPs are already in the binding buffer and the biological sample can be simply added and mixed directly into the container. A magnet is applied to the bottom of the container, thereby drawing the target-PMP complexes through the layers and into contact with the NGS (RT-PCR) reagents. The container may be thermocycled at appropriate temperatures (e.g. 95° C. for 10 s, 60° C. for 30 s) to perform the initial steps of NGS.

Example 16: Sandwich ELISA

In some embodiments of the invention, stabilized interfaces are used to partition and stabilize the reagents used to run a sandwich ELISA on a biological sample including a primary antibody binding buffer, a conjugated secondary antibody binding buffer, and a substrate solution, with mineral oil and solidified wax layers (MT=35° C.) separating each layer. See FIG. 15.

In this assay embodiment, a biological sample is added to allow the sample to mix with the topmost layer within the device which contains primary antibody binding buffer composed of a buffer, paramagnetic particles (PMPs) conjugated to a primary capture antibody (target-specific), and other various components. After a period of incubation, a magnetic force is applied perpendicular to the porous meshes which pulls the beads through the mineral oil layer and into the secondary antibody binding buffer comprised of a buffer, secondary conjugate antibodies (HRP or other enzyme), and salt and buffering components which establish optimal antibody-target binding other various components. Due to the presence of a solid wax layer beneath this layer, the beads stop in the aqueous layer. In the secondary antibody binding buffer, enzyme-conjugated antibodies are allowed to bind other regions on the target, which is already bound by the primary antibody/PMP. After an incubation period, temperature can be increased to above the melting temperature of the wax layer, which allows the beads to be pulled through (i.e. another ESP wash), and into the substrate solution. In this layer, enzyme substrate is converted into a fluorescent or colorimetric product which can be measured using traditional means.

In another format of this assay, the top layer of the device contains both PMPs that can bind the target as well as primary antibodies labeled with HRP or other substrate converting enzyme. Then the target is isolated into a final buffer containing a substrate solution. The enzyme converts the substrate into a fluorescent or colorimetric product for detection via traditional means.

Example 17: CTC Capture

Figure 16:
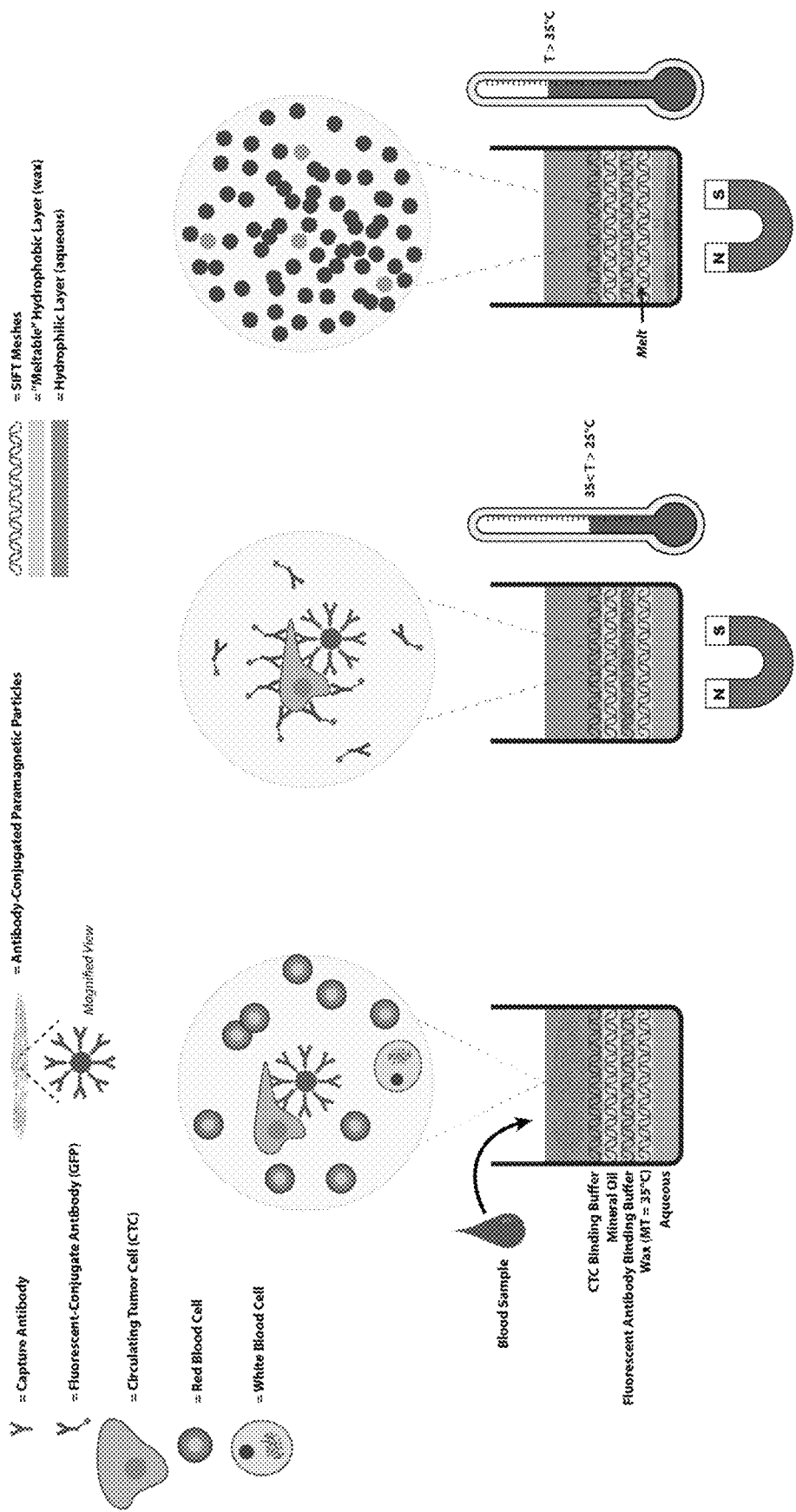
FIG. 16 is a schematic showing an overview of one embodiment of a system and method of the invention described and claimed herein. In this embodiment, the system contains reagents for isolating and detecting a cell-based target (e.g. circulating tumor cells (CTCs), neutrophils, t-cells, mesenchymal stem cells, etc.) in a biological sample (e.g. saliva, sputum, urine, blood, cell culture media etc.). In this embodiment, the cell-based target is CTCs. The system comprises, from top to bottom, CTC binding buffer consisting in part of antibody-conjugated PMPs with a nylon porous material, mineral oil with a polypropylene porous material, a fluorescent antibody binding buffer consisting in part of an antibody conjugated to a fluorophore (e.g. green fluorescent protein (GFP), red fluorescent protein (RFP), etc.), a solidified wax layer with a polypropylene porous material, and an aqueous solution (e.g. phosphate-buffered saline, etc.). In this embodiment, a biological sample containing target cells is added to the top of the system and mixed with the CTC binding buffer allowing target cells to bind to antibody-PMPs. A magnetic field is applied to the bottom of the container causing the target-PMP complexes to be pulled through the mineral oil layer, and into the fluorescent antibody binding buffer. If the temperature is above the freezing temperature of the fluorescent antibody binding buffer and below the melting temperature of the wax layer, the target-PMP complexes will remain in the fluorescent antibody binding buffer until the temperature increase above the wax melting temperature. Incubation in this layer allows for fluorescent antibodies to bind to target-PMP complexes. In this embodiment, when the temperature increases above the melting point of the wax, the fluorescent antibody-target-PMP complexes are pulled into the aqueous. Once in the aqueous solution, target cells can be counted using fluorescent microscopy.

In another embodiment of the invention, stabilized interfaces are used to partition and stabilize the reagents needed to isolate circulating tumor cells (CTCs) from a blood-based sample (peripheral blood mononuclear cells (PBMCs)) including CTC binding Buffer, a buffer-labeling reagents to differentiate CTCs from non-CTCs, and a final aqueous volume, all separated by either mineral oil or a solid wax with a melting temperature of ~35° C. See FIG. 16.

In this assay, a blood-based sample, either whole blood or PBMCs, is added to the top of a well containing one or porous meshes. Once added, the sample mixes with the topmost layer which contains CTC binding buffer composed of a phosphate-buffered saline (PBS), paramagnetic particles (PMPs) conjugated to a capture antibody (CTC-specific targets), and other various components such as salts and buffer which help preserve CTC viability and to help establish optimal binding conditions. After a period of incubation, a magnetic force is applied perpendicular to the porous meshes which pulls the beads through the mineral oil layer and into a fluorescent antibody binding buffer. Due to the presence of a solid wax layer beneath this layer, the beads stop in the aqueous layer. In the fluorescent antibody binding buffer, fluorescently-tagged antibodies are allowed to bind targets on the captured CTCs. After an incubation period, temperature can be increased to above the melting temperature of the wax layer, which allows the beads to be pulled through (i.e. another ESP wash), and into an aqueous phase (PBS). In this layer, CTCs can be counted via fluorescent microscopy.

Example 18: Inputs for Other Methods and Devices

The ability to quickly go from raw sample to purified sample is a bottleneck in most assay platforms due to complexity and cost. The inventions described herein provide a simple solution to isolate targets from raw samples (e.g., blood, urine, saliva, plasma) directly into a final destination such as the input of another device or method. In some embodiments, this may be a microtiter plate. In other embodiments, a device of the invention can form the sample loading chamber for a microfluidic device. After isolation and transfer of the target into the microfluidic device chamber, microfluidic controls can be used to subsequently process the sample as needed.

In another embodiment, just as PMPs can be transferred into a microwell plate, the PMPs can be transferred onto a lateral flow assay (LFA) or similar assay (e.g., vertical flow assay) where analyte can then be detected. For example the PMPs can be transferred to the sample pad of an LFA. A low pH elution could be applied to the LFA to elute the analyte bound via IgG to the PMPs. The pore size of the sample pad material can prevent migration of the PMPs down the LFA or may be filtered at a subsequent junction with another material of smaller pore size. Eluted material can then flow onto a next pad laden with dried neutralization buffer to renormalize the pH. The eluate can then rehydrate pad material laden with conjugate or biotinylated antibody, allowing the conjugate/Ab to bind the eluted target and flow downstream for detection. Downstream detection can be performed in a variety of ways known in the area of flow assay design. Similarly, a device, system or method of the invention can be used to isolate target into analogous vertical flow assays.

Example 19: Isolation of Nucleic Acid for Stable Transport

Devices, systems and methods of the invention can also be used to isolate target onto an LFA sample pad, they can also be used to isolate target onto a pad for drying for stable storage and transport. Unlike a dried blood spot which would contain background contaminants from a small volume of blood (μL's), a target isolated using a device, system or method of the invention would represent the isolated target from a much larger volume of blood (mL's) and most contaminating substances will have been removed.

Example 20: SIFT-Enabled, Tunable, Lens Microarray

In this embodiment of SIFT, a single porous structural material, with a preference for hydrophobic fluid, composed of regularly spaced pores, is used to create an array of adjustable optical lenses which can magnify an image onto a CCD detector. In this system, a hydrophobic phase or layer is established across the aforementioned hydrophobic porous structural material. By adjusting the pressure and/or volume of the hydrophobic layer (or the position of the SIFT membrane in the column of material), a plano-convex lens can be created with a high degree of adjustability. Placing an object in front of this lens (the letter "A") results in a magnified compound image on the CCD detector.

What is claimed is:

1. A composition comprising two or more fluid regions with different properties within a phase or layer where the fluid regions are stabilized with respect to each other using a solid or semi-solid structure or material with at least one pore wherein stabilization allows mass transport of a fluid constituent via diffusion to prevail over bulk fluid motion.

2. A composition comprising two or more fluid regions with different properties within a phase or layer where the fluid regions are stabilized with respect to each other using a solid or semi-solid structure or material with at least one pore that allows passage of target(s), wherein stabilization allows mass transport of a fluid constituent via diffusion to prevail over bulk fluid motion.

3. A composition according to claim 2, wherein the solid or semi-solid structure or material comprises or consists essentially of one pore.

4. A composition according to claim 2, wherein the solid or semi-solid structure or material comprises or consists essentially of more than one pore.

5. The composition of claim 1, wherein the composition comprises fluids with transition zones between different densities and/or density gradients.

6. The composition of claim 1, wherein the composition of matter is held in a container with dimensions such that gravitational, convectional, or turbulent forces will induce homogenization/bulk mixing between the two fluids and the rapid dissolution of a transition zone target molecules.

7. The composition of claim 1, wherein the composition of matter is held in a container with dimensions such that hydrodynamic resistance increases, and velocities resulting from a source of pressure differential are reduced so that transport of target molecules via diffusion prevail or dominate over transport of said molecules via convection.

8. The composition of claim 7, wherein transition zone dissolution occurs over multiple seconds to minutes to hours or days.

9. The composition of claim 7, wherein porous solid or semi-solid structure or material comprises a mesh, a gel, or an aggregate of solid or semi-solid particles.

10. The composition of claim 1, wherein the phases or layers are aqueous, oil and/or gaseous layers or phases.

11. The composition of claim 1, wherein at least one of the phases or layers comprises an emulsion.

* * * * *